US005839336A

United States Patent [19]

Yamauchi et al.

[11] Patent Number: 5,839,336

[45] Date of Patent: Nov. 24, 1998

[54] PAPER-PUNCHING DEVICE FOR USE IN AN IMAGE-FORMING APPARATUS

[75] Inventors: Yasuji Yamauchi, Nara; Toshio Yamanaka, Yao; Masafumi Okumura, Yamatokoriyama; Masashi Hirai, Ikoma; Kyousuke Taka, Nara; Kinji Uno, Yamatokoriyama; Yoshiharu Yoneda, Osaka; Hirokazu Yamauchi, Uji, all of Japan

[73] Assignee: Sharp Kabushiki Kaisha, Osaka, Japan

[21] Appl. No.: 768,865

[22] Filed: Dec. 17, 1996

Related U.S. Application Data

[63] Continuation of Ser. No. 357,217, Dec. 13, 1994, abandoned.

[30] Foreign Application Priority Data

| | | | |
|---|---|---|---|
| Dec. 28, 1993 | [JP] | Japan | 5-337329 |
| Mar. 29, 1994 | [JP] | Japan | 6-059304 |

[51] Int. Cl.$^{6}$ .............................. G03B 27/00; B26D 7/00; B26D 5/20

[52] U.S. Cl. .............................. 83/167; 83/269; 83/371; 83/560; 355/408

[58] Field of Search .............................. 83/262, 269, 370, 83/372, 560, 167, 110, 156, 371; 355/408

[56] References Cited

U.S. PATENT DOCUMENTS

| | | | |
|---|---|---|---|
| 3,882,744 | 5/1975 | McCarroll | 83/262 |
| 4,548,108 | 10/1985 | Dennis | 83/371 |
| 4,579,029 | 4/1986 | Sunaga | 83/372 |
| 4,987,811 | 1/1991 | Ikarashi et al. | 83/372 |
| 5,138,178 | 8/1992 | Wong et al. . | |
| 5,235,515 | 8/1993 | Ungpiyakul et al. | 83/371 |

FOREIGN PATENT DOCUMENTS

| | | |
|---|---|---|
| 0093242 | 11/1983 | European Pat. Off. . |
| 0342604 | 11/1989 | European Pat. Off. . |
| 0409204 A2 | 1/1991 | European Pat. Off. . |
| 0490586 A1 | 6/1992 | European Pat. Off. . |
| 0516199 A1 | 12/1992 | European Pat. Off. . |

(List continued on next page.)

OTHER PUBLICATIONS

Patent Abstracts of Japan, vol. 16, No. 523 (M–1331) 27 Oct. 1992 & JP–A–04 193498 (Mita Ind Co Ltd) 13 Jul. 1992.

Patent Abstracts of Japan, vol. 8, No. 233 (P–309) 26 Oct. 1984 & JP–A–59 111170 (Canon K.K.) 27 Jun. 1984.

Patent Abstracts of Japan, vol. 14, No. 179 (P–1034) 10 Apr. 1990 & JP–A–02 028 671 (Minolta Camera Co.) 30 Jan. 1990.

Patent Abstracts of Japan, vol. 11, No. 236 (P–601) 4 Aug. 1987 & JP–A–62 049 637 (Fuji Xerox Co. Ltd.).

*Primary Examiner*—M. Rachuba
*Assistant Examiner*—Sean A. Pryor
*Attorney, Agent, or Firm*—Nixon & Vanderhye PC

[57] ABSTRACT

In a paper-punching device for use in an image-forming apparatus, the rear edge of a sheet of paper that is being transported through a transport guide is detected by the photosensor. After a predetermined time has passed since the detection, a punching device is activated. At this time, a punching member is depressed downward, and a punching blade attached to its top penetrates through the sheet of paper, thereby forming a punch hole. Even during the punching operation, transport rollers continue to rotate. Therefore, when the sheet of paper is caught by the punching blade, the transport rollers are allowed to slip a predetermined amount with respect to the paper. For this reason, at least one of the transport rollers is made of a foamed material. With this arrangement, since the punching operation is carried out on the rear side of the sheet of paper, it becomes possible to reduce the occurrence of paper jams even if sheets of paper are transported in succession. Further, the punching operation is carried out while the paper is being transported; this makes it possible to provide a high-speed operation. Further, even if the sheet of paper is caught by the punching blade, it is not damaged because of the slip that is provided.

18 Claims, 52 Drawing Sheets

FOREIGN PATENT DOCUMENTS

| | | |
|---|---|---|
| 0532344 A2 | 3/1993 | European Pat. Off. . |
| 0568796 A2 | 11/1993 | European Pat. Off. . |
| A-2241812 | 5/1974 | France . |
| 3419254 C1 | 10/1985 | Germany . |
| 58-140755 | 8/1983 | Japan . |
| 3-190696 | 8/1991 | Japan . |
| 4-105895 | 4/1992 | Japan . |
| A-4105895 | 4/1992 | Japan . |
| 6-126699 | 5/1994 | Japan . |
| 506399 | 5/1939 | United Kingdom . |

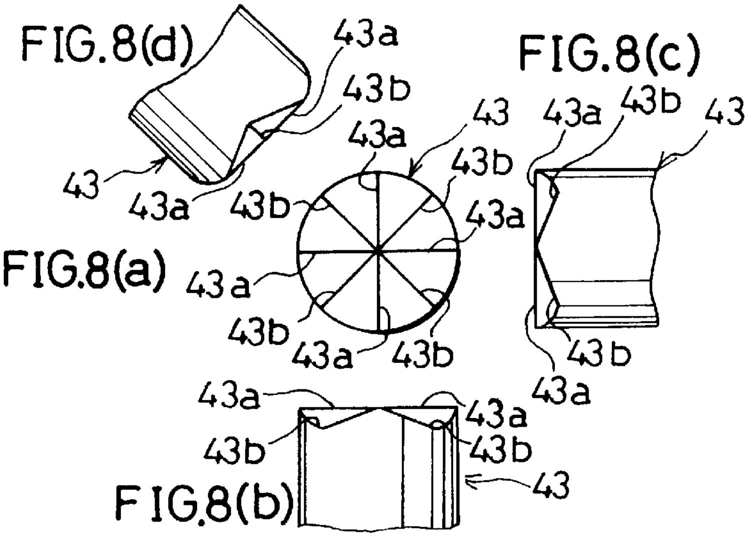
FIG.8(d)
FIG.8(c)
FIG.8(a)
FIG.8(b)
FIG.9
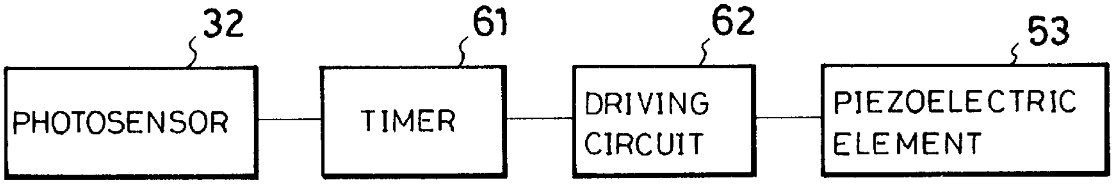

V = 100 [mm/sec]

V = 200 [mm/sec]

V = 400 [mm/sec]

PAPER-PUNCHING DEVICE FOR USE IN AN IMAGE-FORMING APPARATUS

This is a Rule 62 Continuation application of application Ser. No. 08/357,217, filed Dec. 13, 1994, now abandoned.

FIELD OF THE INVENTION

The present invention relates to a paper-punching device for use in an image-forming apparatus, which forms holes through sheets of paper that have been subjected to image-forming operations in an apparatus such as a copying machine.

BACKGROUND OF THE INVENTION

Some of conventional image-forming apparatuses are provided with a paper-punching device for forming holes through sheets of paper in order to improve the efficiency of jobs for sorting the sheets of paper that have been subjected to the image-forming operations into a set of documents. Moreover, in recent years, with the wide spread of office automation apparatuses for handling sheets of paper, such as used in copying machines for ordinary paper (PPC) and automatic paper feeders (APF), and with the trend to high-speed, highly-effective operations in those apparatuses, there have been also strong demands toward a fast, highly-efficient punching operation, which is required before filing sheets of paper that have been subjected to the copying operation.

As one example for such an paper-punching device, Japanese Laid-Out Patent Publication No. 140755/1983 (Tokukaishou 58-140755) has disclosed a paper-punching device. The following description will discuss this paper-punching device. Here, for convenience of explanation, the following example has an arrangement that is slightly different from that of the above-mentioned patent publication.

As illustrated in FIG. 58, in the above-mentioned paper-punching device, a sheet of paper P is transported by transport rollers 303 and 304 from the upstream side on a base 301 while it is restricted in its upward dislocation by a transport guide 302. When the leading edge of the sheet of paper P passes through a light path of a photosensor 305 of the reflection type, the leading edge of the sheet of paper P is detected by the photosensor 305. Then, a stopper 306, located on the downstream side of the photosensor 305, moves upward from its stand-by station, and presses the leading edge of the sheet of paper P, thereby stopping the transportation of the sheet of paper P.

Immediately after the stoppage of rotation of the transport roller 304, a punching blade 307 is shifted down toward a punching die 308 that is provided in the base 301, and the sheet of paper P is thus punched by the punching blade 307. At this time, the transport roller 304, located on the downstream side, is stopped in its rotation, while the transport roller 303, located on the upstream side, is being rotated.

Therefore, the sheet of paper P is transported by the transport roller 303 from the rear-edge side, and is warped inside a warp-space 302*a* that is provided in an upward-raised form between the transport roller 303 and the transport roller 304 in the transport guide 302. With this arrangement, the transportation of the sheet of paper P is not stopped completely. Further, since the pressing force of the stopper 306 exerted onto the sheet of paper P is increased, the sheet of paper P does not retreat even upon the punching operation.

However, in the paper-punching device as described in the above-mentioned patent publication, the leading edge of the sheet of paper P is temporarily stopped even if it is for a short period of time. Therefore, when the operation speeds of the image-forming process and other related processes are increased beyond a certain limit, the next paper is transported although the proceeding paper has not been subjected to the punching operation; this causes troubles such as paper jams. Moreover, the sheet of paper P might be damaged when it is warped. Furthermore, if the sheet of paper P is thick paper weighing not less than 228 g/m$^2$, it is not allowed to warp, thereby making it difficult to keep transporting sheets of paper P by the use of the transport roller 303 during the punching operation. Another problem is that it is not possible to form punch holes on the rear side of the sheet of paper P due to the structure of the paper punching device.

Moreover, although not described in detail here, another paper-punching device for use in an electrophotographic apparatus has been known to the art, wherein a punching operation is carried out with a sheet of paper P completely stopped, and after the punching operation the transportation is resumed. In this type of paper-punching device, it is possible to install the punching mechanism either on the leading side or on the rear side of the sheet of paper P. However, since the punching operation is carried out after stopping the sheet of paper completely, it is impossible to increase the speed of the operation.

Another example is Japanese Laid-Out Patent Publication No. 190696/1991 (Tokukaihei 3-190696), which discloses an arrangement wherein a paper-punching device, which has two punching claws that are disposed in the direction orthogonal to the transporting direction of a sheet of paper at positions corresponding to an interval between punch holes, is installed on the paper-discharging side of a copying machine; and sheets of copy paper, which are discharged successively by discharge rollers after having been subjected to the copying operation, are subjected to punching operations that are carried by activating both of the punching claws at the same time by using a cam that operates in synchronism with the discharge rollers that are discharging the sheets of paper.

However, in this arrangement the two punching claws for forming punch holes are disposed at predetermined positions that correspond to the punching positions that are located in the direction orthogonal to the transporting direction of a sheet of paper; this fails to deal with differences in the punch-hole intervals and the number of punch holes. Therefore, the problem of this arrangement is that it is necessary to provide as many punching claws as the number of punch holes and allow these punching claws to have the corresponding punch-hole intervals, thereby making the construction more complicated and expensive. Further, the sheet of paper P has to be temporarily stopped upon forming punch holes; therefore, in the case when the operation speeds of the image-forming process and other related processes are increased, problems such as planar jams might be caused in the same manner as in the paper-punching device disclosed in Japanese Laid-Out Patent Publication No. 140755/1983 (Tokukaishou 58-140755). This makes it difficult to achieve a high-speed operation.

In contrast, for example, Japanese Laid-Out Patent Publication No. 105895/1992 (Tokukaihei 4-105895) discloses another paper-punching device wherein a piezo-electric element that enables an extremely high-speed operation is used as the source of driving force of the punching claw; a sheet edge sensor, which detects the position of the leading edge of a sheet of paper in the transporting direction, is disposed at a position a predetermined distance apart from the punching claw, the distance being equal to a distance from the detected paper edge to the first punch hole in the transporting direction; and a punch-hole sensor is disposed at a position a predetermined distance apart from the punching claw, the distance being equal to an interval between the punch holes. In this paper-punching device, the first punch hole is formed in the sheet of paper by the punching claw in response to the detection of the position of the leading edge of paper made by the sheet-edge sensor; and the second punch hole is formed in the sheet of paper by activating the punching claw in response to the detection of the first punch hole made by the punch-hole sensor, with a predetermined punch-hole interval from the first punch hole.

With this arrangement, for example, in the case of forming two punch holes in a sheet of paper, the leading edge of the transported paper is first detected by the sheet-edge sensor, and in response to the detection, the punching claw is activated once, thereby forming the first punch hole. Thereafter, when the sheet of paper is further transported, the first punch hole is detected by the punch-hole sensor, and in response to the detection, the punching claw is further activated one more time, thereby forming the second punch hole. This arrangement eliminates the necessity of having to install as many punching claws as the number of punch holes and having to align these punching claws with the corresponding punch-hole intervals; thus, one punching claw is allowed to deal with differences in punch-hole intervals and in the number of punch holes, thereby making the device simpler and less expensive; and it becomes possible to form punch holes without the necessity of stopping the transportation of a sheet of paper.

In the arrangement disclosed in Japanese Laid-Out Patent Publication No. 105895/1992 (Tokukaihei 4-105895), the punching claw is fixed to a predetermined position corresponding to the punching position in parallel with the transporting direction of paper. Therefore, as to punching positions along the transporting direction, various changes may be provided by changing the driving timing of the punching device. However, as to punching positions in the direction orthogonal to the transporting direction, setting in desired positions is not allowed because of their fixed state.

For this reason, this paper-punching device is applicable to copying machines and other apparatuses wherein sheets of paper are aligned along one side of the transport path and transported; however, it is not applicable to copying machines and other apparatuses of the so-called center-oriented type, wherein sheets of paper are positioned based on the center of the transport path and transported.

In order to solve this problem, there has been proposed another arrangement which has a plurality of punching claws that are aligned in the direction orthogonal to the transporting direction of paper, for example, at punching positions corresponding to the respective sizes of sheets of paper that are transported on the center basis. However, this arrangement requires individual driving sections for driving the respective punching claws, thereby making the construction more complicated as well as causing high costs because a lot of expensive piezoelectric elements are needed.

SUMMARY OF THE INVENTION

It is an objective of the present invention to provide a paper-punching device for use in an image-forming apparatus which enables a high-speed punching operation without the necessity of reducing the transporting speed of paper or stopping sheets of paper. It is another objective of the present invention to provide a paper-punching device which is applicable to copying machines and other apparatus that are oriented based on their center line without causing high costs and complicated structures in the apparatus, even when it forms punch holes in the transporting direction paper by using only one punching blade, and which is capable of forming punch holes in the direction orthogonal to the transporting direction of paper at desired positions by desired number by using one punching blade, without the necessity of stopping the sheets of paper. Further, it is another objective of the present invention to provide a paper-punching device which is capable of eliminating defective sheets of paper that might be caused due to erroneous punching processes, by the use of a decision-making process as to whether or not the punching operation is feasible depending on the size of sheets of paper prior to forming punch holes.

In order to achieve a above-mentioned objectives, the first paper-punching device for use in an image-forming apparatus of the present invention is provided with: a guiding means for guiding a sheet of paper in a predetermined direction; a punching blade for forming a punch hole in the sheet of paper, the punching blade being installed in the guiding means; a driving means for driving the punching blade, and transport rollers for constantly conveying the sheet of paper, the transport rollers being installed on the downstream side from the punching blade in the guiding means, the transport rollers being allowed to slip a predetermined amount with respect to the sheet of paper when the sheet of paper is caught by the punching blade, and is characterized in that the product of the time during which the sheet of paper is caught by the punching blade and the transporting speed exerted by the transport rollers is maintained at a predetermined value.

In the first paper-punching device, when a sheet of paper is transported by the transport rollers along the guiding means and the rear edge of the sheet of paper reaches a predetermined position, the punch driving means is activated. Therefore, punch holes are formed in the sheet of paper at positions a predetermined distance apart from the rear edge.

Here, since the transport rollers rotate all the time, the transportation of the sheet of paper is continued even when it is punched by the punching blade. For this reason, if the punching operation takes even slightly too long, the sheet of paper is pulled by the transport rollers even though it is caught by the punching blade. However, in accordance with the present invention, when the sheet of paper is caught by the punching blade, the transport rollers are allowed to slip a predetermined amount with respect to the sheet of paper. This slip absorbs the pulling force that is exerted on the sheet of paper by the transport rollers. In particular, when one of the transport roller is made of rubber and the other transport roller is made of a foamed material, it is possible to provide a preferable slipping property.

Moreover, in the case when the time during which the paper is caught by the punching blade is long, such as in the case of using thick paper, the damage to the sheet of paper caused by the punching blade is reduced by decreasing the transporting speed. In contrast, when the time during which the paper is caught by the punching blade is short, such as in the case of using normal thickness paper, damage to the sheet of paper caused by the punching blade is not increased even if the transporting speed is increased. In other words, under a condition where the transport rollers are allowed to slip with respect to paper, an arrangement wherein the product of the time during which the sheet of paper is caught by the punching blade and the transporting speed exerted by the transport rollers is maintained at a predetermined value makes it possible to reduce damage to the sheet of paper caused by the punching blade. The above-mentioned value can be empirically determined by experiments shown in the embodiments described later.

In accordance with a first paper-punching device, the sheet of paper is transported on the downstream side from the punching blade; therefore, it is possible to eliminate warping in the sheet of paper and to eliminate damage to the sheet of paper caused by warping. Further, it is possible to form punch holes even in thick paper that is hardly warped. Moreover, since the punching blade is disposed on the upstream side from the transport rollers, the punching operation is carried out on the rear-edge side of the sheet of paper. When a stapling operation is carried out simultaneously with the punching operation, this arrangement allows both of the operations to be carried out on the rear-edge side of the sheets of paper, thereby improving the efficiency of the operations.

In order to achieve the above-mentioned objectives, a second embodiment of a paper-punching device for use in an image-forming apparatus of the present invention is provided with: a guiding means for guiding a sheet of paper in a predetermined direction; a plurality of punching blades for forming punch holes in the sheet of paper, the punching blades being installed in the guiding means with predetermined intervals along a straight line that tilts at a predetermined angle with respect to the direction orthogonal to the transporting direction; transport rollers for constantly carrying the sheet of paper, the transport rollers being installed on the downstream side from the punching blade in the guiding means; a plurality of driving means for driving the punching blades individually; and a driving circuit for activating the driving means successively, starting with the one closest to the rear edge of the sheet of paper, with predetermined time-intervals.

In the second embodiment of a paper-punching device for use in an image-forming apparatus, the respective punching blades are driven by the individual driving means, but these driving means are controlled by a driving circuit as a whole. Therefore, this arrangement eliminates the necessity of installing driving circuits to the respective driving means individually, thereby making it possible to reduce the number of parts. In this case, the driving circuit, which is not allowed to activate the respective driving means at the same time, activates each driving means in succession with predetermined time-intervals.

Here, the sheet of paper is being transported even during the punching operation; therefore, it is necessary to adjust the punching positions in the transporting direction in the case when the driving means are individually activated and the respective punching blades form punch holes at different times. For this reason, the punching blades are installed along a straight line that tilts at a predetermined angle with respect to the direction orthogonal to the transporting direction, and the driving means are activated in succession, starting with the punching blade closest to the rear edge of the sheet of paper. This arrangement makes it possible to eliminate misalignment of the punching positions in the transporting direction. Thus, the punch holes formed by the punching blades are aligned virtually in parallel with the rear edge of the sheet of paper.

More preferably, the following arrangement may be adopted: In the case when the driving circuit activates the respective driving means successively, supposing that a time-interval T after activation of a certain driving means, the next driving means is activated, the punching position has an offset of VT with respect to the transporting direction within the time-interval T when the sheet of paper is being transported at the transporting speed V. Therefore, in order to align the respective punch holes along one straight line, each having a constant distance from the rear edge of the sheet of paper, the value obtained by dividing VT by the distance x between the punching blades in the direction orthogonal to the transporting direction, that is, the interval between the punch holes, should be equal to the tangent to the predetermined angle ($\theta$). In other words, the relationship indicated by $\tan\theta = V \cdot T/x$ should be satisfied. Therefore, if the driving circuit activates the respective driving means in succession with the time-intervals T while satisfying $T = x \cdot \tan\theta / V$, it becomes possible to form punch holes at the proper positions as described above.

In order to achieve the above-mentioned objectives, a third embodiment of a paper-punching device for use in an image-forming apparatus is provided with: a guiding means for guiding a sheet of paper in a predetermined direction; a punching blade for forming a punch hole in the sheet of paper, the punching blade being installed in the guiding means; transport rollers for constantly carrying the sheet of paper, the transport rollers being installed on the downstream side from the punching blade in the guiding means; discrimination means for discriminating whether the sheet of paper is normal paper having a thickness not more than a predetermined thickness, or thick paper having a thickness exceeding the predetermined thickness; a driving means having a first driving source for driving the punching blade with a driving force that is suitable for normal paper and a second driving source for driving the punching blade with a driving force that is suitable for thick paper; a selective control means for activating the first driving source when the discrimination means shows that the sheet of paper is normal paper, while activating the second driving source when the discrimination means shows that the sheet of paper is thick paper; and a transport control means for activating the transport rollers during the activation of the first driving source, while stopping the transport rollers during the activation of the second driving source.

In this third embodiment of a paper-punching device, when a judgement is made by the discrimination means as to whether the sheet of paper is normal paper, or thick paper, the first or second driving source is selected and driven by the selective control means in accordance with the result of the judgement. Thus, punch holes are formed by using the driving force that is suitable for the sheet of paper. Further, the transport control means activates the transport rollers during the activation of the first driving source, and stops the transport rollers during the activation of the second driving source; this makes it possible to provide a high-speed operation during the punching operation for normal paper.

In order to achieve the above-mentioned objectives, a fourth embodiment of a paper-punching device for use in an image-forming apparatus is provided with: a guiding means for guiding a sheet of paper in a predetermined direction; a punching blade for forming a punch hole in the sheet of paper, the punching blade being installed in the guiding means; transport rollers for constantly carrying the sheet of paper, the transport rollers being installed on the downstream side from the punching blade in the guiding means; a driving means for driving the punching blade; and an idle-driving control means for activating the driving means so that the punching blade is driven in a specific period of time when there is no paper at the punching position in the guiding means.

In this fourth embodiment paper-punching device, the idle-driving control means activates the driving means so that the punching blade is driven in a specific period of time when there is no paper at the punching position in the guiding means. This arrangement makes it possible to prevent the punching blade from being held at the punching position in the guiding means due to an insufficient driving operation, as well as preventing paper jams that occur when the sheet of paper is improperly caught by the punching blade.

In a preferable application of the fourth embodiment of a paper-punching device, a paper-detection means, such as an optical sensor, is provided to detect the presence or absence of paper at the punching position, and according to this detection, it is possible to recognize the specific period of time when there is no paper at the punching position. Further, in a more preferable application, the idle-driving control means is arranged to inform the fact that there is paper at the punching position; this makes it possible for the user to take necessary steps to correct a paper jam.

In order to achieve the above-mentioned objectives, a fifth embodiment of a paper-punching device for use in an image-forming apparatus is provided with: a guiding means for guiding a sheet of paper in a predetermined direction; a transporting means for transporting the sheet of paper along the guiding means; a punching means having a punching blade for forming a punch hole in the sheet of paper that is being transported by the transporting means, the punching means being installed in the guiding means; and a shifting means for shifting the punching means in the transverse direction with respect to the guiding means.

In this fifth embodiment of a paper-punching device, the shifting means shifts the punching means in the transverse direction with respect to the guiding means, thereby allowing the punching means to move with respect to the sheet of paper. Thus, it becomes possible to form punch holes at desired positions in the direction orthogonal to the transporting direction of the sheet of paper. Therefore, this paper-punching device is applicable to copying machines and other apparatuses of the center-oriented type wherein sheets of paper are positioned based on the center of the transport path and transported, without the necessity of a complicated structure and without causing high costs. Further, since the punching means is movable with respect to the sheet of paper, one of the resulting advantages is that even if the sheet of paper is dislocated inside the transport path in the width-wise direction, the position of the punching means is corrected by calculating the amount of compensation for the dislocation and punch holes are formed at accurate positions.

In a preferable application of the fifth paper-punching device, the shifting means is arranged to shift the punching means from the predetermined position in the guiding means toward the downstream side, along a straight line that tilts at a predetermined angle with respect to the direction orthogonal to the transporting direction, at a speed whose component in the transporting direction is not less than the transporting speed of paper. Further, in this application, a rear-edge detection means is provided on the upstream side from the punching blade, and when the rear edge of a sheet of paper is detected by the rear-edge detection means, the punching means is shifted to a predetermined punching position so as to form a punch hole. In addition, during the punching operation, the punching means and the shifting means are controlled so that the distance between each punch hole and the rear edge is kept at the same value. Therefore, it is possible to form punch holes at a plurality of desired positions in the direction orthogonal to the transporting direction by using only one punching means.

For a fuller understanding of the nature and advantages of the invention, reference should be made to the ensuing detailed description taken in conjunction with the accompanying drawings.

DESCRIPTION OF THE EMBODIMENTS

FIG. 3(*b*) is a vertical cross-sectional view showing an operational state during a punching operation of the punching unit in the copying machine in accordance with the first embodiment of the present invention.

FIG. 6(*b*) is a front view illustrating the shape of the punching blade that is not suitable for the punching unit.

FIG. 6(*c*) is a side view illustrating the shape of the punching blade that is not suitable for the punching unit.

FIG. 7(*b*) is a cross-sectional view taken along the line A—A of FIG. 7(*a*) illustrating the shape of another punching blade that is not suitable for the punching unit.

FIG. 8(*a*) is a plan view illustrating the shape of a punching blade that is suitable for the punching unit.

FIG. 8(*b*) is a front view illustrating the shape of the punching blade that is suitable for the punching unit.

FIG. 8(*c*) is a side view illustrating the shape of the punching blade that is suitable for the punching unit.

FIG. 8(*d*) is a view when seen from a position making an angle of 45 degrees from the backward direction, illustrating the shape of the punching blade that is suitable for the punching unit.

FIG. 9 is a block diagram showing a control system for controlling the operation of a punching device in the punching unit.

FIG. 11(*b*) is a histogram indicating the frequency of occurrence of troubles when punching operations were carried out by the punching unit at a transporting speed of 200 mm/sec, wherein rubber transport rollers were used.

FIG. 11(*c*) is a histogram indicating the frequency of occurrence of troubles when punching operations were carried out by the punching unit at a transporting speed of 400 mm/sec, wherein rubber transport rollers were used.

FIG. 12(*b*) is a histogram indicating the frequency of occurrence of troubles when punching operations were carried out by the punching unit at a transporting speed of 200 mm/sec, wherein polyurethane-foam transport rollers were used.

FIG. 12(*c*) is a histogram indicating the frequency of occurrence of troubles when punching operations were carried out by the punching unit at a transporting speed of 400 mm/sec, wherein polyurethane-foam transport rollers were used.

FIG. 13(*b*) is an explanatory drawing that shows defective punch holes caused in a sheet of paper in the experiments.

FIG. 13(*c*) is an explanatory drawing that shows scratches caused on a sheet of paper by the rollers in the experiments.

FIG. 28(*b*) is a cross-sectional view taken along the line D—D in FIG. 28(*a*) that shows the arrangement of the punch-scraps collecting device that is provided in the shifting-type punching device of FIG. 25.

FIG. 29(*b*) is a cross-sectional view taken along the line C—C in FIG. 29(*a*) that shows the shape of the punch-scraps receiving section of the punch-scraps collecting device.

FIG. 40(*b*) is an explanatory drawing that shows defective punch holes that are formed close to the edges of a sheet of paper.

FIG. 40(*c*) is an explanatory drawing that shows a tear developed in a sheet of paper from one of the punch holes.

FIG. 40(*d*) is an explanatory drawing that shows defective punch holes that are caused by dislocation of a sheet of paper.

FIG. 41(*b*) is an explanatory drawing that shows punch holes that have the same interval as the punch holes of FIG. 41(*a*) and that are formed along the short-side edge of a sheet of paper.

FIG. 43(*b*) is an explanatory drawing that shows a warning message to be displayed on the display panel in the case when the length of a sheet of paper is too short in the erroneous-copying preventive control of FIG. 42.

FIG. 43(*c*) is an explanatory drawing that shows a warning message to be displayed on the display panel in the case when a sheet of paper in question is out of the regular sizes in the erroneous-copying preventive control of FIG. 42.

FIG. 43(*d*) is an explanatory drawing that shows a warning message to be displayed on the display panel in the case when the orientation of a sheet of paper is not proper in the erroneous-copying preventive control of FIG. 42.

FIG. 45(*b*) is an explanatory drawing that shows a warning message to be displayed on the display panel in the case when the length of a sheet of paper is too short in the erroneous-copying preventive control of FIG. 44.

FIG. 45(*c*) is an explanatory drawing that shows a warning message to be displayed on the display panel in the case when a sheet of paper in question is out of the regular sizes in the erroneous-copying preventive control of FIG. 44.

FIG. 45(*d*) is an explanatory drawing that shows a warning message to be displayed on the display panel in the case when the orientation of a sheet of paper is not proper in the erroneous-copying preventive control of FIG. 44.

FIG. 47(*b*) is an explanatory drawing that shows a warning message to be displayed on the display panel in the case when the length of a sheet of paper is too short in the erroneous-copying preventive control of FIG. 46.

FIG. 47(*c*) is an explanatory drawing that shows a warning message to be displayed on the display panel in the case when a sheet of paper in question is out of the regular sizes in the erroneous-copying preventive control of FIG. 46.

FIG. 47(*d*) is an explanatory drawing that shows a warning message to be displayed on the display panel in the case when the orientation of a sheet of paper is not proper in the erroneous-copying preventive control of FIG. 46.

DESCRIPTION OF THE EMBODIMENTS

[EMBODIMENT 1]

Referring to FIGS. 1 through 13, the following description will discuss the first embodiment of the present invention.

Figure 1:
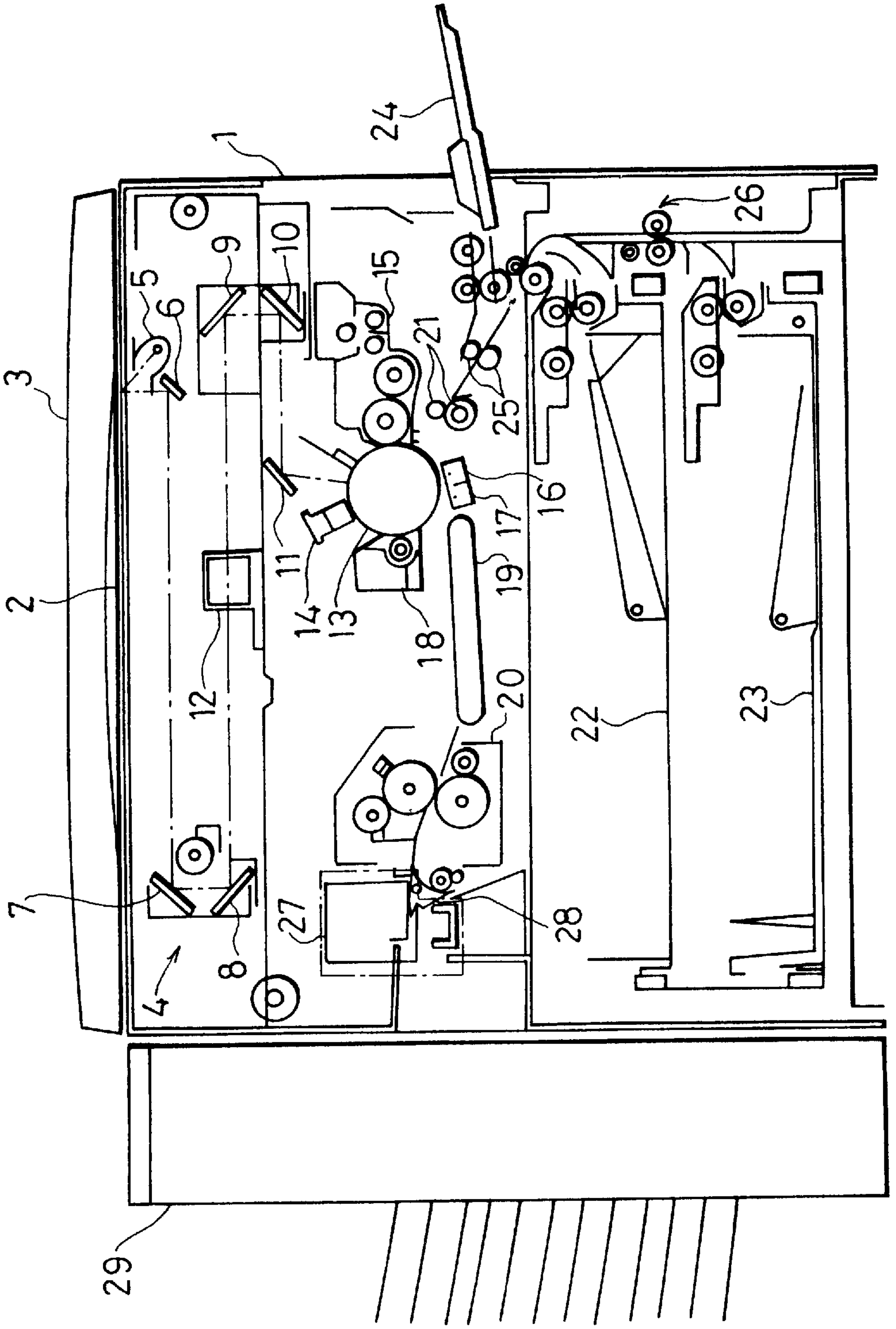
FIG. 1 is an explanatory drawing that shows the internal structure of a copying machine that is commonly used in the respective embodiments of the present invention.
Figure 2:
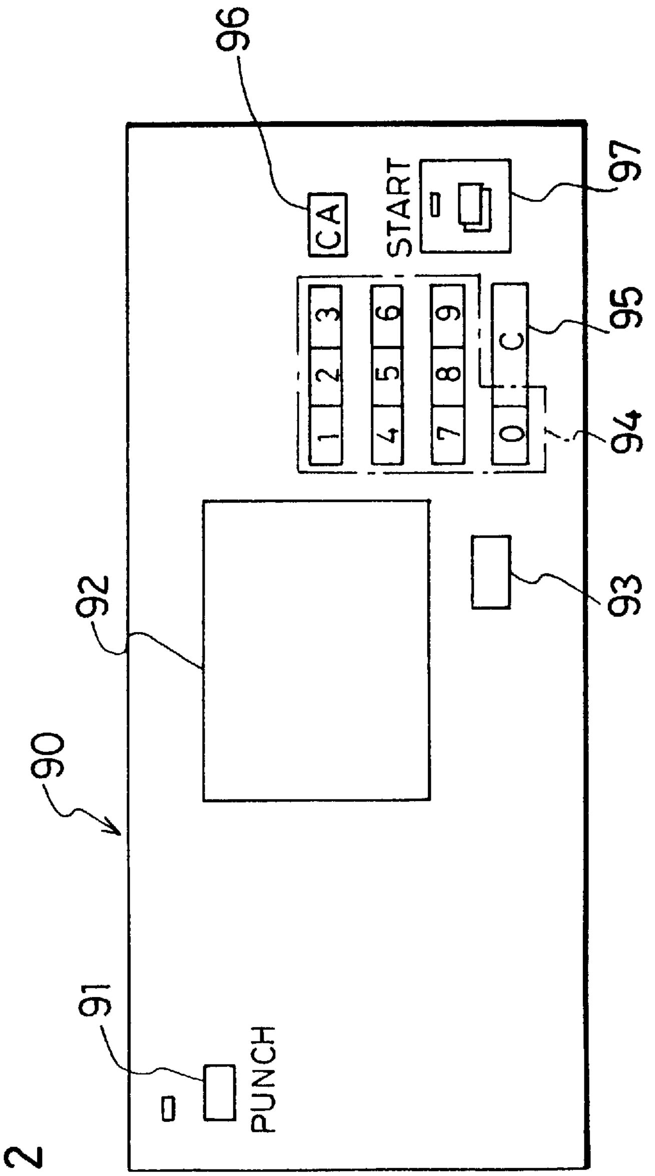
FIG. 2 is an explanatory drawing that shows an operation section installed on the top of the copying machine of FIG. 1.

As illustrated in FIG. 1, in a copying machine in accordance with the present embodiment, a transparent document platen 2, on which an original to be copied is placed, is installed on the top surface of the apparatus main body 1, and a document cover 3 for covering the document platen 2 is also installed thereon. Further, an operation section 90, shown in FIG. 2, is installed on the top surface of the apparatus main body 1.

The operation section 90 is provided with: a punch key 91 for specifying a punch mode; a display panel 92 for displaying messages; an input key 93; ten keys 94; a clear key 95 for ten keys; a canceling key 96; and a print key 97. The user is allowed to specify various factors, such as various modes, the number of copies, the number of punched holes in the punch mode, and positions of punched holes, through the operation section 90. Moreover, various special modes, such as a thick-paper mode for carrying out a copying operation on sheets of thick paper, a cover mode, and an insert mode, are specified through the operation section 90.

As illustrated in FIG. 1, an optical system 4 is installed below the document platen 2. The optical system 4 is constituted of a copy lamp 5 which is a halogen lamp or other lamps, a plurality of mirrors 6 through 11, and a lens unit 12. The mirrors 6 though 11 are arranged so that a light beam projected from the copy lamp 5 is directed to the original placed on the document platen 2, and so that the reflected light beam from the original is directed to a photoreceptor 13, which will be described later, as is indicated by an alternate long and short dash line. Further, the lens unit 12 has a function for refracting and converging the reflected light beam so as to allow it to form a clear image on the photoreceptor 13.

Below the optical system, is located a copy process section which has the photoreceptor 13 as its main device. On the periphery of the photoreceptor 13, are disposed a main charger unit 14, a developing unit 15, a transferring charger 16, a separating charger 17, a cleaning unit 18 and other devices. Further, the copy process section also includes a belt-shaped suction unit 19 that is installed on the paper-discharging side of the photoreceptor 13, and a fixing device 20 that is installed on the paper-discharging side of the suction unit 19.

Below the developing unit 15, are disposed paired register rollers 21 for supplying sheets of paper to the photoreceptor 13 in proper timing. Further, below the copy process section, are disposed feeding cassettes 22 and 23 for housing sheets of paper of respective sizes. Moreover, a manual feeding tray 24 is attached to the side wall on the developing unit 15 side in the apparatus main body 1. Furthermore, a transporting device 26, which has transporting rollers 25 and other members so as to transport sheets of paper, is installed between the register rollers 21, the feeding cassettes 22, 23 and the manual feeding tray 24. Thus, the register rollers 21, the feeding cassettes 22 and 23, the manual feeding tray 24, and the transporting device 26 constitute a feeding section.

On the paper-discharging side of the fixing device 20, are installed a paper-punching device 27, which is related to the present invention and will be described later in detail, and a separation gate 28 for selectively delivering sheets of paper between the feeding cassette 22 and outside of the apparatus main body 1. Further, a staple sorter 29 for ejecting sheets of paper, and other devices are attached to the outer wall on the paper-discharging side of the paper-punching device 27 in the apparatus main body 1.

In the copy process section, when the reflected light beam, which has been directed from the original through the optical system 4, forms an image on the photoreceptor 13 that is charged by a predetermined voltage applied from the main charger unit 14, an electrostatic latent image corresponding to the image of the original is formed on the photoreceptor 13. Then, the electrostatic latent image is visualized by toner supplied from the developing unit 15 to form a toner image. This toner image is transferred by the transferring charger 16 onto a sheet of paper that is fed from the feeding cassette 22 or 23 or the manual feeding tray 24. The sheet of paper bearing the toner image transferred thereon is separated from the photoreceptor 13 by the separating charger 17, and is transported by the suction unit 19 to the fixing device 20, where the toner image is fixed onto the sheet of paper by heat.

After completion of the copying process as described above, the sheet of paper is subjected to a punching process at the paper-punching device 27, and is directed to the staple sorter 29 through the separation gate 28. Then, the sheet of paper is subjected to a stapling process and a sorting process at the staple sorter 29, and is discharged. Here, in the case of a double-sided copying operation, the sheet of paper, which has passed through the fixing device 20, is directed to the feeding cassette 22 by the separation gate 28, and is subjected to a copying process on the back side.

Here, the punching process is carried out by the paper-punching device 27 only when the punch key 91 on the operation section 90 is pressed so that the punch mode is on.

The copying machine of the present embodiment is provided with a punching unit 30 as the paper-punching device 27. The following description will discuss the arrangement of the punching unit 30.

Figure 3A:
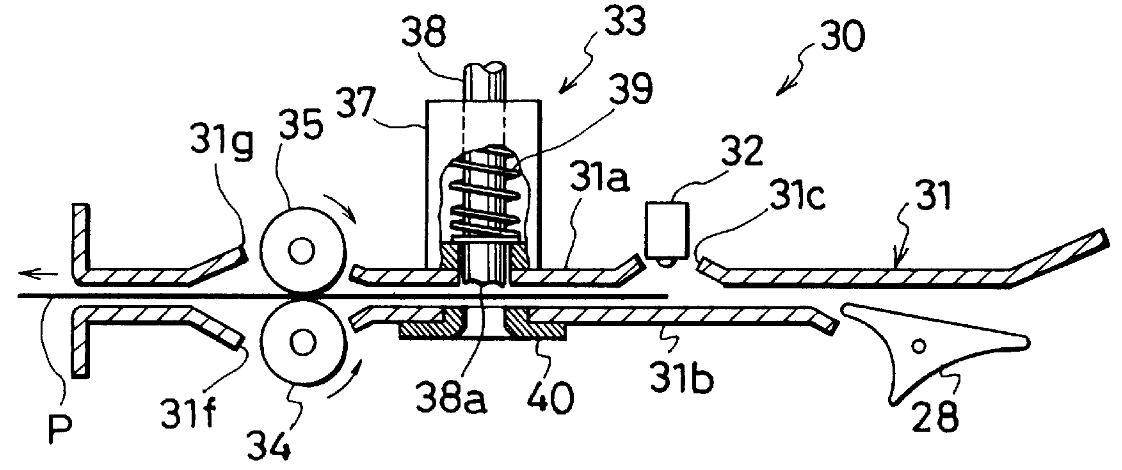
FIG. 3(*a*) is a vertical cross-sectional view of a punching unit in the copying machine in accordance with the first embodiment of the present invention.
Figure 3B:
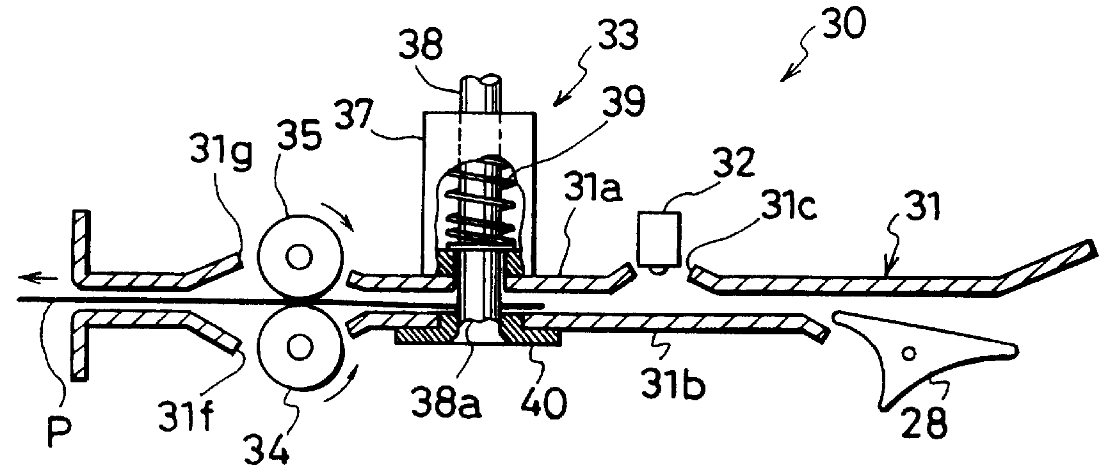
Figure 4:
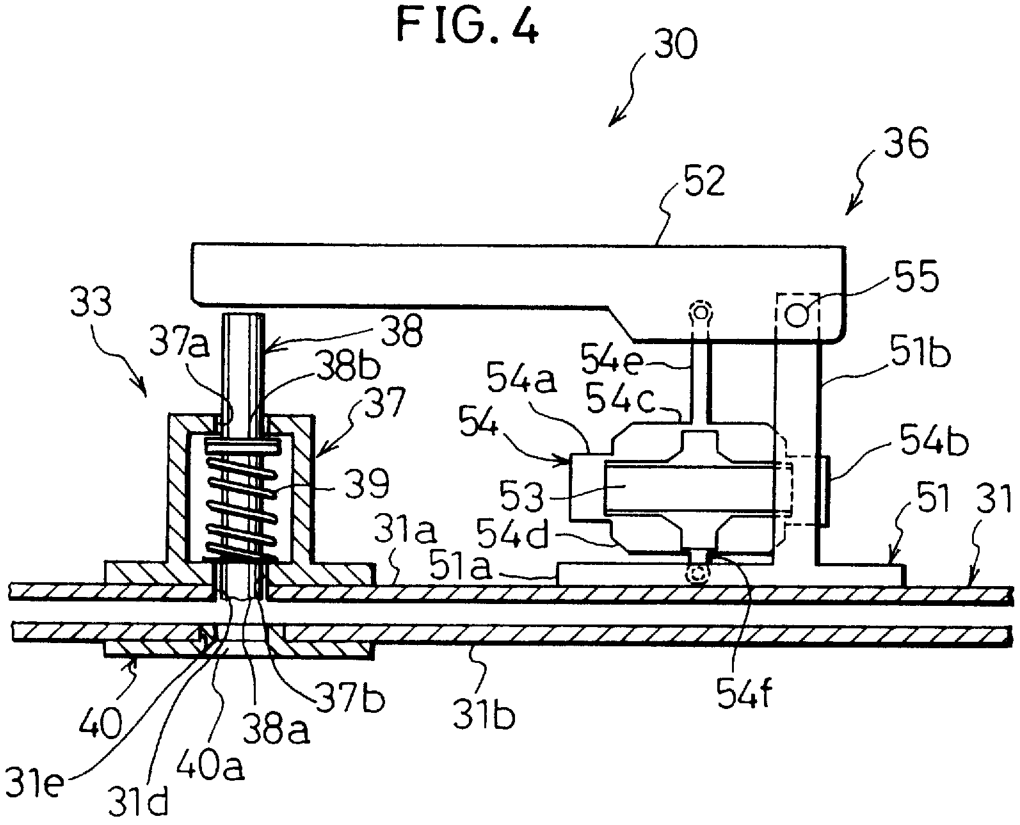
FIG. 4 is a vertical cross-sectional view of the punching unit when seen from the downstream side of a transport guide.

As illustrated in FIG. 3(*a*) and FIG. 4, the punching unit 30 is constituted of a transport guide 31, a photosensor 32, a punching device 33, a driving roller 34, a driven roller 35, and a driving device 36.

The transport guide 31, which is constituted of two plates, an upper plate 31*a* and a lower plate 31*b*, that are disposed at upper and lower position;; in parallel with each other, is designed to direct sheets of paper P from the separation gate 28 toward the paper-discharging side, as well as regulating the dislocation of the sheets of paper P in the longitudinal direction. An opening 31*c* is provided in the upper plate 31*a* on the downstream side (on the staple sorter 29 side) of the separation gate 28. The photosensor 32 is installed at this opening 31*c*.

The photosensor 32 is a so-called optical sensor of the reflection type. The photosensor 32 projects light downward, and upon receipt of the reflected light from a sheet of paper P being transported through the transport guide 31, it releases a detection signal that indicates the passage of the sheet of paper P. Therefore, the photosensor 32 is used for detecting tie rear edge of the sheet of paper P when it stops releasing the detection signal, thereby functioning as a rear-edge detection means.

The punching device 33 is installed on the downstream side from the opening 31*c* in the transport guide 31. The punching device 33 is constituted of a housing case 37, a punching member 38, a resetting spring 39, and a punching die 40. Further, as many punching devices 33 as the number of punch holes required for the sheets of paper P are installed side by side in the direction perpendicular to the paper surface in FIG. 3(*a*) with predetermined intervals.

FIG. 4 is a drawing that is obtained when FIG. 3(*a*) is seen from the downstream side. Referring to this drawing, the following description will discuss the housing case 37 in detail. The housing case 37 has a space inside such that the punching member 38 is allowed to move up and down and the resetting spring 39 is allowed to extend in a predetermined range. Moreover, the housing case 37 has through holes 37*a* and 37*b* provided in its top face and bottom face, which allow the punching member 38 to penetrate therethrough. The through hole 37*b* coincides with an opening 31*d* that is provided in the upper plate 31*a*.

The punching member 38, which has a cylindrical shaft shape in a whole view, is provided with a punching blade 38*a* at its bottom end and a collar portion 38*b* around its virtually middle portion.

Figure 6C:
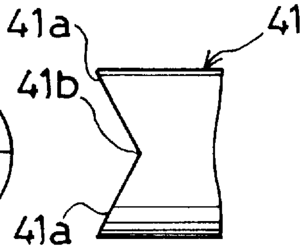
FIG. 6(*a*) is a plan view illustrating the shape of a punching blade that is not suitable for the punching unit.
Figure 6A:
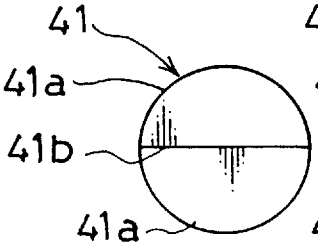
Figure 6B:
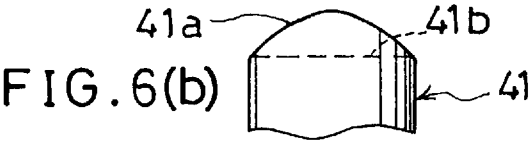
Figure 7A:
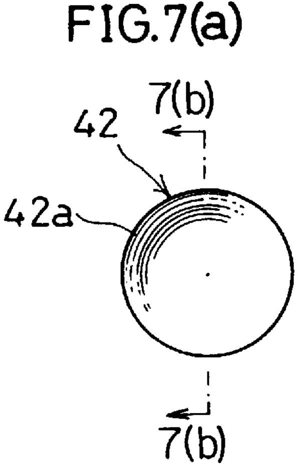
FIG. 7(*a*) is a plan view illustrating the shape of another punching blade that is not suitable for the punching unit.
Figure 7B:
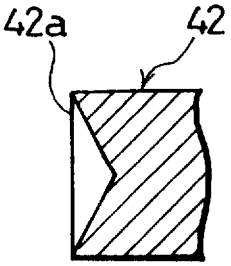

A blade 41, shown in FIGS. 6(*a*) through 6(*c*), or a blade 42, shown in FIGS. 7(*a*) and 7(*b*), may be adopted as the punching blade 38*a*.

The blade 41, which is common-y used in manual punching devices, has two blade tops 41*a* with a deep recessed portion 41*b* between the blade tops 41*a*. In this case, however, when the blade 41 is used to form a punch hole in a sheet of paper P, only the blade tops 41*a* stick into the sheet of paper P at its initial stage of the punching operation. When the transporting force is applied to the sheet of paper P at this state, the sheet of paper P tends to be torn easily. Therefore, the blade 41 is not suitable for a high-speed punching operation with the sheet of paper P being transported.

The blade 42, on the other hand, has a recess like a mortar on its top, and all the circumferential edge on the top forms a blade top 42*a*. Therefore even if the blade 42 is used to form a punch hole in a sleet of paper P, no trouble occurs since the blade top 42*a* stick into the sheet of paper at the same time, which is different from the case of the blade 41. In the blade 42, however, since all the portion of the blade top 42*a* has to stick into the sheet of paper P at the same time, it is necessary to provide an extremely large force as a driving torque for the punching member 38; this results in a heavy burden on the driving device 36. Therefore, it is difficult to adopt the blade 42 in an actual operation.

For this reason, a blade 43, shown in FIGS. 8(*a*) through 8(*d*), is adopted in the present punching unit 30. The blade 43 has four blade tops 43*a*, provided around its center axis, and four blade bottoms 43*b* that are formed between the adjacent blade tops 43*a*. Here, the blade tops 43*a* and the blade bottoms 43*b* are located alternately with intervals of 45 degrees. The blade 43 is designed so that the minimum stroke required for punching a hole is set to be smaller (0.8 mm) than those of the blades 41 and 42. The blade tops 43*a* are formed into a cruciform shape; therefore, upon punching a hole in a sleet of paper P, the blade tops 43*a* stick into the sheet at the same time, and it is possible to minimize the driving torque of the punching member 38, compared with the case of the blade 42. Thus, this arrangement is suitable for carrying out a punching operation on a sheet of paper P at high speeds while the sheet of paper P is being transported.

The punching die 40 is attached to the lower plate 31*b*. The punching die 40 has a tube section 40*a* at its central portion, which extends upward and has an opening at its top. The tube section 40*a*, which has a diameter slightly larger than the outer diameter of the punching member 38, is inserted into an opening 31*e* that is provided in the lower plate 31*b* so as to face the opening 31*d*. With this arrangement, when the punching member 38 is shifted downward, the punching blade 38*a* reaches the inside of the tube section 40*a*.

The resetting spring 39, which is a compression coil spring, is disposed around the punching member 38. The respective ends of the resetting spring 39 are held by the collar portion 38*b* and the bottom surface of the housing case 37. When no external downward force is applied onto the punching member 38, the resetting spring 39 urges the punching member 38 to a stand-by station, as illustrated in FIG. 3(*a*). Further, when an external downward force, which has been applied to the punching member 38, is released, the resetting spring 39 resets the punching member 38 to the stand-by station.

The driving roller 34 and the driven roller 35 are installed on the downstream side (on the staple sorter 29 side) from the punching device 33 in the transport guide 31. The driving roller 34 (hereinafter, referred to simply as the transport roller) is installed at an opening 31*f* that is provided in the lower plate 31*b*, and is driven to rotate by a motor, not shown. The driven roller 35 (hereinafter, referred to simply as the transport roller), on the other hand, is installed at an opening 31*g* that is provided in the upper plate 31*a*, and is driven to rotate by contacting the transport roller 34. The transport rollers 34 and 35 always rotate in a direction indicated by the arrow during the copying operation, thereby transporting sheets of paper P toward the downstream side.

When the transporting operation is carried out in a state where a large friction is exerted between the transport rollers 34 and 35 and the sheet of paper P, the sheet of paper P might be damaged depending on the kinds of the sheet of paper P. In other words, the sheet of paper P is pulled by the transport rollers 34 and 35 even while it is caught by the punching blade 38*a*; therefore, in the case of thin paper, the portion of the sheet of paper P that is caught by the punching blade 38*a* tends to be torn.

For this reason, in the present embodiment, a foamed material is adopted as a material of the transport roller 35 so that the transport roller 35 may slip slightly with respect to the sheet of paper P in the case when a force opposing to the transporting force (a restraint due to the punching blade 38*a*) is exerted. Materials having sponge texture may be preferably used as such a foamed material; however, those foamed materials to be used as the transport roller 35 should satisfy rigid requirements in terms of physical properties, weatherability, and other properties, in comparison with commonly-used foamed materials. The materials that satisfy those requirements include, for example, urethane foam and silicon-rubber foam.

The transport roller 35, which is made of a foamed material having such properties, presses the sheet of paper P at a virtually constant force because of its foamed structure, independent of its amount of deformation; therefore, it is possible to obtain such a slipping performance. In contrast, rubber rollers, which has a greater pressing force when deformed to a great extent, are not suitable for the transport roller 35.

Moreover, even in commonly-used arrangements wherein a rubber roller is used as the transport roller 34 and the transport roller 35 is made of POM (Polyoxymethylene), the transport roller 35 may be also allowed to slip with respect to the sheet of paper P by setting the nipping force of the transport rollers 34 and 35 smaller than usually used. When comparisons are made between the transport rollers 35 that are respectively made of urethane foam and POM, there is hardly any difference between their slipping performance as long as the nipping force of the transport rollers 34 and 35 is appropriately set.

However, in the case of POM rollers, since they have virtually rigid bodies, deviations might occur in their slipping performance unless the nipping force of the transport rollers 34 and 35 are strictly set. In other words, if the nipping force is too large, the punching operation will not be properly performed due to insufficient slipping. If the nipping force is too small, slipping might occur even during the transporting process. In contrast, in the case of urethane-foam rollers, the pressing force to the sheet of paper P is kept virtually constant independent of the amount of deformation; therefore, optimum slipping performance is obtained without the necessity of setting the nipping force as strictly as that of POM rollers.

Additionally, the difference in slipping performance between POM rollers and urethane-foam rollers will be clarified by the results of experiments which will be described later.

The driving device 36 is constituted of a support member 51, a pressing bar 52, a piezoelectric element 53, and a distortion-enlarging mechanism 54.

The support member 51, which is installed on the paper guide 31, consists of a base 51*a* and a pillar 51*b*. The base 51*a* is securely fixed on the upper plate 31*a*, and the pillar 51*b* extends upward vertically from the base 51*a*. The pressing bar 52 has its base end attached to the top end of the pillar 51*b* with a pin 55 so as to rotate freely, and has its free end extending to the top end of the punching member 38.

Figure 5:
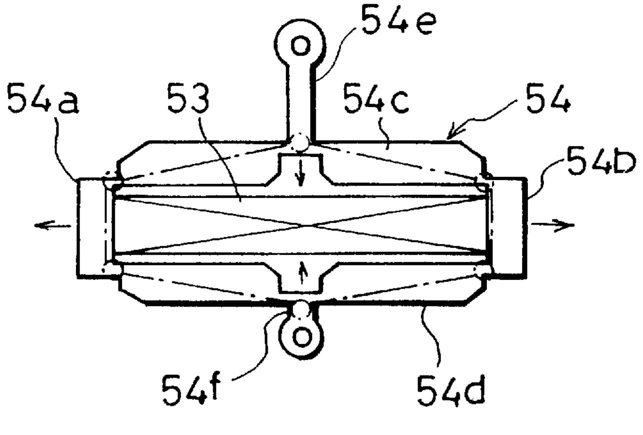
FIG. 5 is a front view showing arrangements of a piezoelectric element and a distortion-enlarging mechanism that are installed in a driving device in the punching unit.

The piezoelectric element 53 exerts a dimensional distortion through its piezoelectric effects when voltage is applied thereto. As shown in FIG. 5, the directions of the dimensional distortion include a direction extending toward the center with respect to the longitudinal direction of FIG. 5 and a direction extending outward with respect to the lateral direction of FIG. 5.

The distortion-enlarging mechanism 54, which is made of steel having a thickness in the order of 5 mm in its entire structure, is partially provided with portions that are easily distorted (portions encircled with an alternate long and short dash line) so that the entire structure is distorted by the dimensional distortion of the piezoelectric element 53. The distortion-enlarging mechanism 54 is constituted of side portions 54*a* and 54*b*, an upper portion 54*c*, a lower portion 54*d*, and connecting portions 54*e* and 54*f*, all of which surround the piezoelectric element 53.

The side portions 54*a* and 54*b* are connected to the respective ends of the piezoelectric element 53 in the lateral direction of FIG. 5. The upper portion 54*c* and the lower portion 54*d* are respectively connected to the side portions 54*a* and 54*b* through the narrowed portions that are located at the respective ends thereof, and each of them has a large notched portion at the center thereof so as to be easily distorted. With this structure, the distortion-enlarging mechanism 54 has distortions at portions indicated by alternate long and short dash lines in FIG. 5. Here, since the amounts of the distortions are slight at the distorted portions, no plastic distortion occurs.

The connecting portion 54*e* is formed into a long shape extending upward from the top end at the center of the upper portion 54*c*, and its upper end is fixed to a shaft in the pressing bar 52 at a position relatively closer to the base and farther from the free end. The connecting portion 54*f*, on the other hand, is formed into a short shape extending downward from the bottom end at the center of the lower portion 54*d*, and its lower end is fixed to a shaft in the base 51*a*.

In the driving device 36 that is arranged as described above, the dimensional distortion, which is exerted on the piezoelectric element 53 in the directions indicated by the arrows, is increased to a larger displacement by the distortion of the distortion-enlarging mechanism 54, and the displacement is transmitted to the pressing bar 52. Then, the pressing bar 52 is pulled toward the base 51*a* side so that it rotates downward centered on the pin 55. Thus, the free end of the pressing bar 52 is shifted downward, and presses the punching member 38 downward.

The following description will discuss an outline of a control system for driving the punching device 33.

As shown in FIG. 9, in this control system, a detection signal from the photosensor 32 is inputted to a timer 61. The timer 61, upon receipt of the detection signal, starts time-counting, and after counting a predetermined period of time, releases a time-counting completion signal to a driving circuit 62. The driving circuit 62 is a circuit for generating a driving voltage to be supplied to the piezoelectric element 53, and upon receipt of the time-counting completion signal from the timer 61, the driving circuit 62 releases the driving voltage.

The time that is counted by the timer 61 is determined based on the transporting speed, punch-hole positions on a sheet of paper P, the operating time of the punching device 33 and the driving device 36, and other factors. For example, supposing that the transporting speed is constant, the counting time of the timer 61 is set longer in the case of forming a hole close to the rear edge of the sheet of paper P, while the counting time of the timer 61 is set shorter in the case of forming a hole far from the rear edge of the sheet of paper P.

Here, supposing that the transporting speed is V [mm/sec] and the time during which the sheet of paper P is caught by the punching blade 38*a* is t [sec], the punching member 38 is driven under conditions where the following inequality holds so that the sheet of paper P is not damaged by the punching operation.

$$V\,[\text{mm/sec}]\times t\,[\text{sec}]\leq 1\,[\text{mm}] \quad (1)$$

More specifically, the present punching unit 30 is arranged so that the transport roller 35 is allowed to make a slip of 1 [mm] at maximum with respect to the sheet of paper P when the sheet of paper P is caught by the punching blade 38*a*. Supposing that the transporting speed is set as fast as that of commonly-used copying machines, the above-mentioned conditions are satisfied by using the piezoelectric element 53 so as to shorten the operating time of the driving device 36. In addition, the above-mentioned relationship will be further clarified by the results of experiments, which will be described later.

Figure 10:
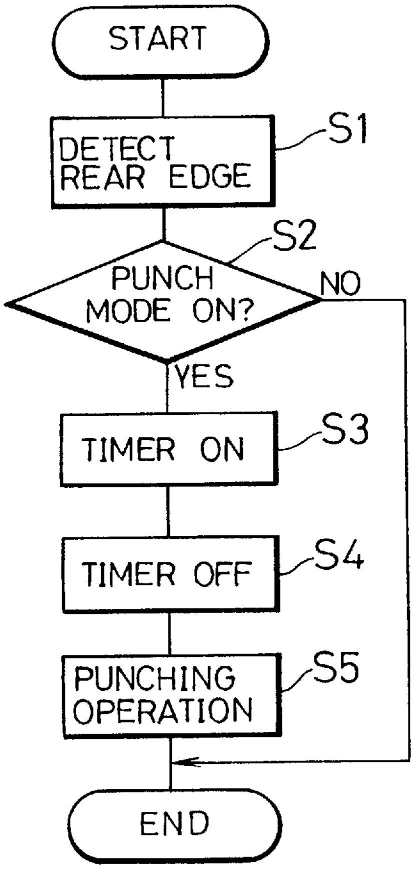
FIG. 10 is a flow chart showing a sequence of punching processes that are carried out by the punching unit.

Referring to the flow chart of FIG. 10, the following description will discuss the operation of the punching unit 30.

A sheet of paper P, which has been transported from the main body 1, is directed into the transport guide 31, and then transported by the transport rollers 34 and 35. In this case, when the rear edge of the sheet of paper P is detected by the photosensor 32 (S1), a judgement is made as to whether or not the punch mode has been specified (S2). If the punch mode has been specified, the timer 61 turns on, thereby starting time-counting (S3). The timer 61, after counting a predetermined period of time, turns off, thereby completing the time-counting (S4). Upon receipt of the OFF of the timer 61, the driving device 36 and the punching device 33 are activated, and a punching operation is carried out (S5). Here, if the punch mode is not specified at S2, the punching operation is not carried out.

During the punching operation, the driving circuit 62, upon receipt of the time-counting completion signal from the timer 61, generates a driving voltage for driving the piezoelectric element 53. Thus, in the driving device 36, a dimensional distortion occurs on the piezoelectric element 53, and the pressing bar 52 is driven downward. In the punching device 33, since the punching member 38 is depressed downward by the pressing bar 52, the punching blade 38*a* catches the sheet of paper P, and forms a punch hole, as illustrated in FIG. 3(*b*). At this time, since the transport rollers 34 and 35 are rotating, the transport roller 35 is allowed to slip with respect to the sheet of paper P when the sheet of paper P is caught by the punching blade 38*a*.

The following description will discuss the experimental results on actual punching operations that were carried out by the punching unit 30 while one portion or all portions of the sheet of paper was being transported without stop. Here, explanations will be first given on comparative examples (A) wherein both the transport rollers 34 and 35 are made of rubber, and then given on examples (B) wherein the transport roller 34 is a rubber roller and the transport roller 35 is a polyurethane-foam roller.

In this case, the transporting speed V [mm/sec] at which the sheet of paper P is transported was classified into: 100, 200, and 400; and the time t [sec] during which the sheet of paper is caught by the punching blade 38*a* was classified into 1.25/1000, 2.5/1000, 5/1000, 10/1000, 20/1000 and 40/1000. The experiments were carried out under various combinations of the transporting speed V and the time t. The time t represents a period of time from the time when the punching blade 38*a* sticks into the sheet of paper P until the time it retreats from the sheet of paper P after completion of the punching process. Further, the frequency of occurrence of troubles, such as torn sheets of paper P and scratches on paper P due to slip of the transport roller 35, was classified by each scale of 10%, and based on the accumulations of the frequencies of occurrence, histograms were made on the respective cases of (A) and (B), as shown FIGS. 11(*a*) through 11(*c*) and FIGS. 12(*a*) through 12(*c*) respectively.

Additionally, five types of paper P were used in the present experiments: 64 g/m$^2$, 75 g/m$^2$, 80 g/m$^2$, 128 g/m$^2$ and 200 g/m$^2$.

Moreover, in the above-mentioned histograms, the count value is determined by one value of "V" and one value of "t". In addition, the types of tested sheets of paper are related to the values of "V" and "t", in such a manner that, for example, in thick sheets of paper, as the transporting speed V decreases, the time t increases. Furthermore, the numbers (parameter) of the five types of tested sheets of paper were not uniform, and phenomena of troubles caused on the various tested sheets and their levels were different depending on the respective cases.

Figure 11A:
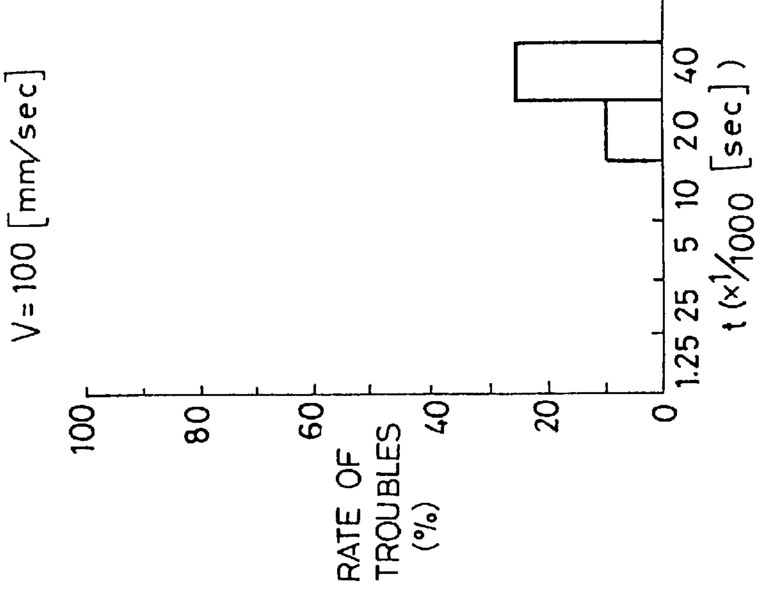
FIG. 11(*a*) is a histogram indicating the frequency of occurrence of troubles when punching operations were carried out by the punching unit at a transporting speed of 100 mm/sec, wherein rubber transport rollers were used.
Figure 11B:
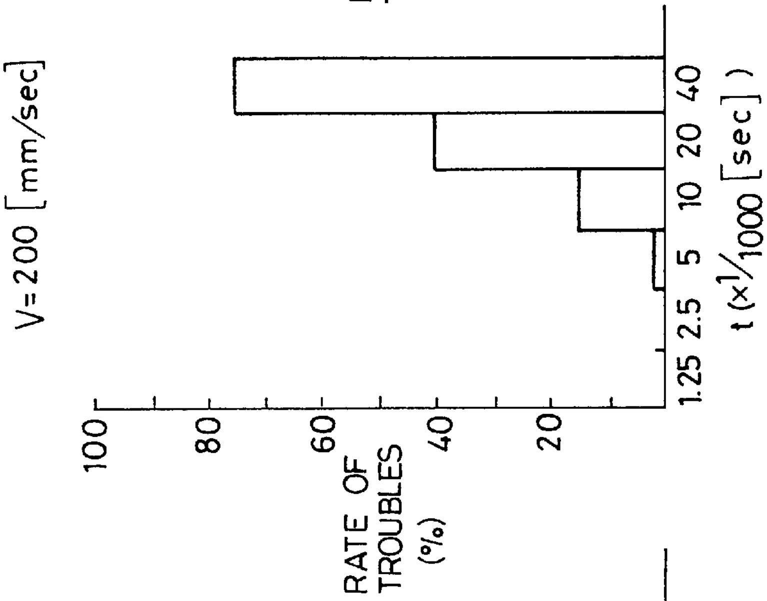
Figure 11C:
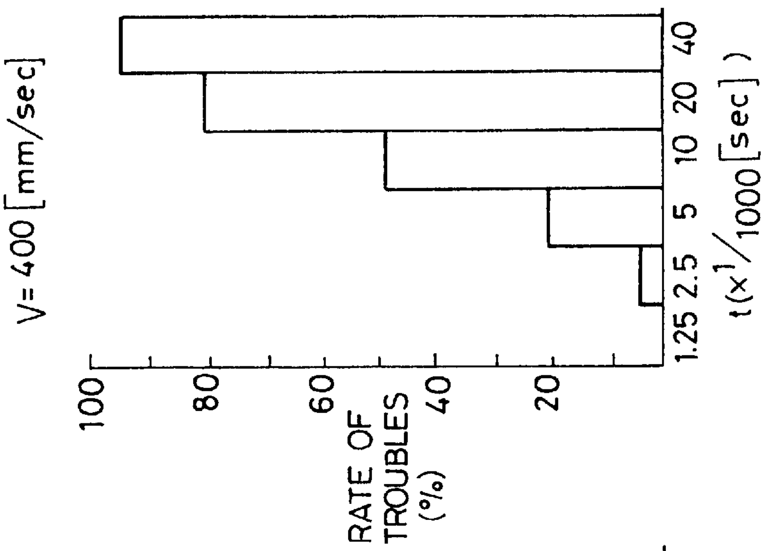
Figure 13C:
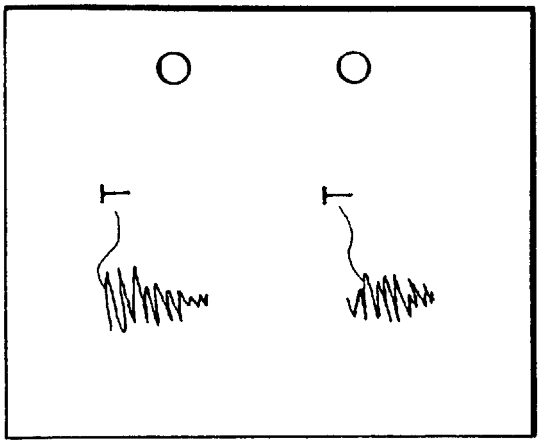
FIG. 13(*a*) is an explanatory drawing that shows tears caused in a sheet of paper in experiments that were carried out in order to obtain the histograms of FIGS. 11(*a*) through 11(*c*) as well as FIGS. 12(*a*) through 12(*c*).
Figure 13B:
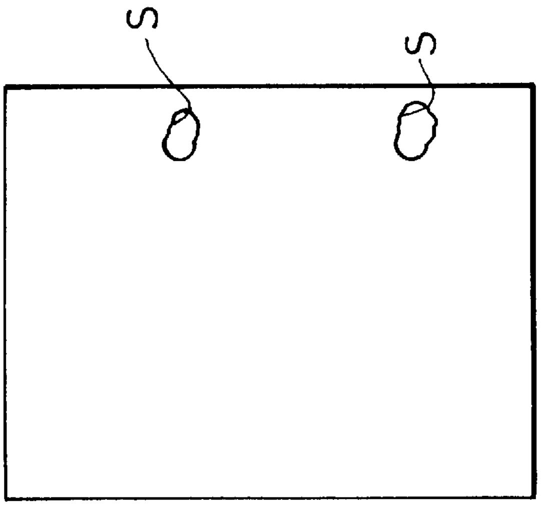
Figure 13A:
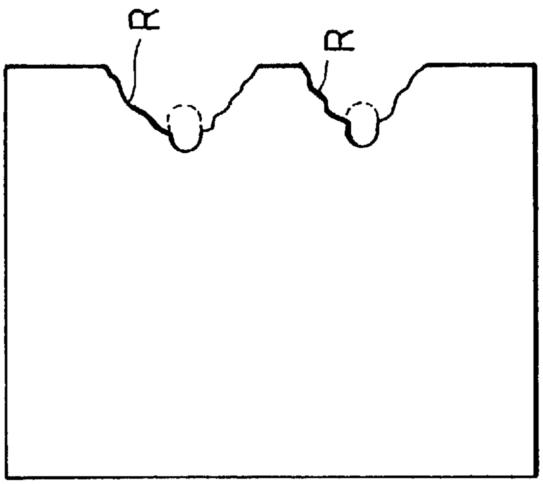

The histograms in the case of (A) are shown in FIGS. 11(*a*) through 11(*c*). In FIG. 11(*b*), the numbers of sheets of tested paper that were used under the conditions of V=200 [mm/sec] and t=40/1000 [sec] were: 30 sheets of 64 g/m$^2$; 40 sheets of 75 g/m$^2$; 40 sheets of 80 g/m$^2$; 50 sheets of 128 g/m$^2$; and 40 sheets of 200 g/m$^2$. During punching operations under these conditions, the following troubles occurred on the respective sheets of tested paper. As shown in FIG. 13(*a*), tears R that extend to the rear edge of the sheet developed in the respective sheets of tested paper: 64, 75, and 80 g/m$^2$. As shown in FIG. 13(*b*), defective punch holes S were caused in the respective sheets of tested paper: 64, 75, 80 and 128 g/m$^2$. As shown in FIG. 13(*c*), scratches T due to the roller were caused in the respective sheets of tested paper: 75, 128, and 200 g/m$^2$.

Here, the above-mentioned phenomena of troubles are regarded as troubles that are caused by application of the transporting force to a sheet of paper that is being caught by the punching blade 38*a*. Thus, the rate of occurrence of troubles is calculated as follows: (The total number of occurrences of troubles)/(The total number of all the sheets of tested paper)×100 [%]

When the experimental results, which are indicated by the histograms of FIGS. 11(*a*) through 11(*c*), are evaluated and analyzed systematically, it is found that the frequency of occurrence of troubles is not more than 10% in the case when the aforementioned inequality (1) is satisfied. In other words, these cases correspond to t=1.25, 2.5, 5, and 10 [sec] in the histogram (V=100 [mm/sec]) of FIG. 11(*a*); t=1.25, 2.5, and 5 [sec] in the histogram (V=200 [mm/sec]) of FIG. 11(*b*); and t=1.25 and 2.5 [sec] in the histogram (V=400 [mm/sec]) of FIG. 11(*c*).

This shows that if the amount of transport of the sheet of paper P, which is made by the transport roller 35 while the sheet of paper P is being caught by the punching blade 38*a*, is not more than 1 [mm], damages caused on the sheet of paper P are comparatively small. Therefore, if the punching unit 30 is designed so as to provide the conditions that satisfy the inequality (1), it becomes possible to carry out the punching operation while the sheet of paper P is being transported.

However, even under the conditions that satisfied the inequality (1), troubles occurred although the percentage was not more than 10%. When consideration was given to clarify the causes of this problem, it was found that a major cause was that the force used to depress the sheet of paper P was too strong because both of the transport rollers 34 and 35 were made of rubber. Here, other experiments were carried out so as to find whether or not the troubles could be solved by reducing the nipping force of the transport rollers 34 and 35. However, even if the average pressing force was reduced, it was not possible to eliminate the troubles completely although the rate of occurrence of troubles was lowered. In other words, as long as the transport rollers 34 and 35 are made of rubber, it seems impossible to completely eliminate the phenomenon that the sheet of paper P closely contact the transport rollers 34 and 35 momentarily.

Next, with regards to the case (B), experiments were carried out so as to check the occurrence of troubles during the punching operation in the same manner as was done in the case (A). More specifically, in the experiments, rubber was used as the material of the transport roller 34, and foamed material, such as polyurethane foam, was used as the material of the transport roller 35. The same experiments were also carried out in the case of using POM resin as the material of the transport roller 35. The experiments showed that in both the foamed material and the POM resin, the rate of occurrence of troubles was lowered to far less than 10%, and the frequency of occurrence of troubles was further lowered even in the case of V×t>1.

This is because slipping, which is allowed by the transport rollers 34 and 35, absorbs the transporting force exerted on the sheet of paper. In other words, the sheet of paper P is being pulled by the transport rollers 34 and 35 even while it is caught by the punching blade 38*a*. Therefore, it is pulled harder beyond its slight flexibility, but the pulling force at this time is absorbed by the slipping of the sheet of paper allowed by the transport rollers 34 and 35.

Figure 12A:
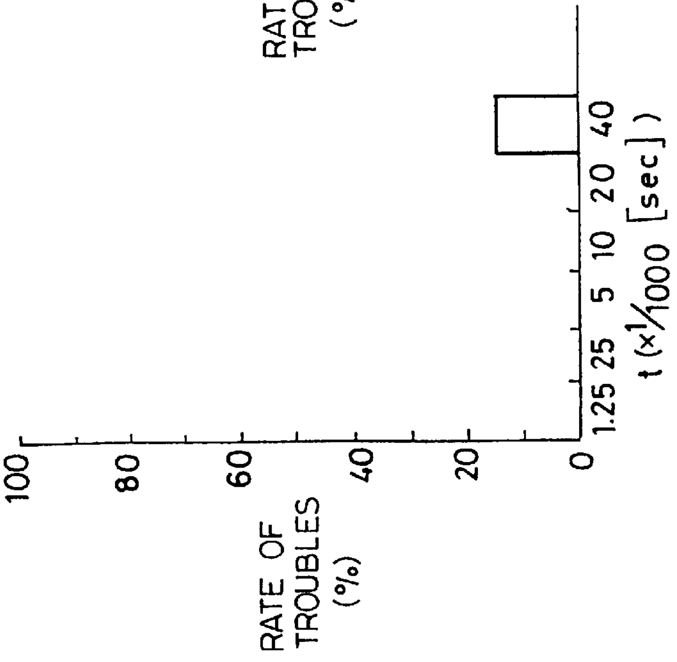
FIG. 12(*a*) is a histogram indicating the frequency of occurrence of troubles when punching operations were carried out by the punching unit at a transporting speed of 100 mm/sec, wherein polyurethane-foam transport rollers were used.
Figure 12B:
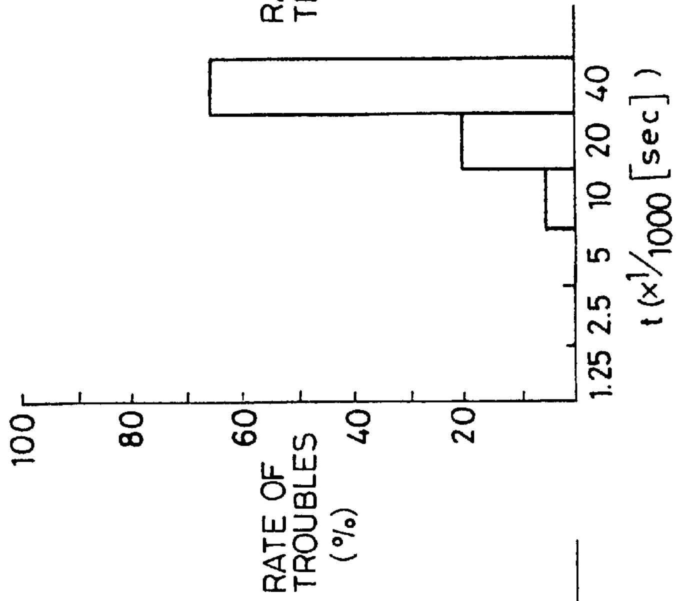
Figure 12C:
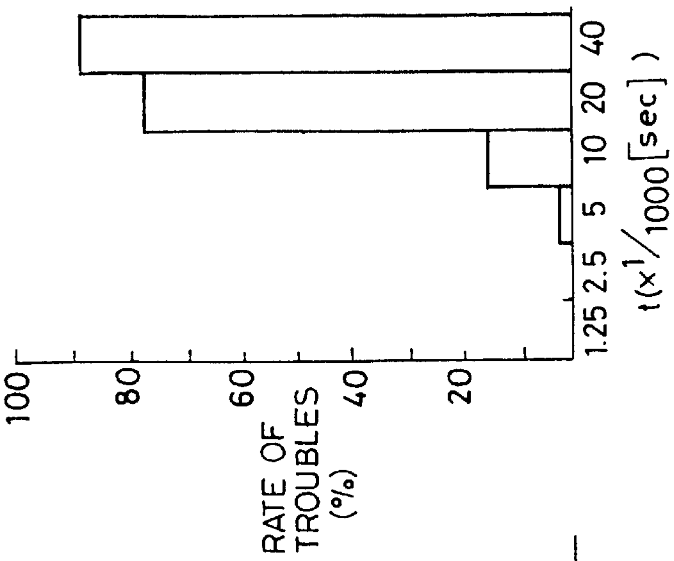

Among the above-mentioned upgrading experiments, the results of those using a rubber roller and a polyurethane-foam roller respectively as the transport roller 34 and the transport roller 35 are shown in histograms in FIGS. 12(*a*) through 12(*c*). These histograms show that troubles are completely eliminated under conditions that satisfy V×t≦1 and that the frequency of occurrence of troubles is lowered even under conditions where V×t>1.

The following points were found from the results of the experiments in the respective cases (A) and (B). In the case when the time t needed for catching the paper was extremely short in comparison with the transporting speed V, no troubles occurred in any of the sheets of paper. In the case when the time t needed for catching the paper was extremely long in comparison with the transporting speed V, troubles, such as tears R (see FIG. 13(*a*)) and defective punch holes S (see FIG. 13(*b*)), occurred in thin paper at high frequencies. Moreover, as to thick paper, under the same conditions, since the sheet of paper P came into a stopped state momentarily, scratches T (see FIG. 13(*c*)) due to slip of the transport rollers 34 and 35 were caused only in the case (A) at high frequencies.

As described above, in the punching unit 30 of the present embodiment, since the punching operation is carried out on the rear side of the sheet of paper P, it is possible to reduce the frequency of occurrence of troubles such as paper jam to a great degree, even if the transporting speed is increased in order to achieve a high-speed operation. Further, since warping of the sheet of paper P does not occur, it is possible to avoid damages due to the warping of the sheet of paper P, as well as allowing the punching operation to be conducted on thick paper that exceeds 1.28 $g/m^2$.

Moreover, the punching operation is carried out without the necessity of stopping the transportation while the transport rollers 34 and 35 are kept rotating; this enables a high-speed operation. Furthermore, the transport roller 35 allows a slight slip during the short period when the sheet of paper P is caught by the punching blade 38*a* upon forming punch holes; this reduces the possibility of damages such as torn paper even if the sheet of paper P is pulled by the transport rollers 34 and 35.

In addition, since the piezoelectric element 53 is adopted as a driving source of the driving device 36, the operation speed of the punching device 33 is increased; the time during which the sheet of paper P is caught by the punching blade 38*a* is shortened; and thus it becomes possible to reduce the frequency of occurrence of damage to the sheet of paper P.

Furthermore, when a stapling operation is carried out simultaneously with the punching operation, this arrangement allows both of the operations to be carried out on the rear-edge side of the sheets of paper; thereby improving the efficiency of the operations. Commonly, the stapling operation is conducted after aligning the rear edges of sheets of paper. Therefore, sheets of paper P with punch holes on the rear edges thereof have less misalignments between the punch holes compared with other cases. In addition, in the stapling operation, it is common to staple the sheets of paper on their rear-edge side, with the alignment of punch holes coincident with the direction of the stapling operation.

[MODIFIED EXAMPLE 1]

The following description will discuss the first modified example of the present embodiment.

Figure 14:
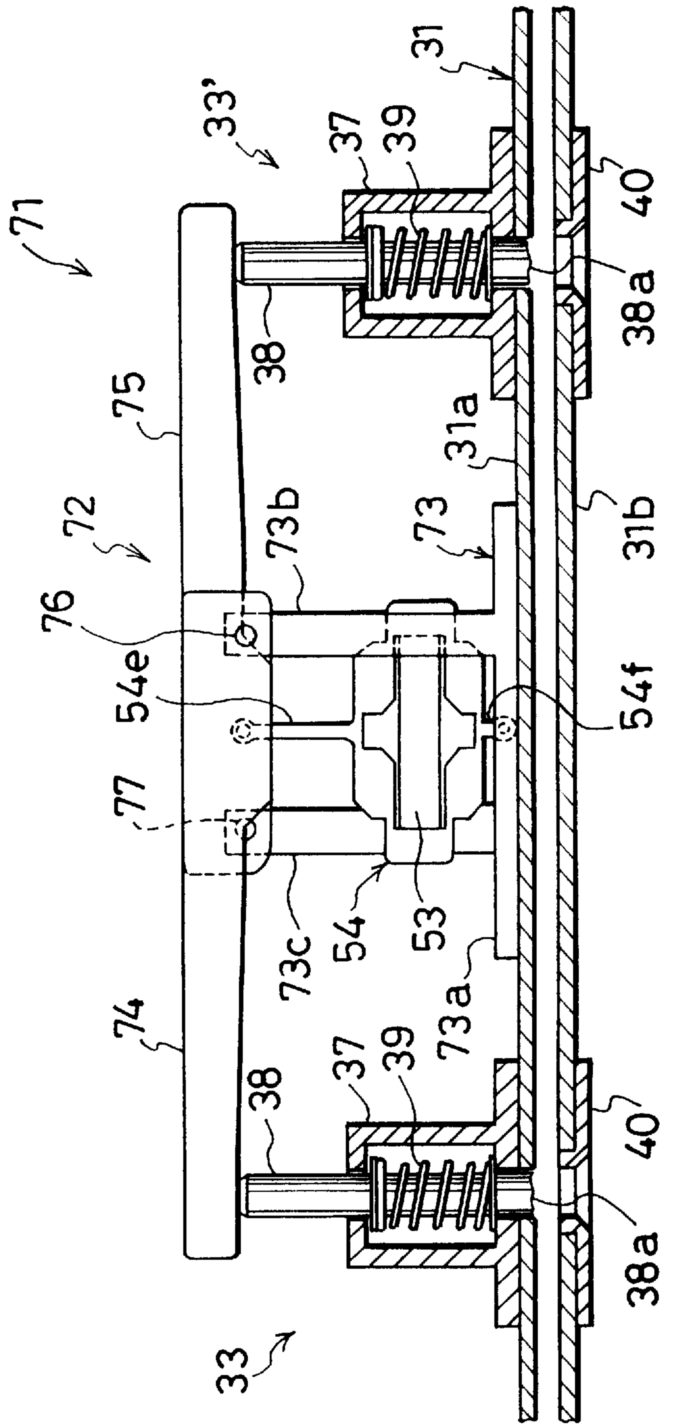
FIG. 14 is a vertical cross-sectional view showing an arrangement of a punching unit that is used in the first modified example of the first embodiment of the present invention.

In this modified example, a punching unit 71, shown in FIG. 14, is provided as the paper-punching device 27. The punching unit 71, which has punching devices 33 and 33', and a driving device 72, is designed to form two punch holes.

The punching devices 33 and 33', which have identical functions, are disposed with a predetermined interval that corresponds to the interval of punch holes. A driving device 72, which functions as a driving means, is disposed at the mid-position between the punching devices 33 and 33'. The driving device 72 is constituted of a support member 73, pressing bars 74 and 75, a piezoelectric element 53, and a distortion-enlarging mechanism 54.

The support member 73, which is installed on the paper guide 31, consists of a base 73*a* and pillars 73*b* and 73*c*. The base 73*a* is securely fixed on the upper plate 31*a*, and the pillars 73*b* and 73*c* extend upward vertically from the base 73*a* in parallel with each other with a predetermined interval.

The pressing bar 74 has its base end attached to the top end of the pillar 73*b* with a pin 76 so as to rotate freely. The free end of the pressing bar 74 extends to the top end of the punching member 38 of the punching device 33. The pressing bar 75, on the other hand, has its base end attached to the top end of the pillar 73*c* with a pin 77 so as to rotate freely in a direction reversed to the pressing bar 74. The free end of the pressing bar 75 extends to the top end of the punching member 38 of the punching device 33'.

The distortion-enlarging mechanism 54 has its connecting section 54*e* attached to both the pressing bars 74 and 75 with a pin at the mid-position between the pillars 73*b* and 73*c*. Further, the connecting section 54*f* is attached to the base 73*a* with a pin.

In the driving device 72 that is arranged as described above, the dimensional distortion, which is exerted on the piezoelectric element 53, is increased to a larger displacement by the distortion of the distortion-enlarging mechanism 54, and the displacement is transmitted to the pressing bars 74 and 75. Then, since their respective attached portions to the connecting section 54*e* are pulled toward the base 73*a* side, the pressing bars 74 and 75 rotate downward centered on the pins 76 and 77. Thus, the free ends of the pressing bars 74 and 75 are shifted downward, and press the punching members 38 of the punching devices 33 and 33' downward.

In this modified example, the two punching devices 33 and 33' are driven by a single driving source using the piezoelectric element 53; this makes it possible to simplify the construction, as well as reducing the manufacturing cost of the punching unit 71.

[MODIFIED EXAMPLE 2]

The following description will discuss the second modified example of the present embodiment.

Figure 15:
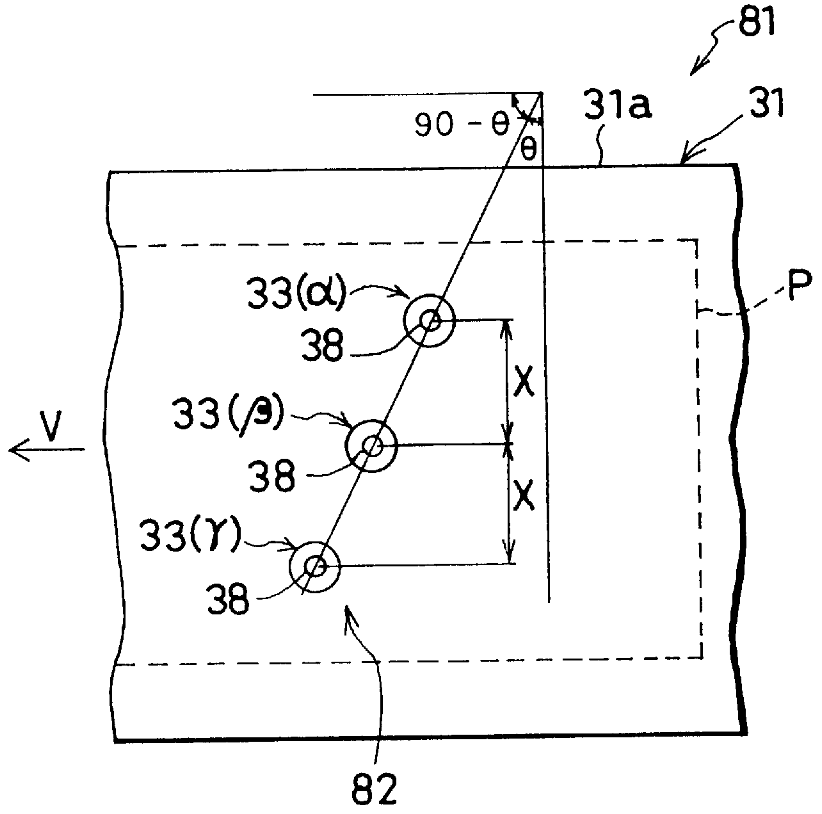
FIG. 15 is a plan view showing an arrangement of a punching unit that is used in the second modified example of the first embodiment of the present invention.

In this modified example, a punching unit 81, shown in FIG. 15, is provided as the paper-punching device 27. The punching unit 81 is provided with three punching devices 33 and a driving device 82 (driving means) for driving these punching devices 33, and the punching devices 33 are securely fixed on the upper plate 31*a* of the transport guide 31. The punching devices 33 are disposed so that their punching members 38 are aligned on a straight line that makes an angle $(90-\theta)°$ with respect to the transporting direction, and so that the intervals between the adjacent punching members 38 and 38 (that is, the punching blades 38*a* and 38*b*) in the direction orthogonal to the transporting direction are set to a constant value$x$[mm]. Further, the driving device 82 drives the respective punching devices 33 individually by using three driving devices 36, not shown. Here, the punching devices 33 are driven by a single driving circuit 62, and are not driven at the same time. Therefore, they are driven in a sequential manner from the punching device 33($\alpha$) through the punching device 33($\beta$) to the punching device 33($\gamma$) with predetermined time-intervals.

Figure 16:
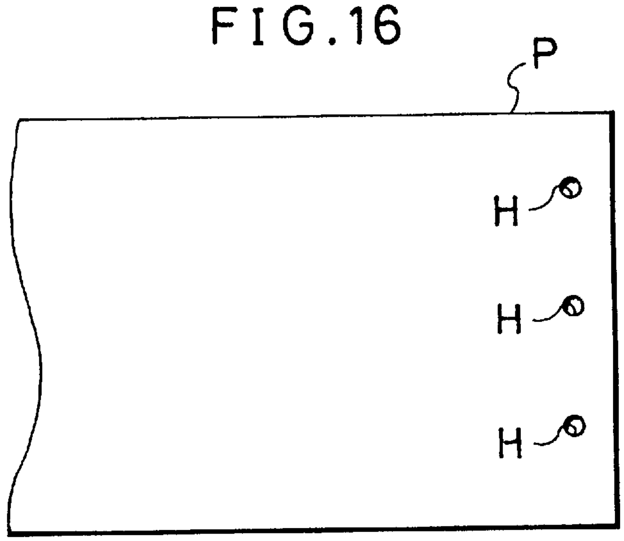
FIG. 16 is a plan view showing a sheet of paper that has been subjected to the punching operation by the punching unit of FIG. 15.

In the punching unit 81 that is arranged as described above, a sheet of paper P, which is being transported, is first subjected to a punching operation by the punching device 33($\alpha$), next subjected to a punching operation by the punching device 33($\beta$), and then subjected to a punching operation by the punching device 33($\gamma$). Thus, the sheet of paper P has punch holes H that are aligned in a straight line as shown in FIG. 16.

Here, supposing that the adjacent punching devices 33 are successively driven with a time-interval of T [sec] at a transporting speed of V [mm/sec], the relationship indicated by the following equation has to be satisfied in order that the punch holes H, formed by the punching devices 33, are aligned in a straight line along the rear side on the sheet of paper P under these conditions. Therefore, the driving circuit 62 is arranged to drive the punching devices 33 based on the following relationship.

$$\tan\theta = V \cdot T / x \quad (2)$$

More specifically, supposing that T=50/1000 [sec], V=300 [mm/sec], and x=108 [mm] (corresponding to the U.S. specification), θ=7.91° is obtained from the equation (2) (that is, from the equation: tanθ=(300×50/1000)/108=0.139). When the punching operation is carried out using this setting, three punch holes H corresponding to the U.S. specification are properly formed.

With this modified example, although it is necessary to install as many punching devices 33 and driving devices 36 as the number of the punch holes H, it is only necessary to provide one driving circuit 62. This makes it possible to simplify the construction of the control system, as well as reducing the manufacturing cost of the punching unit 81.

[EMBODIMENT 2]

Referring to FIG. 1 and FIGS. 17 through 20, the following description will discuss the second embodiment of the present invention. Here, those members that have the same functions and that are described in the first embodiment are indicated by the same reference numerals and the description thereof is omitted.

Figure 17:
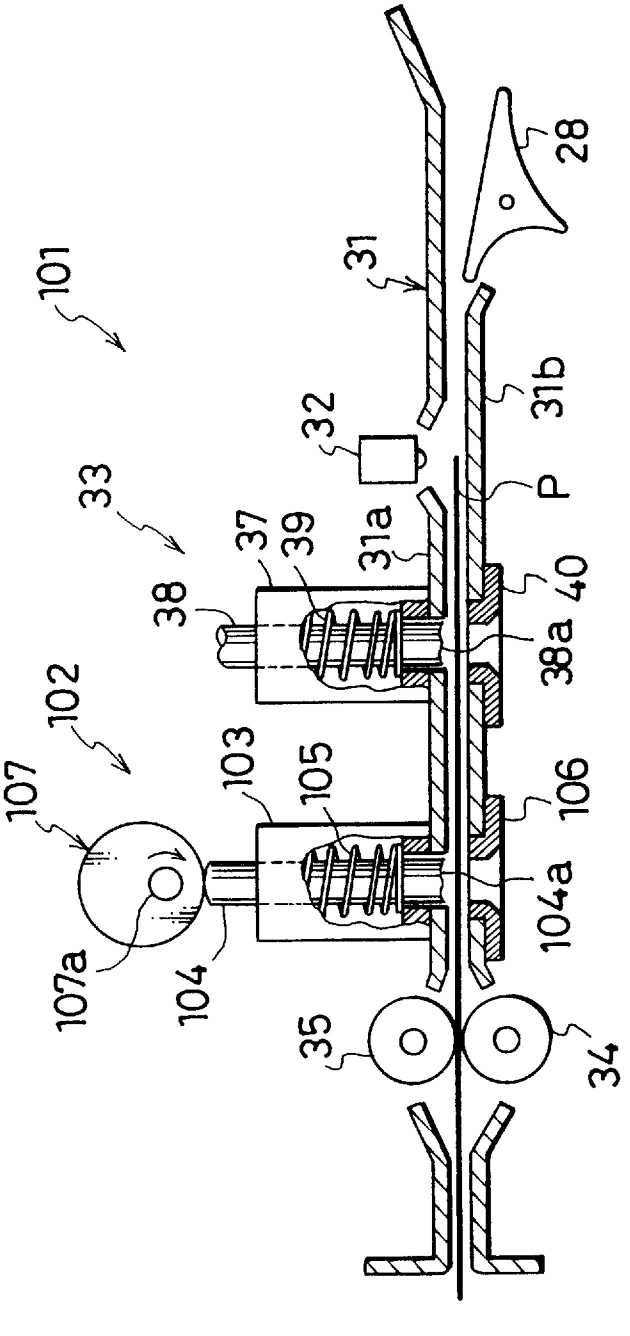
FIG. 17 is a vertical cross-sectional view of a punching unit in the copying machine in accordance with the second embodiment of the present invention.

The copying machine of the present embodiment is provided with a punching unit 101, shown in FIG. 17, that is installed in the main body 1 shown in FIG. 1 and that functions as the paper-punching device 27. This punching unit 101 is designed so that both the punching operation for sheets of extremely thick paper P and the high-speed punching operation for sheets of normal paper P are compatibly carried out.

In the punching unit 101, the space between the punching device 33 on the transport guide 31 and the transport rollers 34 and 35 is widened in the punching unit 30 (see FIG. 3(*a*)), and a punching device 102 is installed in place of the punching device 33. The punching device 102 is a high-speed-use punching device for forming punch holes in sheets of paper ranging from normal paper to quite thick paper. The punching device 102 is constituted of a housing case 103, a punching member 104, a resetting spring 105, and a punching die 106. The punching member 104 is provided with a punching blade 104*a* at its lower end.

Further, although it has the virtually same functions as the punching device 33, the punching device 102 is capable of forming punch holes in sheets of thick paper beyond the order of 200 $g/m^2$; this makes it quite different from the punching device 33. Therefore, in the punching device 102, the urging force of the resetting spring 105 is set to be greater than that of the resetting spring 39, and the cutting performance of the punching blade 104*a* is set to be higher than that of the punching blade 38*a*, if necessary.

In addition to the aforementioned arrangement, the punching device 102 is provided with an eccentric cam 107. The eccentric cam 107, which has a disc shape, is driven by a motor 113 (see FIG. 18), centered on a rotation axis 107*a* that is located at an eccentric position. The motor 113 will be described later. Here, the eccentric cam 107 is arranged so that the circumferential edge that is closest to the rotation axis 107*a* stays in contact with the top of the punching member 104 that is urged to the stand-by station by the resetting spring 105. The eccentric cam 107 makes the eccentric rotation with its circumferential edge always contacting the top of the punching member 104, thereby allowing the punching member 104 to move up and down.

Additionally, both the punching devices 33 and 102 have the same positions of punch holes on the sheet of paper P.

The following description will discuss an outline of a control system for driving the punching devices 33 and 102.

Figure 18:
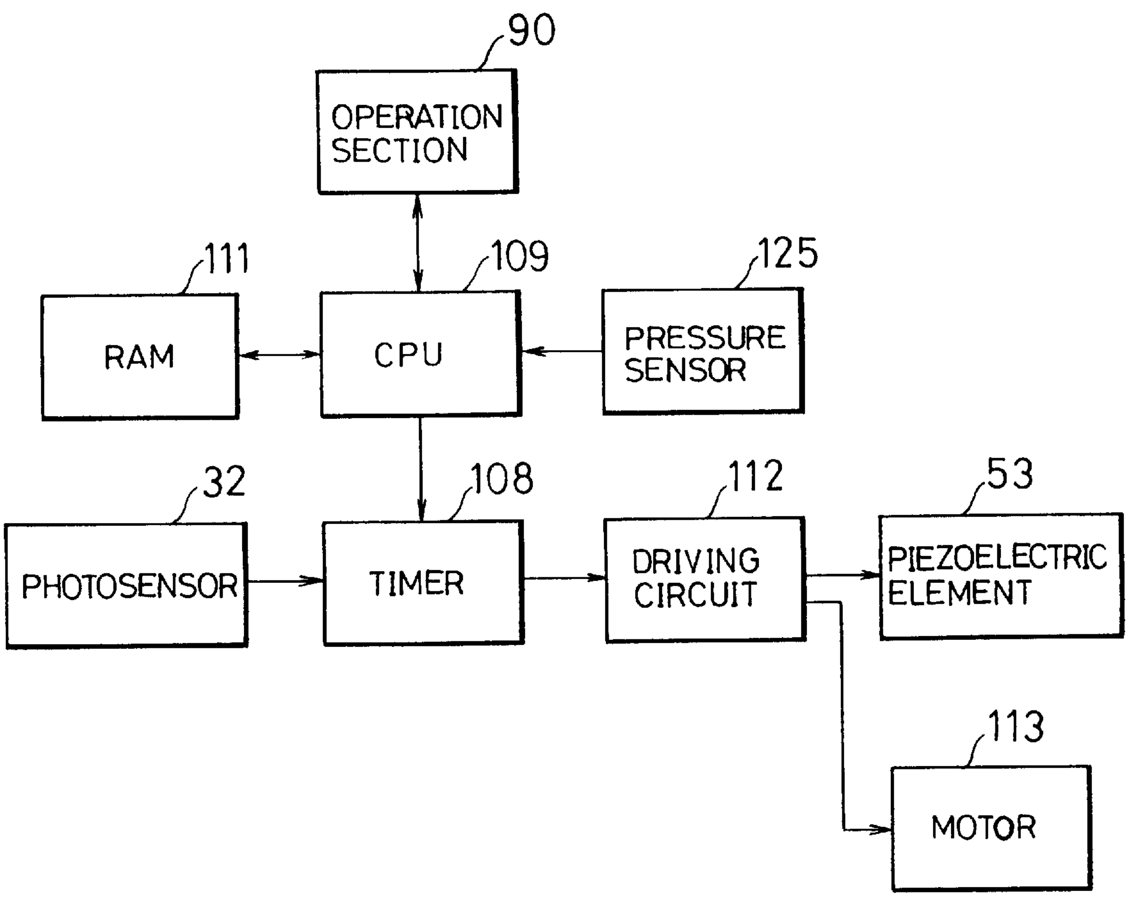
FIG. 18 is a block diagram showing a control system for driving the punching unit of FIG. 17.

As shown in FIG. 18, in this control system, a detection signal from the photosensor 32 is inputted to a timer 108. The timer 108, upon receipt of the detection signal, starts time-counting, and after counting a predetermined period of time, releases a time-counting completion signal to a driving circuit 112.

The timer 108 provides different time-counting periods depending on the operations of the punching device 33 and the punching device 102. The first time-counting period used for operating the punching device 102 is set to be longer than the second time-counting period used for operating the punching device 33. This is because the station of the punching device 102 is farther from the photosensor 32, compared with the punching device 33. Here, a CPU 109 makes a selection as to which time-counting period is used in the timer 108.

The CPU 109 instructs the timer 108 to time-count for the first time-counting period when the thick-paper mode is specified, when paper is fed from the manual feeding tray 24, or when the cover mode, or the insert mode is specified. When the thick-paper mode is not on, the CPU 109 instructs the timer 108 to time-count for the second time-counting period. The above-mentioned modes are specified by the user through the operation section 90, and the selected modes are stored in a RAM 111 as mode information. The mode information is called for by the CPU 109, if necessary.

A driving circuit 112 is a circuit for driving the piezoelectric element 53 and the motor 113. In other words, the driving circuit 112, upon receipt of the time-counting completion signal for the first time-counting period from the timer 108, releases a voltage to the motor 113. Further, the driving circuit 112, upon receipt of the time-counting completion signal for the second time-counting period from the timer 108, releases a voltage to the piezoelectric element 53.

Moreover, in the present punching unit 101, when the thick-paper mode is on, the CPU 109 temporarily stops the rotation of the transport rollers 34 and 35 while the punching device 102 is operated. In contrast, when the thick-paper mode is not on, the punching operation is carried out with the transport rollers 34 and 35 rotating, in the same manner as the first embodiment.

In the punching unit 101 that has the above-mentioned arrangement, the photosensor 32 detects the rear edge of sheets of paper P. In the case of using thick paper as the paper P, if the thick-paper mode has been specified by the user through the operation section 90 prior to the copying operation, the driving circuit 112 supplies the voltage to the motor 113 after the timer 108 has time-counted for a predetermined period. Thus, the motor 113 rotates, allowing the punching device 102 to be driven.

At this time, since the paired transport rollers 34 and 35 are stopped, punch holes are formed while the sheet of paper P is stopped. During the punching operation, the eccentric cam 107 is driven by the motor 113 to make a 180°-rotation, and the resulting force causes the punching member 38 to move down and let the punching blade 38*a* to stick through the sheet of paper P. When the eccentric cam 107 makes another 180°-rotation, the force from the eccentric cam 107 is released, and the punching member 104 is urged upward by the resetting spring 105, thereby completing the punching operation. Thereafter, the transport rollers 34 and 35 are rotated again, and the sheet of paper P is discharged.

Figure 19:
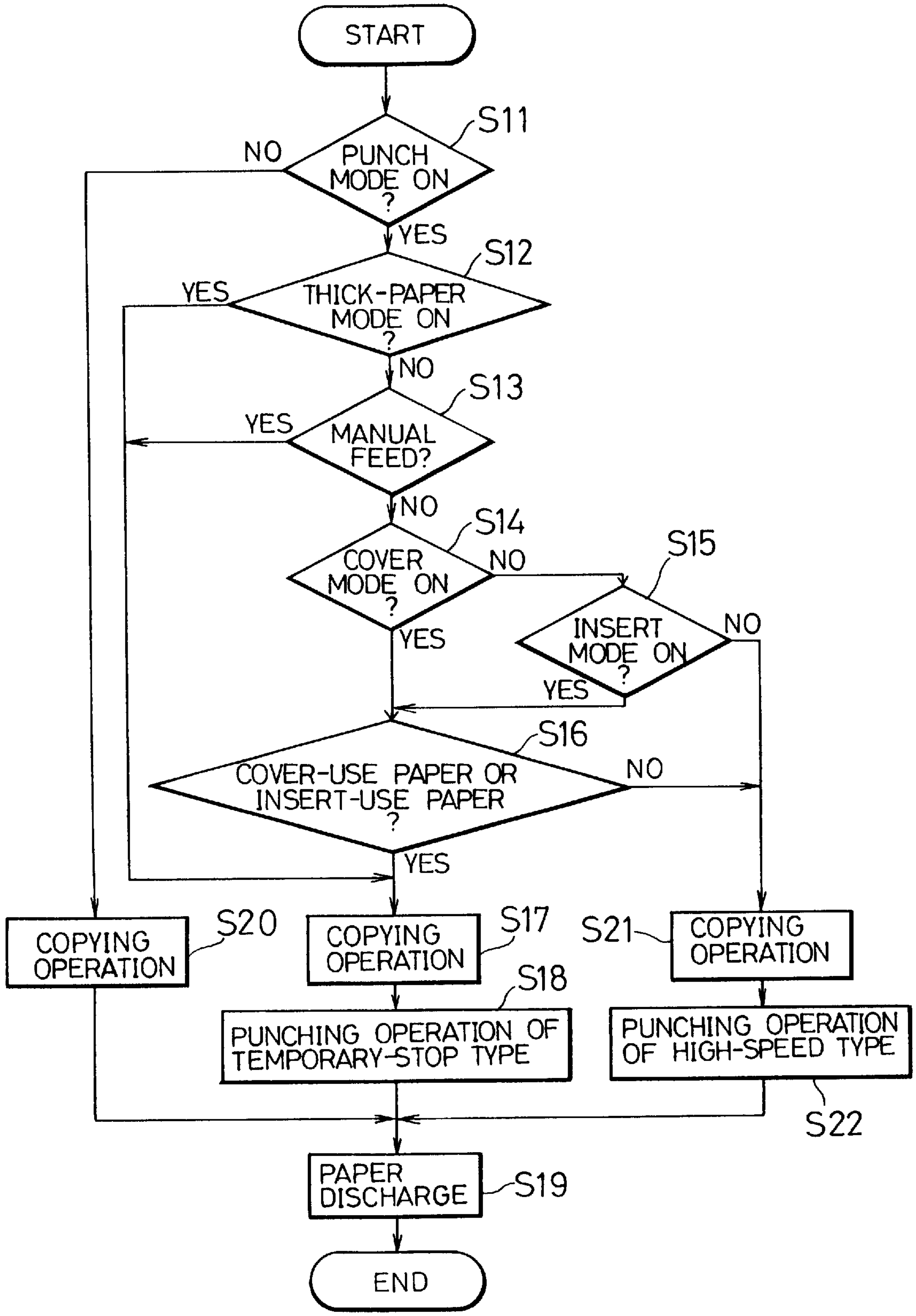
FIG. 19 is a flow chart showing a sequence of selections for punching operations corresponding to respective modes that are carried out in the punching unit of FIG. 17.

Referring to the flow chart of FIG. 19, the following description will discuss the operation of the copying machine of the present embodiment.

First, a judgement is made as to whether or not the punch mode has been specified (S11). If the punch mode has been specified, a judgement is made as to whether or not the thick-paper mode has been specified (S12). If the thick-paper mode is not on, a judgement is further made as to whether or not the feeding from the manual feeding tray has been specified (S13). If the feeding from the manual feeding tray is not specified, a judgement is successively made as to whether or not the cover mode has been specified (S14). Since the kind of sheets of paper P to be set on the manual paper tray 24 is not clearly identified, the step S14 is prepared, assuming that thick paper is set thereon.

If the cover mode is not specified, a judgement is made as to whether or not the insert mode is specified (S15). If the cover mode or the insert mode has been specified, a judgement is made as to whether or not it is possible to feed sheets of paper from either the feeding cassette 22 or 34 wherein the cover-use paper P or the insert-use paper P is provided (S16).

If the cover-use paper P or the insert-use paper P is available, the copying operation is carried out (S17). After completion of the copying operation, the punching operation of the temporarily stopping type for thick paper is carried out by the punching device 102 (S18), and when the sheet of paper P is discharged (S19), all the operations are completed.

In contrast, if the punch mode is not on at S11, the copying operation is carried out, as it is (S20), and the sequence proceeds to S19. Here, if the thick-paper mode is selected at S12, and if the feeding is made from the manual feeding tray 24 at S13, the sequence proceeds to S17. Further, if the insert mode is not on at S15, or if the cover-use paper P or the insert-use paper P is not fed at S16, the copying operation is carried out (S21). After completion of the copying operation, the punching operation of the high-speed type for normal paper is carried out (S22), and the sequence proceeds to S19.

As described above, in the punching unit 101 of the present embodiment, the piezoelectric element is adopted as the power source for the punching device 33 for normal-paper use, and the motor 113 is adopted as the power source for the punching device 102 for thick-paper use. This arrangement, which uses the punching devices 33 and 102 separately depending on the thickness of the sheet of paper P, makes it possible to form punch holes through sheets of thick paper used in the insert mode, cover mode and other modes that weighs not less than 200 g/$m^2$. Moreover, when the punching operation is carried out on sheets of normal paper, the punching device 33 provides a high-speed punching operation and makes it possible to lower the frequency of occurrence of damage to the sheets of paper P, in the same manner as described in the first embodiment.

[MODIFIED EXAMPLE]

Figure 20:
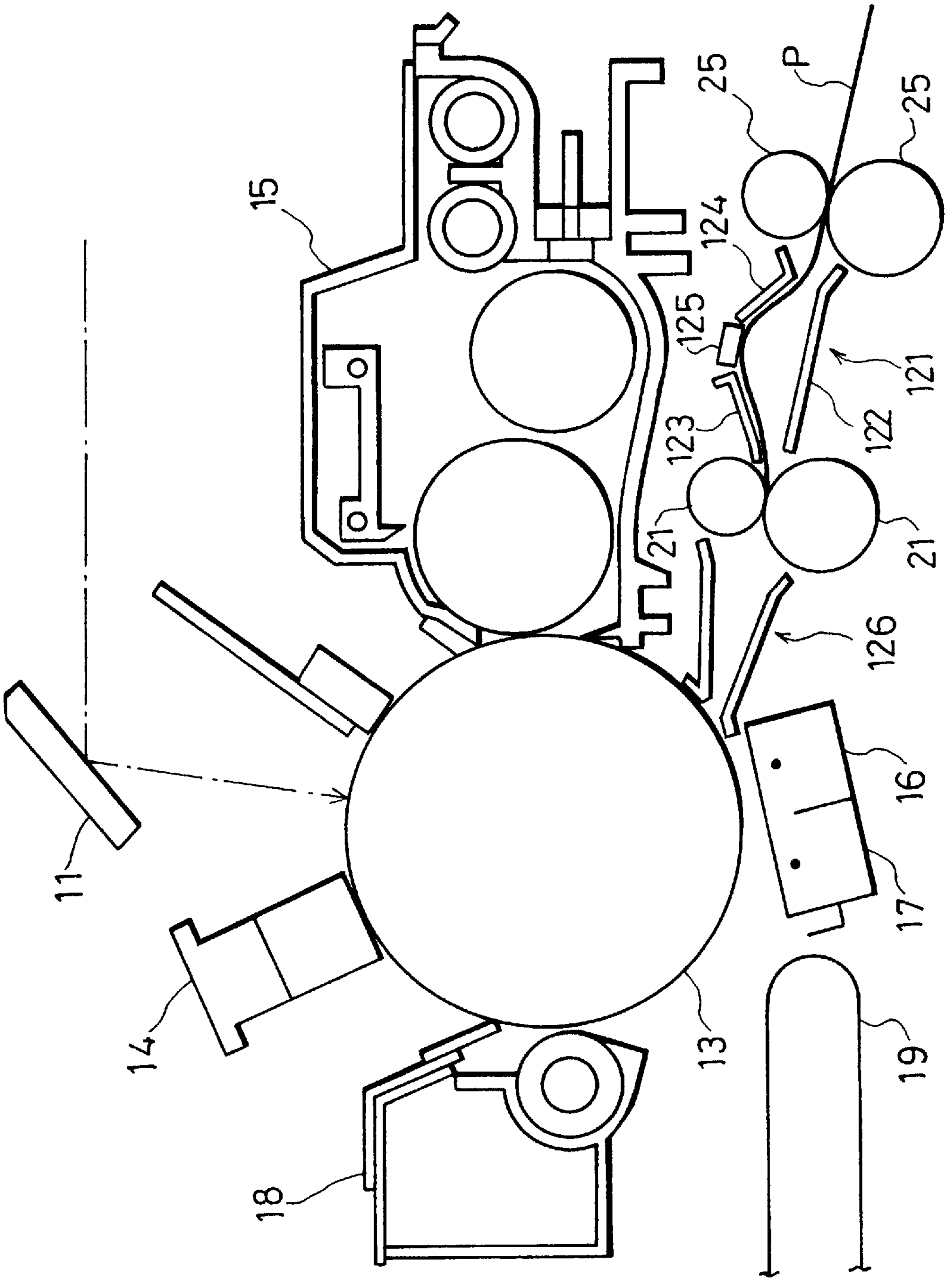
FIG. 20 is a front view showing the arrangement of essential parts in a copying machine in accordance with a modified example of the second embodiment of the present invention.
Figure 21:
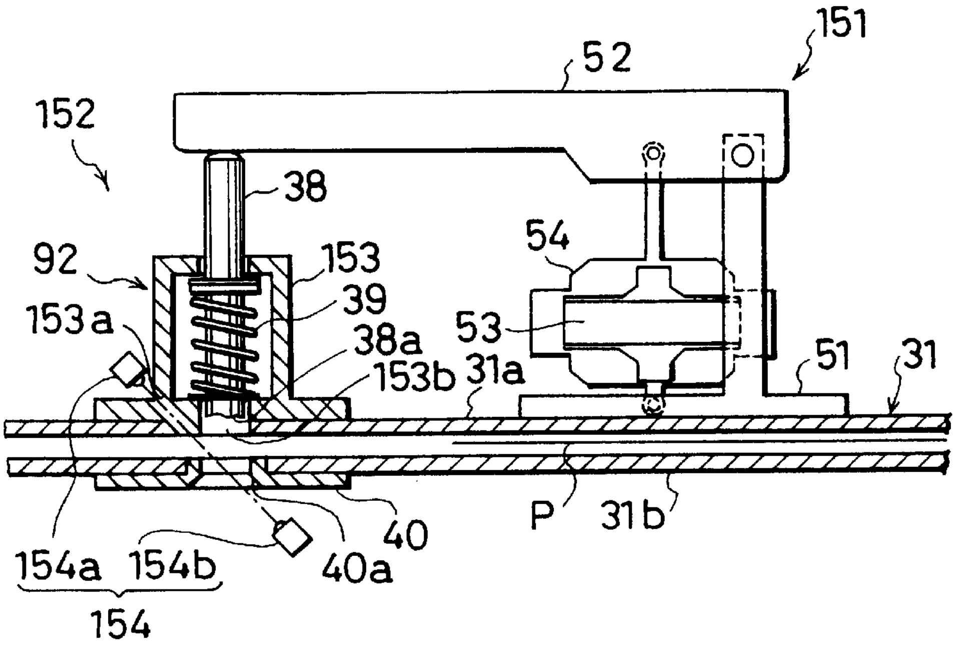
FIG. 21 is a vertical cross-sectional view of a punching unit in the copying machine in accordance with the third embodiment of the present invention.

In the copying machine of the present modified example, a paper-stand-by section 121, shown in FIG. 20, is provided inside the main body shown in FIG. 1.

The paper-stand-by section 121, which is located between the register rollers 21 and the transport rollers 25, is constituted of a lower plate 122, upper plates 123 and 124, and a pressure sensor 125.

The lower plate 122 is disposed on the lower side of the transport path of sheets of paper P so as to guide the sheets of paper P. The upper plate 123 is disposed in a tilted manner so that its one end is located in the vicinity of the mid-point between the register rollers 21 while the other end is located at a position slightly higher than the former end. The upper plate 124, on the other hand, is disposed in a tilted manner so that its one end is located in the vicinity of the mid-point between the transport rollers 25 while the other end is located at a position slightly higher than the former end. In other words, the upper plates 123 and 124 form guiding plates that are raised upward at the mid-point between the register rollers 21 and the transport rollers 25.

The pressure sensor 125 is installed in the space between the upper plate 123 and the upper plate 124. The pressure sensor 125 is a semiconductor element (piezo element) which is capable of making an analog-type detection of pressure (force) that is applied upon the surface thereof. As to the pressure sensor 125, for example, the semiconductor pressure transducer P-8100 manufactured by Copal Electronics Corp. is preferably used.

The pressure sensor 125, which is disposed at the position as described above, is thus arranged so that, when a sheet of paper P, transported by the transport rollers 25, is blocked by the register rollers 21 and is warped upward, it detects the pressing force of the warped portion of the sheet of paper P. In other words, the pressure sensor 125 detects the pressing force as the stiffness of the sheet of paper P.

In the present copying machine, the CPU 109 makes a judgement as to whether the sheet of paper P in question is thick paper or normal paper in accordance with the detection output from the pressure sensor 125, and supplies the result of the judgement to the timer 108. In other words, if the sheet of paper P is thick paper, the CPU 109 instructs the timer 108 to time-count for the first time-counting period. If the sheet of paper 108 is normal paper, the CPU 109 instructs the timer 108 to time-count for the second time-counting period. That is, in the present modified example, the result of the judgement, which is made as to whether or not the sheet of paper is thick paper, is utilized in place of the thick-paper mode that has to be specified by the user.

In the copying machine having the arrangement as described above, prior to the transferring process of a toner image formed on the photoreceptor 13, the sheet of paper P is blocked by the register rollers 21 at its leading edge, and since it is still transported by the transport rollers 25 by a predetermined amount, the sheet of paper P is stopped with a warp having a predetermined size. This arrangement makes it possible to eliminate any skew in the sheet of paper at its leading edge, thereby providing a proper orientation of the paper. At this time, the pressure sensor 125, which is pressed by the warped paper P, detects the pressure, thereby releasing a detection signal. In accordance with the detection signal, a judgement is made as to whether or not the sheet of paper is thick paper or normal paper.

Thereafter, the register rollers 21 rotate in synchronism with the optical system 4, shown in FIG. 1, and the sheet of paper P is supplied to the photoreceptor 13 through the transport guide 126. The sheet of paper P, upon completion of the copying operation after having been subjected to the predetermined processes such as transferring process, is transported to the punching unit 101, shown in FIG. 17. The sheet of paper P, if judged as thick paper, is subjected to the punching operation in the punching device 102, and if judged as normal paper, is subjected to the punching operation in the punching device 33.

As described above, in the present modified example, the punching devices 33 and 102 are separately used depending on the judgements that are made by utilizing the detection output of the pressure sensor 125 as to whether or not the sheet of paper in question is thick paper. Therefore, it is not necessary for the user to set the thick-paper mode.

[EMBODIMENT 3]

Referring to FIG. 1 and FIGS. 21 through 24, the following description will discuss the third embodiment of the present invention. Here, those members that have the same functions and that are described in the first and second embodiments are indicated by the same reference numerals and the description thereof is omitted.

In addition to the copying machine having the arrangement described in the first embodiment, the copying machine of the present embodiment, which has the arrangement shown in FIG. 1, is further provided with a controlling function for improving the reliability of the punching operation. Moreover, the present copying machine has a punching unit 151, shown in FIG. 21, as the punching device 27.

Although the punching unit 151 has virtually the same functions as the punching device 33 (see FIG. 3) of the first embodiment, it is provided with a punching device 152 in place of the punching device 33. The punching device 152 is constituted of a housing case 153, a punching member 38, a resetting spring 39, a punching die 40, and a photosensor 154.

The housing case 153 is provided with a passage hole 153*a* that penetrates from the upper side of the upper plate 31*a* to the inside of the transport guide 31. The passage hole 153*a* is a through hole that penetrates from a connecting portion between the outer wall of the housing case 153 and the flat portion that is fixed to the upper plate 31*a* to the vicinity of a passage aperture 153*b*. The central axis of the passage hole 153*a* passes through the tube section 40*a* of the punching die 40.

The photosensor 154 is an optical sensor of the transmission type having an light-emitting section 154*a* and a light-receiving section 154*b*. The light-emitting section 154*a* is located at the proximity of the opening on the upper side of the passage hole 153*a*. The light-receiving section 154*b*, on the other hand, is disposed so as to face the light-emitting section 154*a* through the passage hole 153*a* and the tube section 40*a*. With this arrangement, the light-receiving section 154*b* receives light emitted by the light-emitting section 154*a* when there is no paper P in the proximity of a passage aperture 153*b* inside the transport guide 31. Thus, the photosensor 154 functions as a paper-detection means.

Figure 22:
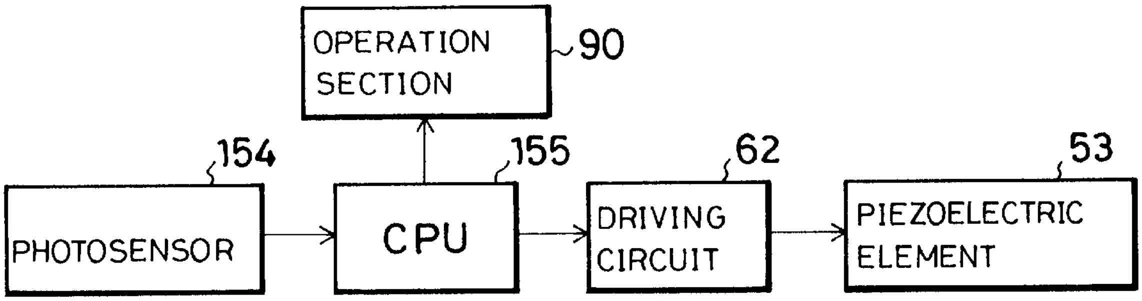
FIG. 22 is a block diagram showing a control system for controlling the operation in the event of a paper jam in the punching device in the punching unit of FIG. 21.

As shown in FIG. 22, in a control system for driving the punching device 152, the detection signal from the photosensor 154 is supplied to a CPU 155 for controlling the operations of the present copying machine. The CPU 155, upon functioning as an idle-driving control means, makes a judgement as to the presence or absence of the sheet of paper P in accordance with the detection signal. If the judgement shows that there is no paper P inside the transport guide 31, the CPU 155 controls the driving circuit 62 so as to drive the piezoelectric element 53. In contrast, if the judgement shows that there is paper P inside the transport guide 31, the CPU 155 sends a message for warning the occurrence of a paper jam to the display panel 92 on the operation section 90.

Figure 23:
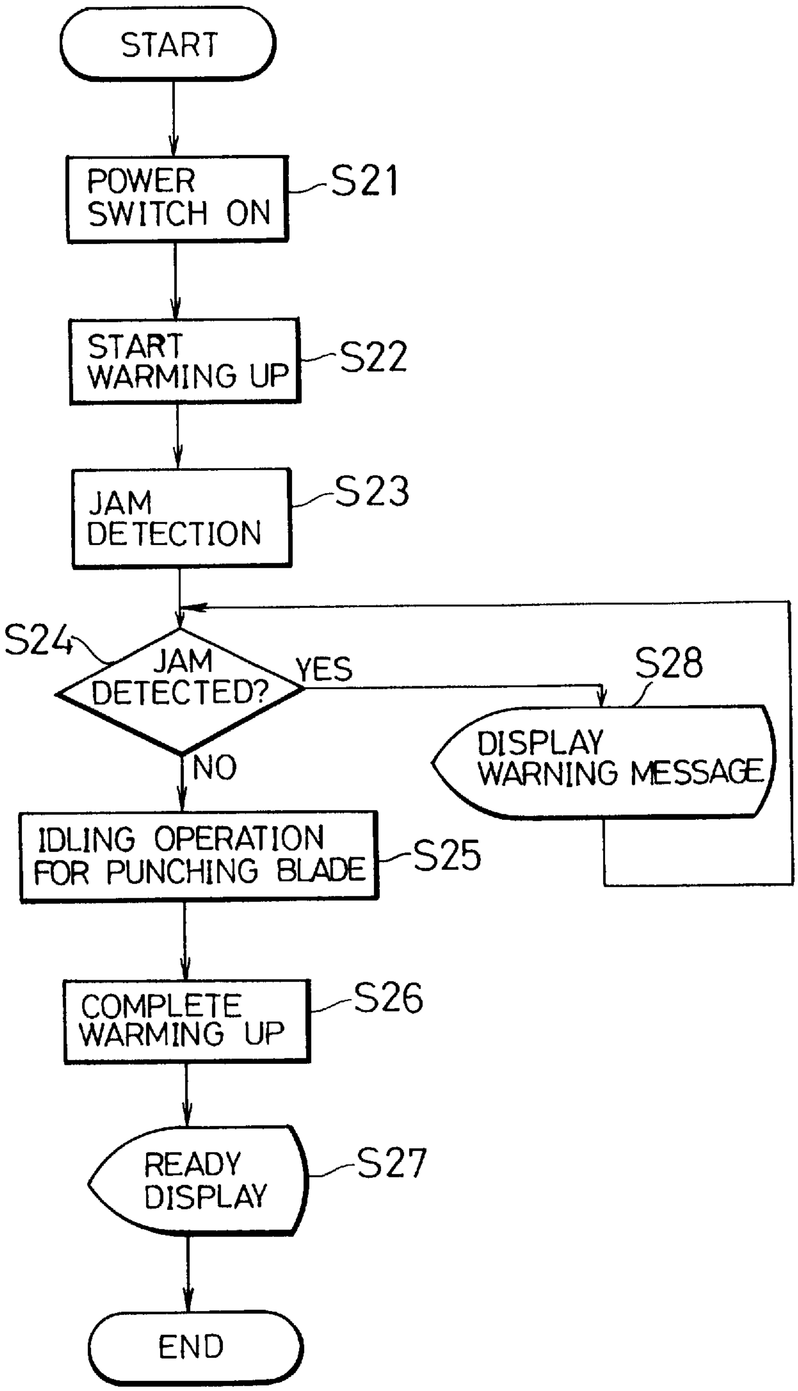
FIG. 23 is a flow chart showing a sequence of processes that are carried out during the warm-up of the copying machine having the punching unit of FIG. 21.

Referring to the flow chart of FIG. 23, the following description will discuss the operation of the copying machine that is provided with the punching unit 151 having the above-mentioned arrangement.

When the power switch, not shown, on the operation section of the main body 1 is turned on (S21), the warm-up process is first carried out in the main body 1, prior to the copying operation (S22). During the warm-up process, the photosensor 154 carries out a detection to find any paper jam inside the punching unit 151. (S23). If a paper jam occurs, the sheet of paper P blocks light emitted from the light-emitting section 154*a* such that the light-receiving section 154*b* is not allowed to receive the light and to release the light-receipt signal. In contrast, if the sheet of paper is transported normally after the punching operation, the light from the light-emitting section 154*a* is received by the light-receiving section 154*b*, thereby allowing the light-receiving section to release the light-receipt signal.

Next, the CPU 155 confirms the occurrence of paper jam in accordance with the output from the photosensor 154 (S24). If there is no paper jam, the punching member 38 is driven one time to execute an up-and-down movement with no sheet of paper P (S25). Prior to this process, the CPU has supplied a voltage to the piezoelectric element 53 during the warm-up process, and the piezoelectric element 53 thus makes an electrical discharge at S25, thereby allowing the punching member 38 to execute the up-and-down movement once. If the piezoelectric element 53 is left with static electricity accumulated therein, that is, if the electrical discharge is not made, the punching member 38 will be kept at the lowered state and block the sheet of paper P inside the transport guide 31. In contrast, this arrangement, which allows the punching device 38 to make the up-and-down movement at S25, makes it possible to return the punching member 38 to the stand-by station, thereby preventing the occurrence of paper jams.

Thereafter, the warm-up process is completed (S26), and the display panel 92 on the operation section 90 shows that the copying operation is now available (S27), thereby completing the sequence of processes that is necessary prior to the copying operation. In contrast, in the event of a paper jam at S24, the display s;hows a warning message on the display panel 92 (S28), and the step S24 is repeated again. Here, at S28 a decision is made to inhibit the copying operation and to display the warning message.

In the present embodiment, the arrangement as described above makes it possible to prevent jams of sheets of copy paper P in the punching unit 151 as well as preventing various troubles such as damages to the punching blade 38*a*.

Additionally, the preventive and monitoring methods for paper jams by the use of the above-mentioned arrangement further ensure a more stable operation of the punching unit 151 if they are adopted, on demand, before and after the copying operation or between the punching operations that are successively carried out.

[MODIFIED EXAMPLE]

The following description will discuss a modified example of the present embodiment.

In the above-mentioned embodiment, the photosensor 154 is used for detecting paper jams; whereas in this modified example, the photosensor 154 is used for judging whether or not a punching operation in question has been properly carried out. In accordance with the modified example, if light passes through a punch hole immediately after the punching operation, the judgement is made that the punching operation has been properly carried out. In contrast, if light is not allowed to pass, the judgement is made that the punching operation has not been properly carried out. In the present modified example, the CPU 155 makes the above-mentioned judgements, and it makes the punching member 38 repeat the operation (at least once) if the judgement is made that the punching operation has not been properly carried out.

However, the present modified example is only applied to the arrangement where the entire portion or a punching portion of a sheet of paper P is positively stopped during the punching operation (for example, the arrangement of the punching unit 101 described in the second embodiment); it is not applied to the arrangement where the punching operation is carried out with the ;sheet of paper P being transported. Therefore, in order to adopt the present modified example, it is necessary to stop the transport rollers 34 and 35 temporarily during the punching operation.

Figure 24:
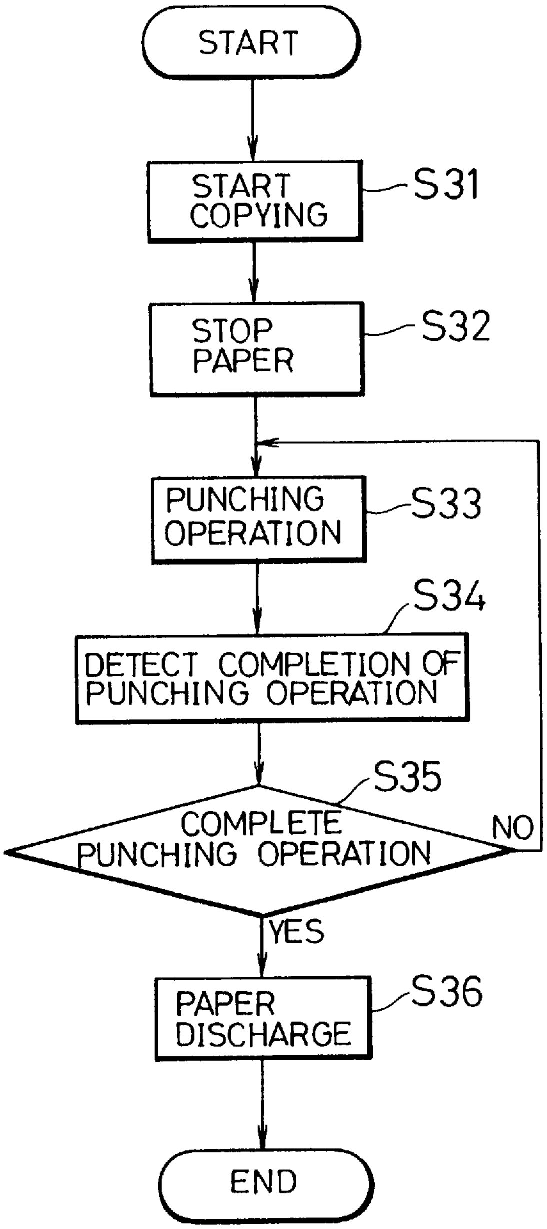
FIG. 24 is a flow chart showing a sequence of processes that are carried out in order to monitor the completion of the punching operation of the punching unit in a modified example of the third embodiment of the present invention.

Referring to the flow chart of FIG. 24, the following description will discuss the operation of the copying machine in accordance with the present modified example.

First, a copying operation is started (S31), and a sheet of paper P is stopped in the punching unit 151 (S32), where a punching operation is carried out (S33). Next, the photosensor 154 makes a detection as to the completion of the punching operation (S34), and if the punching operation has been completed, the transportation is resumed (S35), thereby allowing the sheet of paper P to be discharged (S36). If the punching operation has not been completed at S35, the sequence proceeds to S33.

As described above, in the present modified example, if the punching operation has not been carried out properly, the punching operation is executed again; this makes it possible to prevent erroneous punching processes and improper punching processes.

[EMBODIMENT 4]

Referring to FIGS. 1 and 2 as well as FIGS. 25 through 54, the following description will discuss the fourth embodiment of the present invention. Here, those members that have the same functions and that are described in the first through third embodiments are indicated by the same reference numerals and the description thereof is omitted.

The copying machine of the present embodiment is provided with a shifting-type punching device 161 as the paper-punching device 27 of FIG. 1. The following description will discuss the arrangement of the shifting-type punching device 161 in detail.

Figure 25:
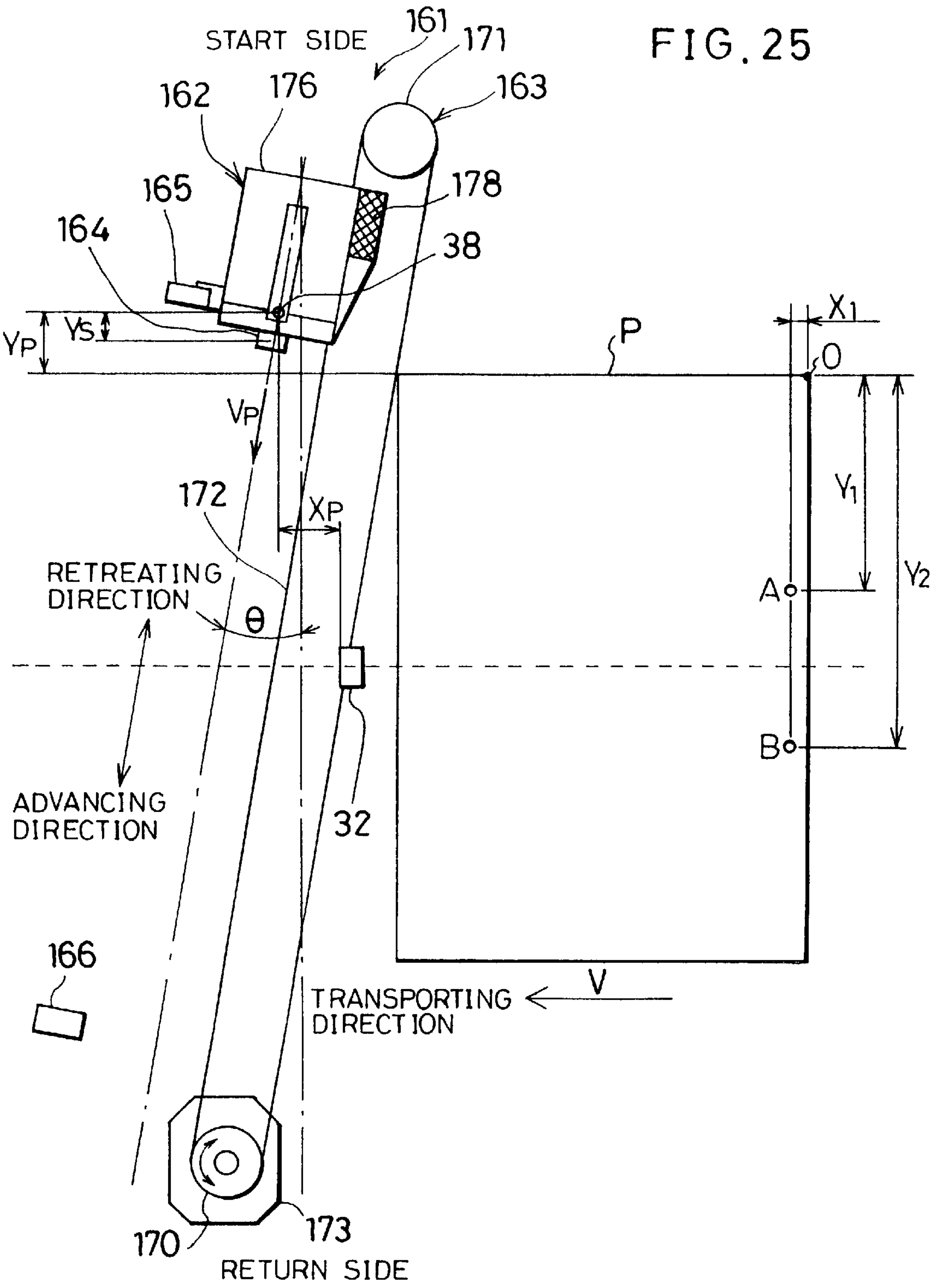
FIG. 25 is a plan view showing an arrangement of a shifting-type punching device in a copying machine in accordance with the fourth embodiment of the present invention.

As illustrated in FIG. 25, the shifting-type punching device 161 is constituted of: a photosensor 32, a punching unit 162, a punching-device shifting mechanism (shifting means) 163, a sheet-side-edge sensor 164, a home-position sensor 165, and a return-position sensor 166. The shifting-type punching device 161 is further provided with: a transport guide 167 (transport path) and transport rollers 168 and 169 (transporting means), shown in FIG. 26, as well as a punch-scraps collecting device 170 shown in FIG. 28.

The transport guide 167 has two plates, an upper plate 167*a* and a lower plate 167*b*, that are disposed at upper and lower positions in parallel with each other so as to regulate the dislocation of a sheet of paper P in the longitudinal direction. The transport guide 167 is provided with an opening 167*c* that extends in the width-wise direction, and the punching unit 162 is arranged so as to be freely shifted at the opening 167*c*.

The transport rollers 168 and 169, which are pairs of driving and driven rollers respectively, are disposed at the opening attached to the transport guide 167. The transport roller 168 is located on the upstream side from the punching unit 162, and the transport roller 169 is located on the downstream side therefrom (the staple-sorter 29 side) These transport rollers 168 and 169 are driven by a motor, not shown, at the number of revolution making a peripheral speed of V. Thus, the sheet of paper P, transported from the upstream side, is transported to the downstream side at the transporting speed of V.

The photosensor 32 is disposed at an opening, not shown, that is located on the upstream side of the punching unit 162, that is, on the downstream side of the transport rollers 168 in the transport guide 167. The photosensor 32 is designed to release an ON signal during a period of time from the detection of the leading edge of the sheet of paper P that is passing through the transport guide 167 until the detection of the rear edge thereof.

The sheet-side-edge sensor 164 is installed on the advancing side of the punching unit 162. This sheet-side-edge sensor 164 is designed to release an ON signal during a period of time from the detection of the starting-side-edge of the sheet of paper P that is passing through the transport guide 167 until the detection of the returning-side-edge thereof, that is, the opposite side, while the punching unit 162 is advancing.

The home-position sensor 165 is installed at a position outside the maximum width of the sheet of paper P on the starting side of the punching unit 162. This home-position sensor 165 is designed to release an ON signal when the punching unit 162 is located at the home position that corresponds to a starting position.

The return-position sensor 166 is installed at a position outside the maximum width of the sheet of paper P on the returning side of the punching unit 162. This return-position sensor 166 is designed to release an ON signal when the punching unit 162 reaches the return position.

The punching-device shifting mechanism 163, which functions as a shifting means, is constituted of pulleys 170 and 171, a belt 172, and a driving motor 173. The belt 172 is wound around the pulley 170, to which the driving force of the driving motor 173 is transmitted, and the pulley 171 that is freely rotatable, and the upstream portion of the punching unit 162 is fixed to the belt 172. These pulleys 170 and 171 are arranged so that the belt 172 moves in a direction that makes an angle of $(90-\theta)°$ with respect to the transporting direction of the sheet of paper P. Thus, the punching unit 162, fixed to the belt 172, is allowed to move in the direction that makes the angle of $(90-\theta)°$ in accordance with the movement of the belt 172. This angle $\theta$ is a setting angle of the punching unit 162, and its setting method will be described later.

Further, the driving motor 173 is capable of rotating forward and backward. As the driving motor 173 rotates forward, the punching unit 162 is shifted in the advancing direction, and as the driving motor 173 rotates backward, the punching unit 162 is shifted in the retreating direction.

Figure 27:
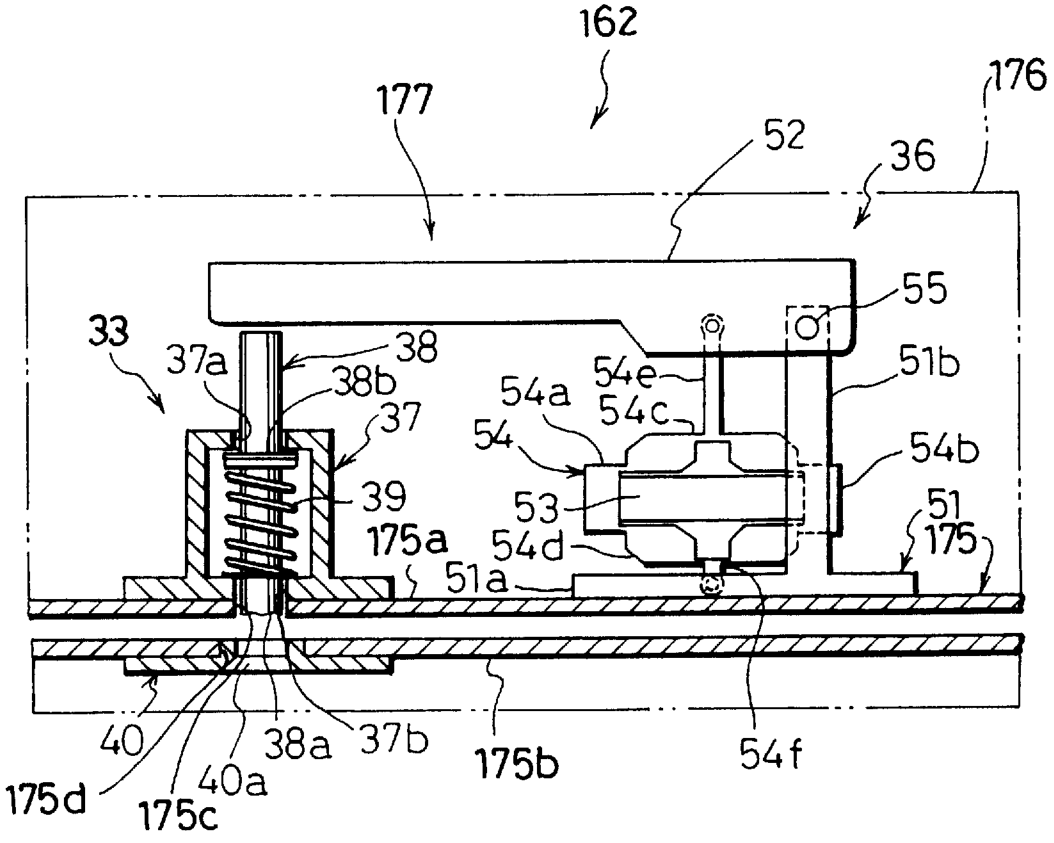
FIG. 27 is a vertical cross-sectional view of the punching unit of FIG. 26 when seen from the upstream side of the transport guide.

As illustrated in FIG. 27, the punching unit 162 is constituted of a punching device 33, a driving device 36, a paper guide 175 consisting of an upper plate 175*a* and a lower plate 175*b*, and a case section 176 for housing these punching device 33, driving device 36 and paper guide 175. The punching device 33 and the driving device 36 for driving the punching device 33 constitute a punching machine 177. Here, FIG. 27 is a cross-sectional view when seen from the upstream side in the paper-transporting direction.

The punching device 33 is provided with a punching member 38, a housing case 37, a resetting spring 39, and a punching die 40. The through hole 37*b* of the housing case 37 coincides with an opening 175*c* that is provided in the upper plate 175*a*.

The punching die 40, which is attached to the lower plate 175*b*, is fitted to an opening 175*d* that is provided in the lower plate 175*b* so as to face the opening 175*c*. With this arrangement, when the punching member 38 is shifted downward, the punching blade 38*a* reaches the inside of a tube section 40*a*.

The driving device 36 is constituted of a support member 51, a pressing bar 52, a piezoelectric element 53, and a distortion-enlarging mechanism 54. In the driving device 36, a dimensional distortion exerted on the piezoelectric element 53 is enlarged by the distortion-enlarging mechanism 54, and is transmitted to the pressing bar 52, thereby allowing the punching member 38 to be depressed downward.

Figures 28A, 28B:
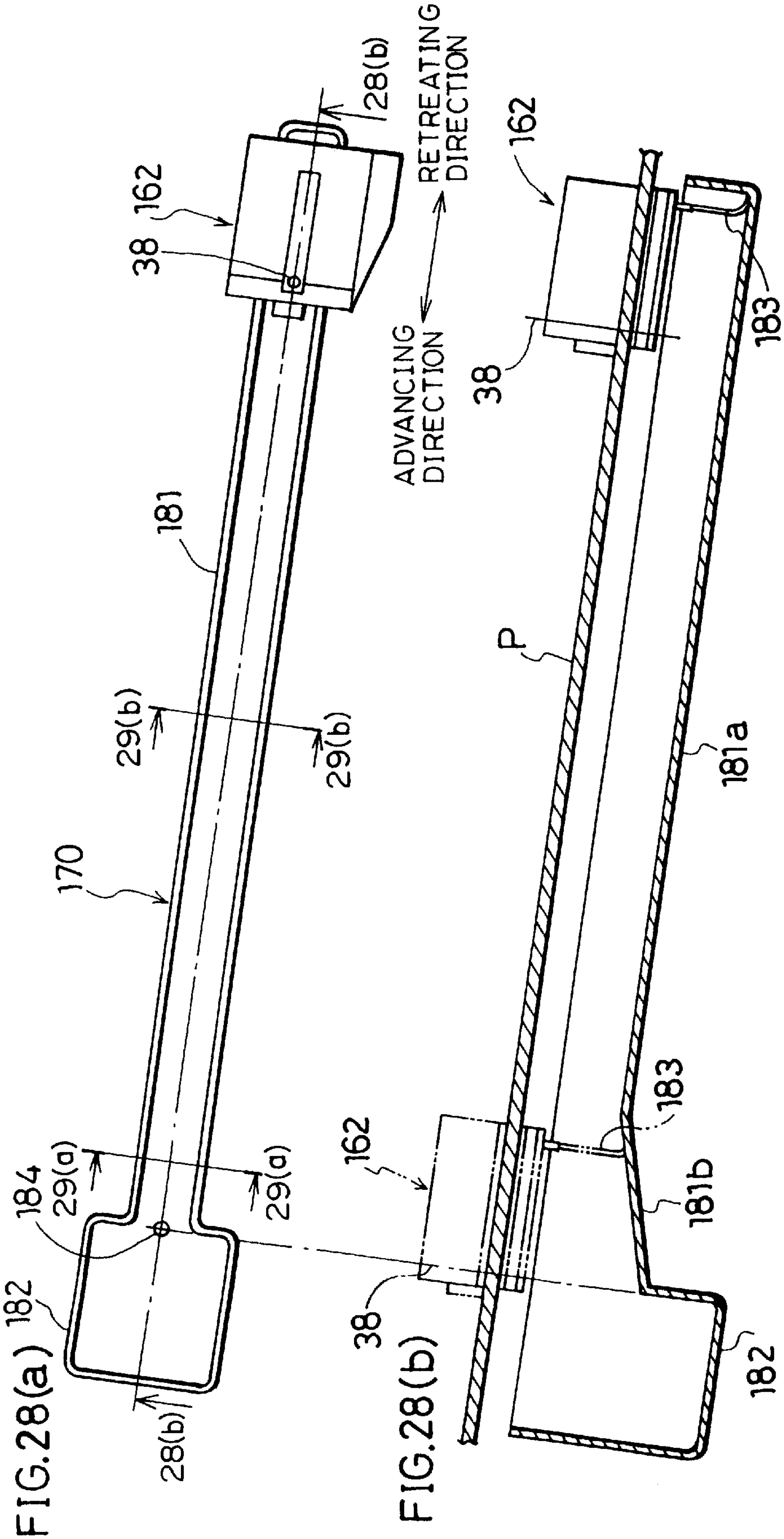
FIG. 28(*a*) is a plan view showing an arrangement of a punch-scraps collecting device that is provided in the shifting-type punching device of FIG. 25.

As illustrated in FIGS. 28(*a*) and 28(*b*), the punch-scraps collecting device 170, which is constituted of a punch-scraps receiving section 181, a punch-scraps storing case 182, and a punch-scraps collecting member 183, is disposed on the lower side of the shifting-type punching device 161 so as to be suitable for the shifting range of the punching unit 162.

The punch-scraps receiving section 181 is disposed in parallel with the shifting direction of the punching unit 162, and is arranged to receive punch scraps ejected from the punching unit 162. The punch-scraps storing case 182 is disposed on the return side of the punching unit 162 in the punch-scraps receiving section 181. The punch-scraps storing case 182 stores punch scraps accumulated inside the punch-scraps receiving section 181.

The punch-scraps collecting member 183 is attached to the under surface of the case 176 of the punching unit 162 on the rear side of the punching unit 162 in such a manner that its tip portion contacts the bottom surface of the punch-scraps receiving section 181. Thus, the punch-scraps collecting member 183 carries punch scraps accumulated inside the punch-scraps receiving section 181 into the punch-scraps storing case 182 as the punching unit 162 shifts in its advancing direction. Further, in order to wipe punch scraps accumulated at the corners inside the punch-scraps receiving section 181, the tip portion is allowed to contact the wall on the starting side in the punch-scraps receiving section 181 when the punching unit 162 is in the stand-by state at its home position.

The punch-scraps receiving section 181 is constituted of a horizontal portion 181*a* that is formed into a horizontal shape from the end on the home-position side to a position slightly before the position of the punch-scraps collecting member 183 at which the punching unit 162 carries out the punching operation at the farthest operative position 184, that is, at the farthest punching position from the home position, and a slope portion 181*b* that starts from the end of the horizontal section 181*a* and ends slightly before the punch-scraps storing case 182. This slope portion 181*b* allows punch scraps to fall into the punch-scraps storing case 182 by gravity. In addition, the present embodiment is provided with a vibrator, not shown, for applying vibration to the slope portion 181*b* so that the vibration and the slope ensure that punch scraps be carried into the punch-scraps storing case 182, even if the punch-scraps collecting member 183 is not allowed to reach the entrance of the punch-scraps storing case 182. This arrangement shortens the shifting range of the punching unit 162 to a range from the home position to the farthest operative position 184; this makes it possible to shorten the operation time that is required for carrying punch scraps into the punch-scraps storing case 182, compared with the arrangement wherein the punching unit 162 reaches the entrance of the punch-scraps storing case 182.

Figure 29A:
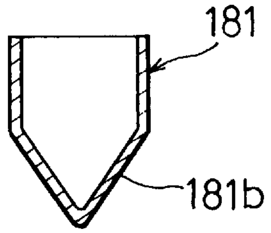
FIG. 29(*a*) is a cross-sectional view taken along the line B—B in FIG. 28(*a*) that shows the shape of the punch-scraps receiving section of the punch-scraps collecting device.
Figure 29B:
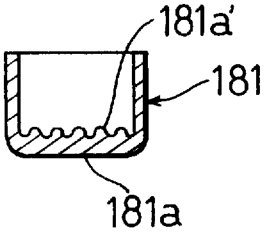

In addition, the slope section 181*b* is formed into a V shape as shown in FIG. 29(*a*) that is a cross-sectional view taken along the line B—B in FIG. 28(*a*). This shape further allows round punch scraps to easily roll along the slope without being stuck on the way. Moreover, the vibration applied to the slope portion 181*b* makes it possible to effectively carry punch scraps into the punch-scraps storing case 182, even in the case when it is difficult to provide a large tilt angle of the slope portion 181*b*.

Furthermore, as shown in FIG. 29(*b*) that is a cross-sectional view taken along the line C—C in FIG. 28, on the bottom of the horizontal portion 181*a* of the punch-scraps receiving section 181, a plurality of raised portions 181*a*' are formed with their lengthwise direction in parallel with the transporting direction of punch scraps. These raised portions 181*a*' minimize contact resistance between punch scraps and the bottom surface of the punch-scraps receiving section 181, thereby allowing punch scraps to be easily carried into the punch-scraps storing case 182.

The following description will discuss an outline of a control system for driving the shifting-type punching device 161.

Figure 30:
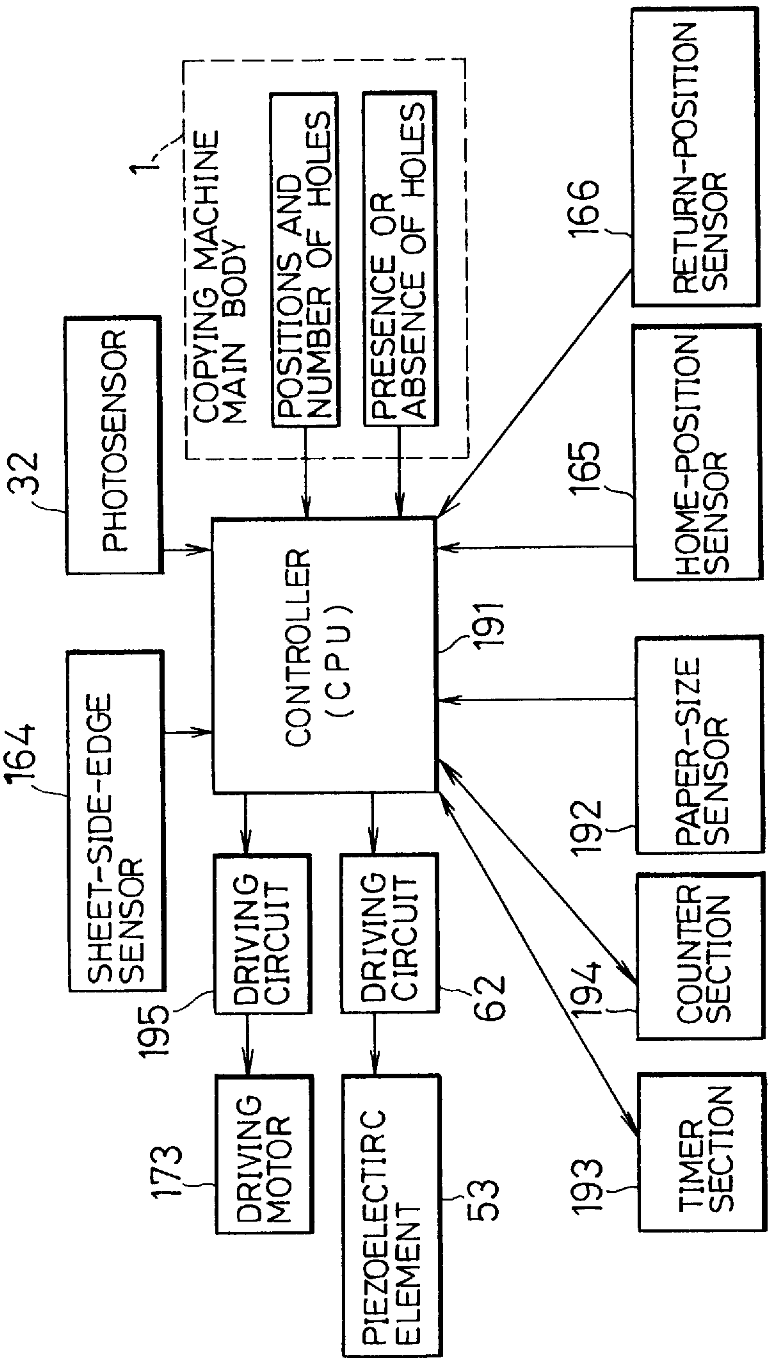
FIG. 30 is a block diagram showing a control system for controlling the operation of the shifting-type punching device in accordance with the fourth and fifth embodiments of the present invention.

As illustrated in FIG. 30, the control system is provided with a controller (control means, decision means) 191 consisting of a CPU (Central Processing Unit). To this controller 191, are connected the photosensor 32, the sheet-side-edge sensor 164, the home-position sensor 165, the return-position sensor 166, and the paper-size sensor 192 that is provided in the feeding section on the apparatus main body 1 side (see FIG. 1). Thus, detection signals from the respective sensors are inputted to the controller 191. The controller 191 is also connected to the apparatus main body 1, and various signals, such as those indicating whether or not a sheet of paper is transported, whether or not the punching operation is carried out on the transported sheet of paper (that is, whether or not the punching mode is on), and where and how many punch holes are made, are inputted thereto.

Moreover, to the controller 191 are also connected a timer section 193 for providing operative synchronization upon controlling the driving operation of the shifting-type punching device 161, which will be described later, and a counter section 194 for counting the number of punching operations. Furthermore, to the controller 191 are also connected the driving motor 173 through a driving circuit 195 and the piezoelectric element 53 through a driving circuit 62.

The following description will discuss the operation of the shifting-type punching device 161. Referring to the flow chart of FIG. 32 and the timing chart of FIG. 31, as well as referring to FIGS. 25, 2, 30, and FIGS. 33 through 36, an explanation is first given on a case where a punching operation is carried out on the rear-edge side of a sheet of paper P along its edge.

When the punching operation is carried out on the rear-edge side of the sheet of paper P along its edge, the driving motor 173 is controlled on its number of rotation, and thereby the punching unit 162 is shifted by the punching-device shifting mechanism 163 at a shifting speed of $V_P$. The shifting speed, $V_P$, which is determined to provide a suitable punching operation for the sheet of paper P that is being transported at a transporting speed of V through the transport guide 167, is calculated from the following equation by using the transporting speed V of the sheet of paper P and the aforementioned setting angle θ.

$$V_P = V/\sin\theta \qquad (3)$$

First, the user turns on the punch key 91 on the operation section 90 shown in FIG. 2, and then inputs a desired number of punch holes and desired positions for the respective punch holes by using the ten keys 94 and other keys (S41). At this time, upon turning on the punch key 91 of the operation section 90, predetermined messages are displayed on the display panel 92, and the user is able to input the desired number of punch holes and desired positions for the respective punch holes in accordance with the messages. As illustrated in FIG. 25, the positions for the punch holes are inputted as points in the X and Y coordinates: X-axis (+) represents the transporting direction of the sheet of paper P; Y-axis (+) represents the direction orthogonal to the transporting direction of the sheet of paper P; and one of the four corners of the sheet of paper P, indicated by point O in FIG. 25, is inputted as the origin. Here, supposing that the first punch hole A and the second punch hole B are formed, the number of punch holes N=2, the position of the first punch hole A ($X_1$, $Y_1$), and the position of the second punch hole B ($X_1$, $Y_2$) are inputted. In other words, the position of the first punch hole A is represented by the distance $X_1$ from the rear edge of the sheet of paper and the distance $Y_1$ from the edge on the starting side, and the position of the second punch hole B is represented by the distance $X_1$ from the rear edge of the sheet of paper and the distance $Y_2$ from the edge on the starting side.

After completion of the input process, the user presses the print key 97. This action initiates the transporting process of a sheet of paper P. In this case, if the number of punch holes and the positions for the respective punch holes have not been inputted, the punching operation is carried out based on regular number of punch holes and their positions, which are preset in a memory section, not shown, in accordance with the size of the sheet of paper P detected by the paper-size sensor 192.

The punching unit 162 is kept in the stand-by state at the home position on the starting side shown in FIG. 25 until its operation is started. This is detected by the ON state of the home-position sensor 165 (see FIG. 31). When the sheet of paper P is transported through the transport guide 167, the photosensor 32 turns on upon detection of the leading edge of the sheet of paper P. When the sheet of paper P is further transported to a position shown in FIG. 33, the photosensor 32 turns off upon detection of the rear edge of the sheet of paper P (see FIG. 31, and S42 and S43 in FIG. 32). Triggered by this drop from ON to OFF in the signal due to the detection of the rear edge of the sheet of paper P, the punching unit 162 starts its operation. First, the timer tx1 of the timer section 193 is reset (S44), and then the start time $T_0$ of the punching unit 162 is calculated (S45).

The start time $T_0$, which corresponds to waiting time from the detection of the rear edge of the sheet of paper till the start of the punching unit 162, is calculated from the following equation, wherein as illustrated in FIG. 25, the distance $X_1$ from the rear edge of the first and second punch holes A and B, the installation distance $X_P$ of the photosensor 32 in the transporting direction with respect to the home position of the punching member 38, and the transporting speed V of the sheet of paper P are used.

$$T_0=(X_P-X_1)/V \tag{4}$$

In this case, the range of $X_1$, that is, the range from the rear edge of the sheet of paper wherein the formation of punched holes is available, is given as follows:

$$X_{MIN}<X_1<X_P$$

The value $X_{MIN}$ is determined so that it provides a range which ensures suitable punched holes with a predetermined radius R+α (error) and a proper filing process of sheets of paper P without causing any rupture or other problems. For example, in the case of punched holes with the radius R=3 mm, it is commonly determined to 5 to 10 mm.

Figure 31:
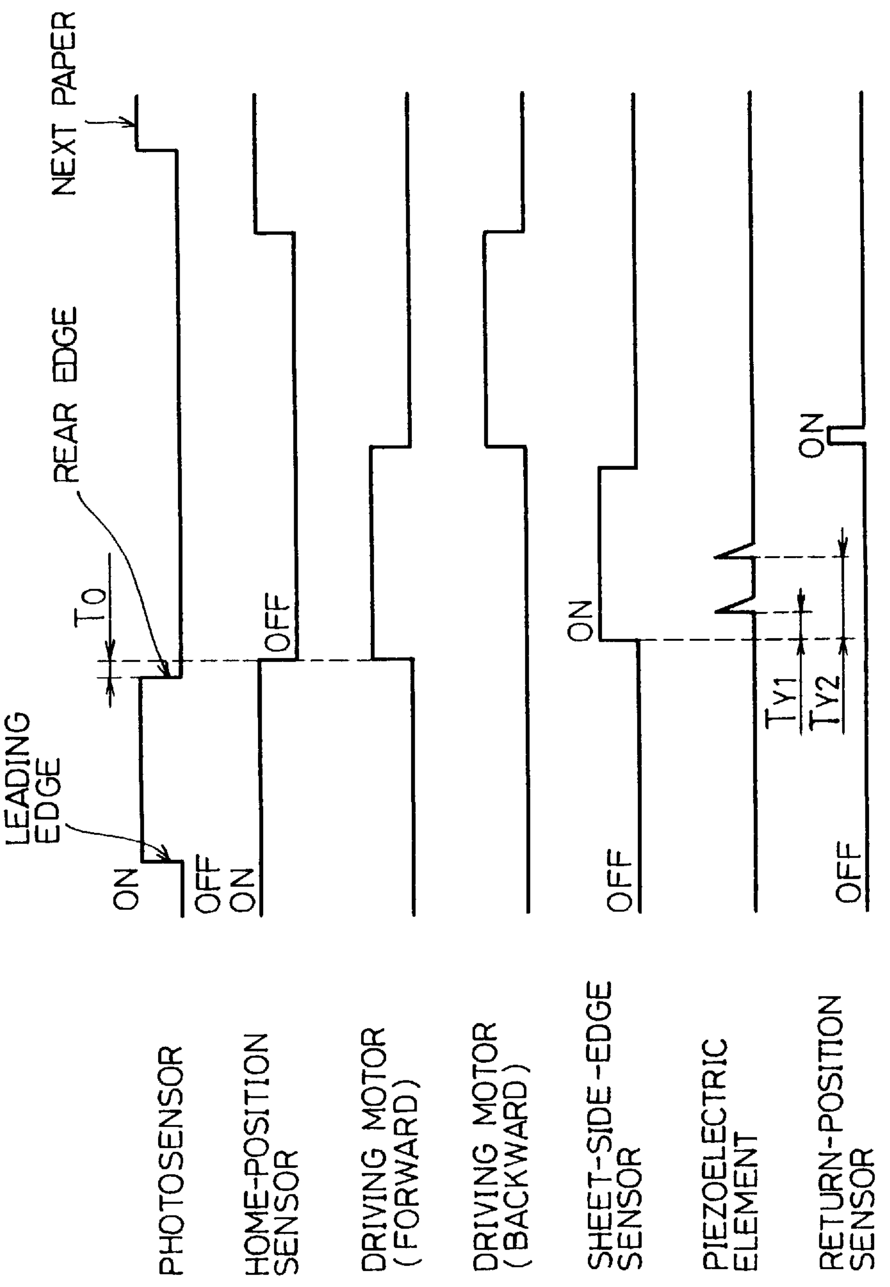
FIG. 31 is a timing chart that shows the operation of the shifting-type punching device of FIG. 25.

The start time $T_0$ is calculated by the timer tx1, and upon completion of the calculation of the start time $T_0$ (S46), the driving motor 173 is driven to rotate forward (see FIG. 31). Thus, the punching unit 162 is shifted in the advancing direction (S47). At this time, its shifting speed is given as the above-mentioned shifting speed $V_P$. Further, the home-position sensor 165 turns off in response to the start of the punching unit 162 (see FIG. 31).

After the start of the punching unit 162, the sheet-side-edge sensor 164 turns on when it detects the starting-side-edge of the sheet of paper P (see FIG. 31, S48). Triggered by this rise from OFF to ON of the sheet-side-edge sensor 164, timers ty1 and ty2 in the timer section 193 are respectively reset (S49). Successively, the arrival times $T_{Y1}$ and $T_{Y2}$ to the first and second punch holes A and B are respectively calculated (S50).

Figure 33:
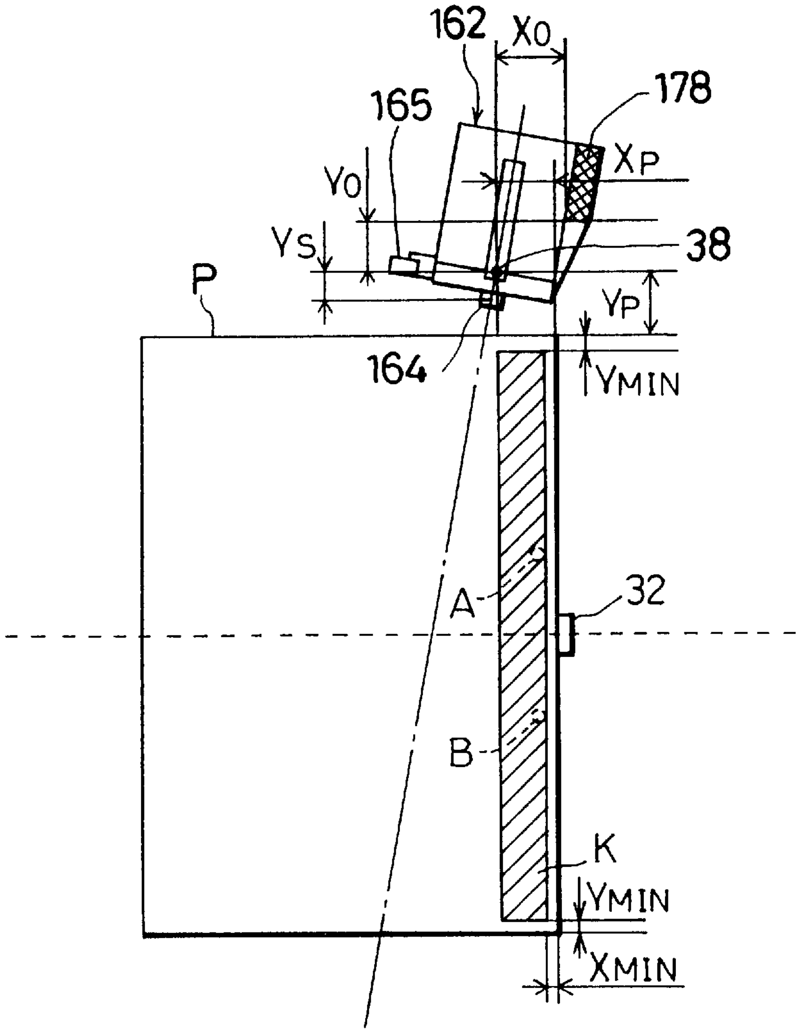
FIG. 33 is an explanatory drawing that shows a positional relationship between a sheet of paper wherein punch holes are formed and the punching unit of FIG. 26 that is in the stand-by state at the home position.
Figure 34:
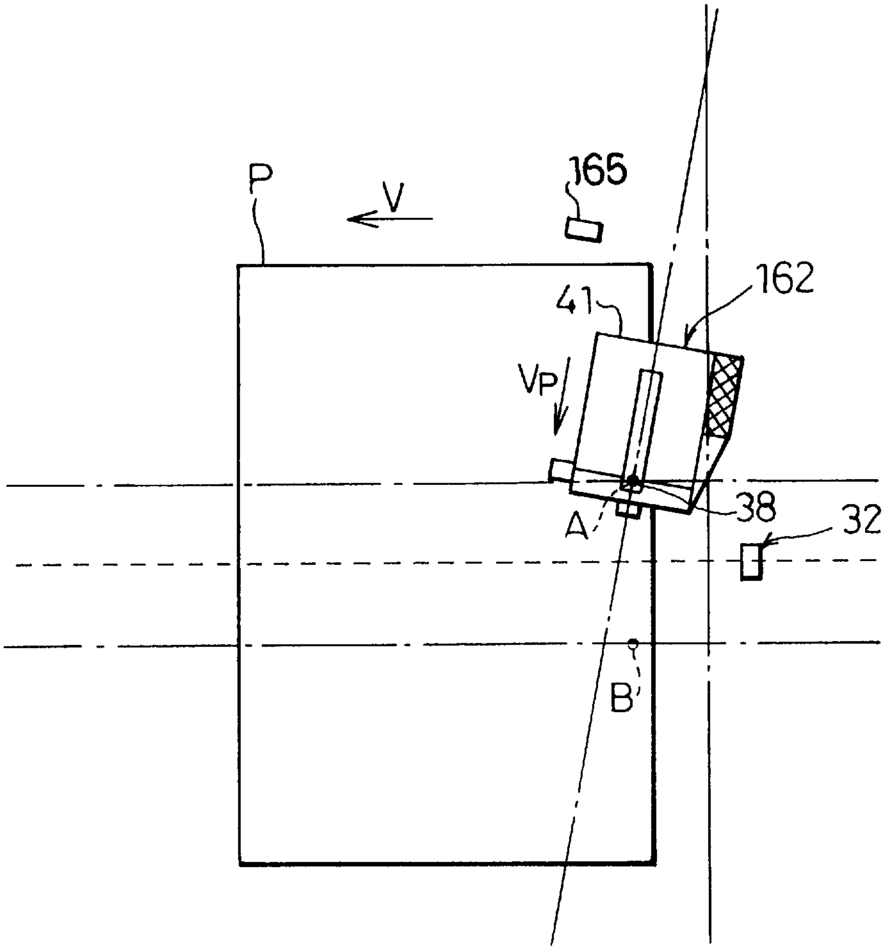
FIG. 34 is an explanatory drawing that shows a positional relationship between the punching unit of FIG. 26 and a sheet of paper wherein punch holes are formed in the case when the first punch hole is formed.

These arrival times $T_{Y1}$ and $T_{Y2}$ are calculated from the following equations, wherein the following factors, shown in FIG. 25 or FIG. 33, are used: the installation distance $Y_S$ of the paper sensor 164 in the direction orthogonal to the transporting direction with respect to the home position of the punching member 38, the distances $Y_1$ and $Y_2$ from the starting-side-end of the first and second punch holes A and B, and one component $V_Y$ of the speed of the punching unit 162 in the direction orthogonal to the transporting direction.

$$T_{Y1}=(Y_1+Y_S)/V_Y \tag{5}$$

$$T_{Y2}=(Y_2+Y_S)/V_Y \tag{6}$$

$$V_Y=V/\tan\theta \tag{7}$$

Figure 44:
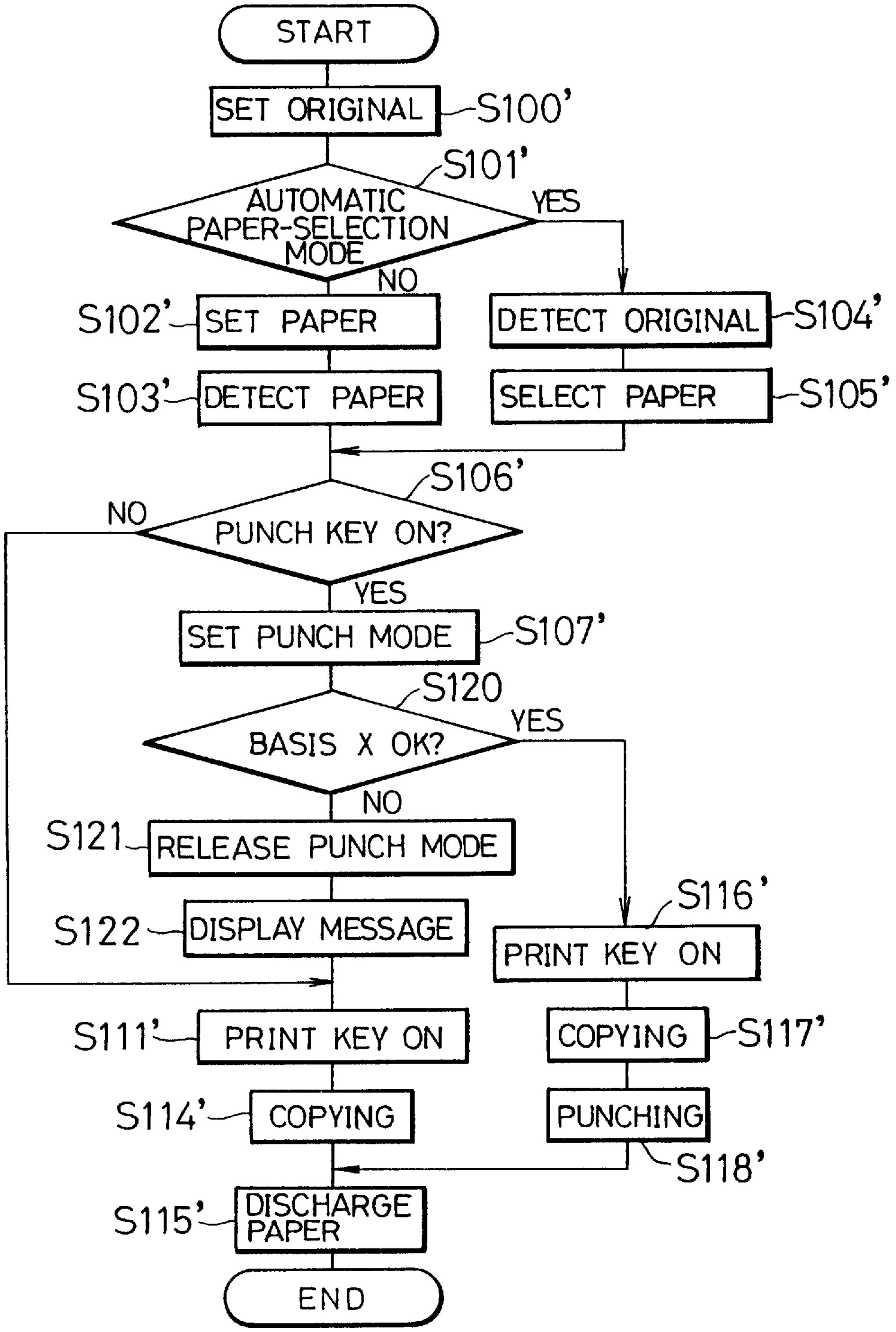
FIG. 44 is a flow chart showing a sequence of processes for another erroneous-copying preventive control in the copying machine provided with the shifting-type punching device of FIG. 25.
Figure 45A:
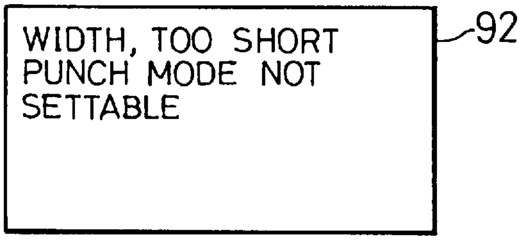
FIG. 45(*a*) is an explanatory drawing that shows a warning message to be displayed on the display panel in the case when the width of a sheet of paper is too short in the erroneous-copying preventive control of FIG. 44.
Figure 45B:
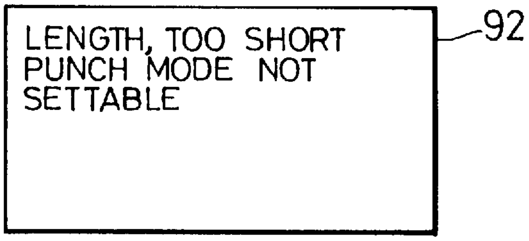
Figure 45C:
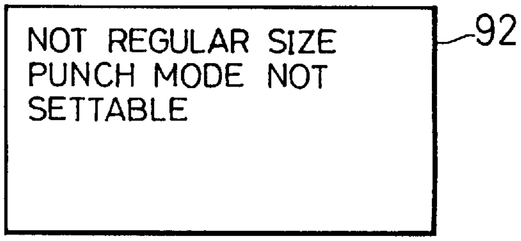
Figure 45D:
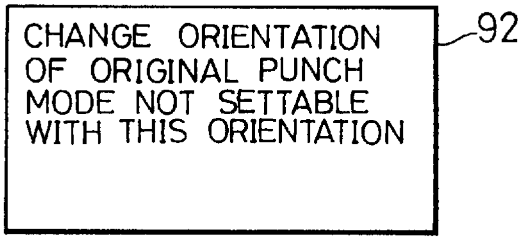
Figure 46:
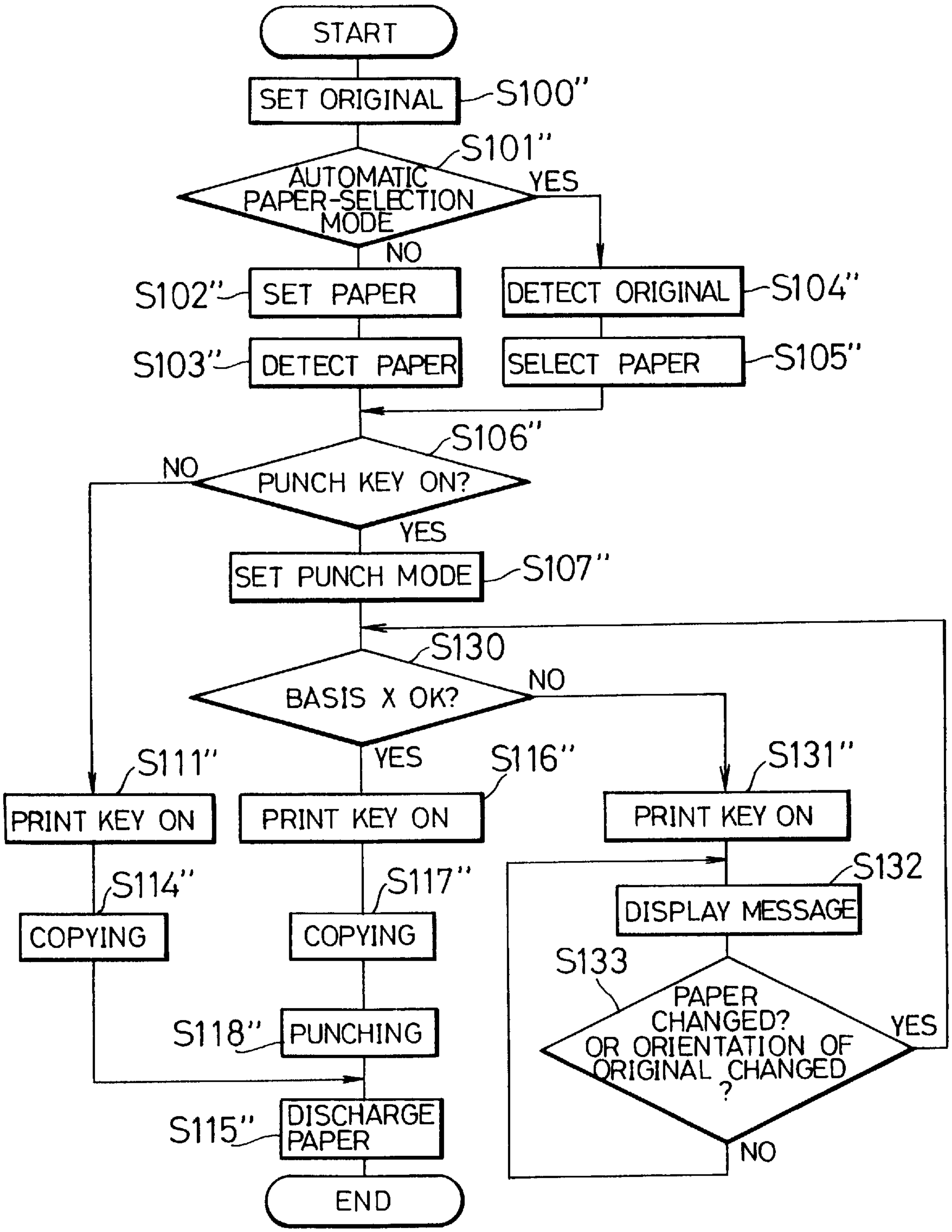
FIG. 46 is a flow chart showing a sequence of processes for still another erroneous-copying preventive control in the copying machine provided with the shifting-type punching device of FIG. 25.
Figure 47A:
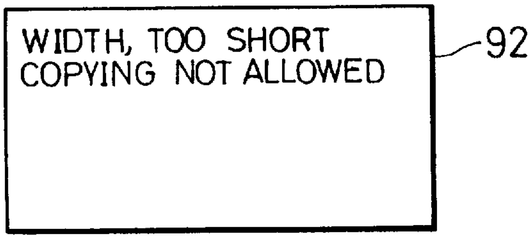
FIG. 47(*a*) is an explanatory drawing that shows a warning message to be displayed on the display panel in the case when the width of a sheet of paper is too short in the erroneous-copying preventive control of FIG. 46.
Figure 47B:
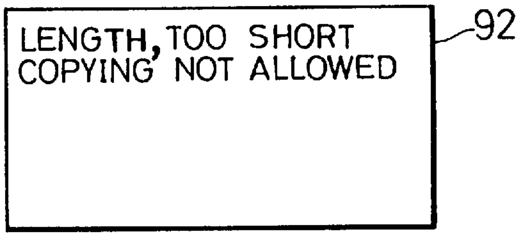
Figure 47C:
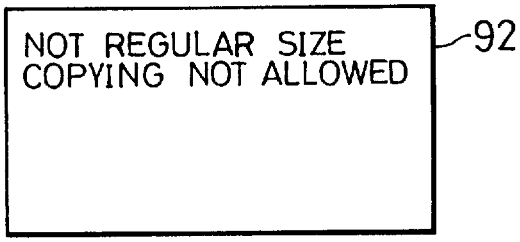
Figure 47D:
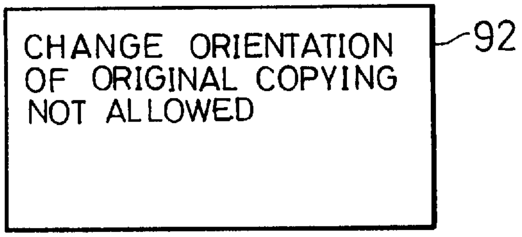
Figure 48:
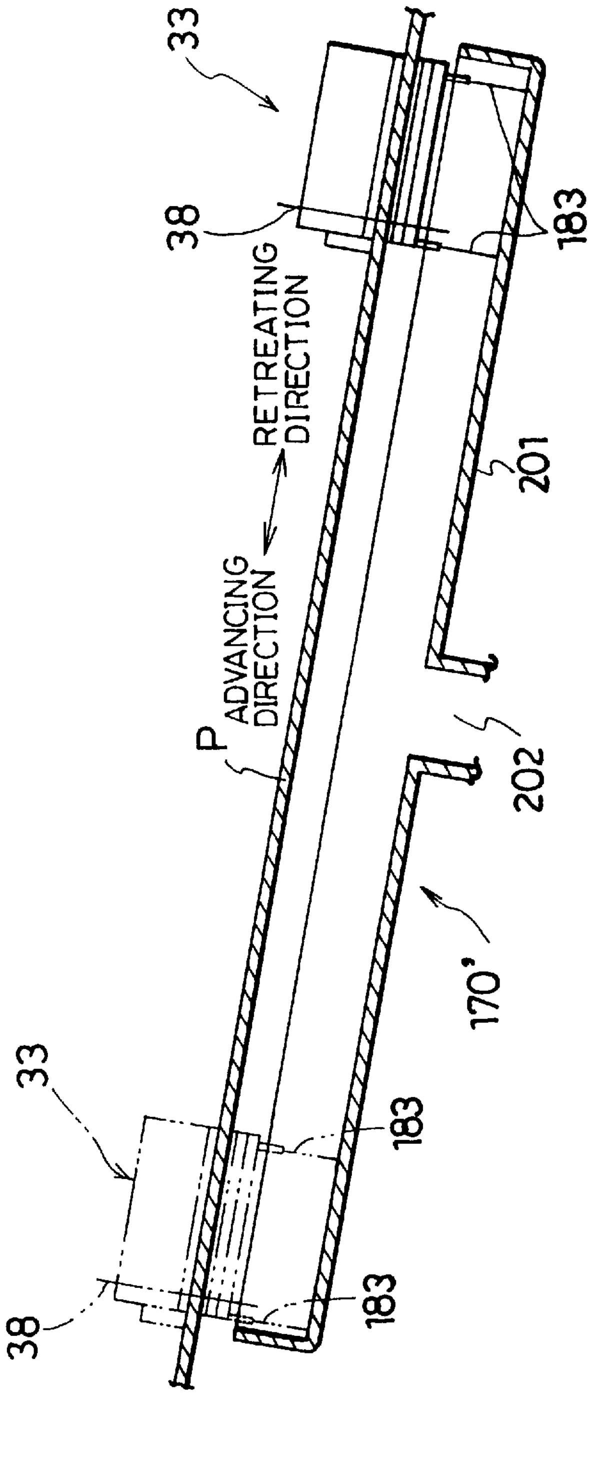
FIG. 48 is a vertical cross-sectional view showing an arrangement of a punch-scraps collecting device in accordance with the first modified example of the fourth embodiment of the present invention.

These arrival times $T_{Y1}$ and $T_{Y2}$ are respectively calculated by the timers ty1 and ty2. Upon completion of the calculation of the arrival time $T_{Y1}$ to the first punch hole A conducted by the timer ty1 (S51), the driving circuit 62 is turned on, and voltage is applied to the piezoelectric element 53 (See FIG. 31, S52). Thus, as illustrated in FIG. 44, simultaneously as the punching unit 162 reaches a forming position for the first punch hole A, the punching member 38 is driven so that the first punch hole A is formed in the sheet of paper P.

Figure 35:
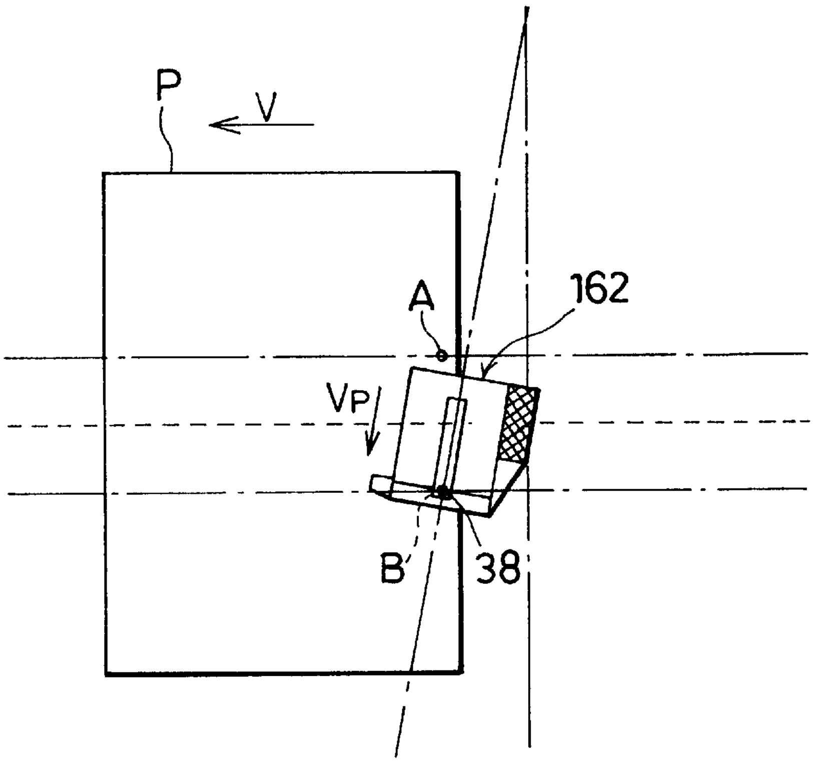
FIG. 35 is an explanatory drawing that shows a positional relationship between the punching unit of FIG. 26 and a sheet of paper wherein punch holes are formed in the case when the second punch hole is formed.
Figure 36:
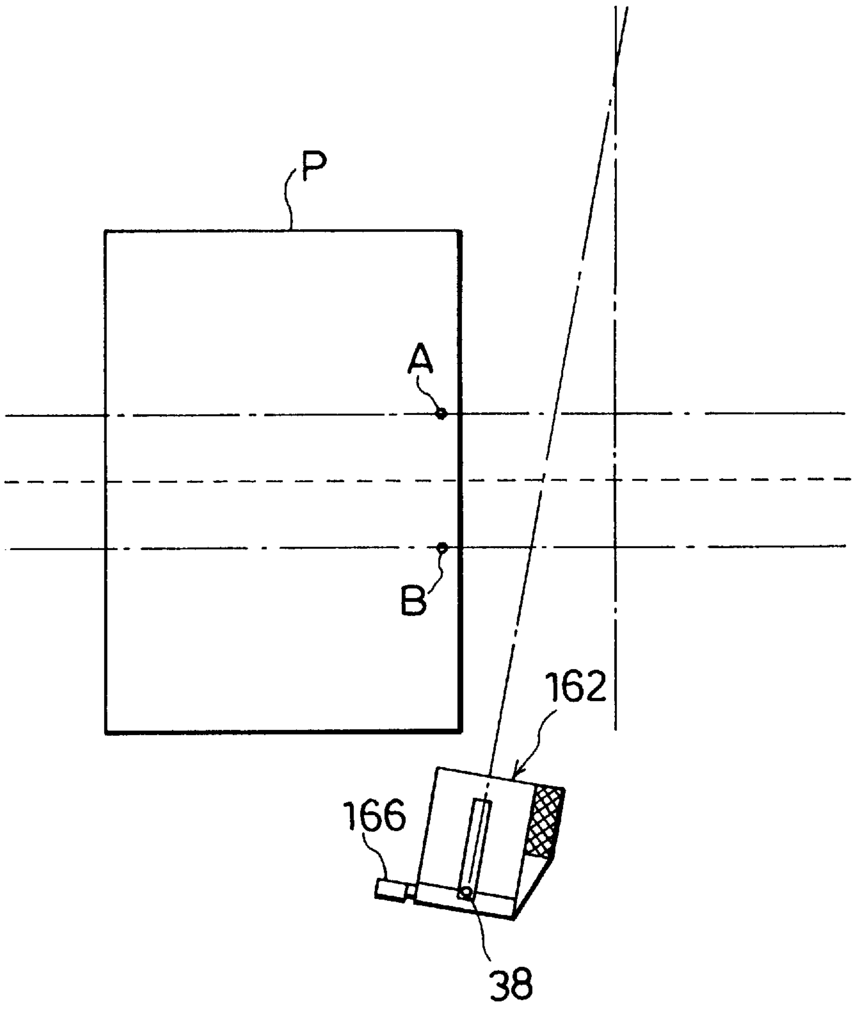
FIG. 36 is an explanatory drawing that shows a positional relationship between a sheet of paper wherein punch holes are formed and the punching unit of FIG. 26 that is located at the return position.

Successively, upon completion of the calculation of the arrival time $T_{Y2}$ to the second punch hole B conducted by the timer ty2 (S53), the driving circuit 62 is turned on, and voltage is applied to the piezoelectric element 53 (See FIG. 31, S54). Thus, as illustrated in FIG. 35, simultaneously as the punching unit 162 reaches a forming position for the second punch hole B, the punching member 38 is driven so that the second punch hole B is formed in the sheet of paper P.

After the second punch hole B, which is the last punch hole, has been formed, the punch counter in the counter section 194, shown in FIG. 30, counts up the count value (S55). Then, a judgement is made as to whether the count value has reached the predetermined number of times Z that has been predeterminately set (S56), and if it has been reached, the punching unit 162 is shifted to the return position at which the return-position sensor 166 turns on (S57). Consequently, the punch-scraps collecting member 183, attached to the punching unit 162, reaches the slope portion 181*b* of the punch-scraps receiving section 181 in such a manner that punch scraps that have been transported by the punch-scraps collecting member 183 are collected into the punch-scraps storing case 182.

Thereafter, the punch counter in the counter section 194 is reset (S58), and the driving motor 173 is driven backward (see FIG. 31). In contrast, if the count value has not reached the predetermined number of times Z at S56, the driving motor 173 is rotated backward without passing through the steps, S57 and S58. Thus, the punching unit 162 is stopped temporarily (S59), and is shifted in the retreating direction (S60). Thereafter, the punching unit 162 returns to the starting position, and upon the detection of this, the home-position sensor 165 turns on (see FIG. 31, S61). The turning on of the home-position sensor 165 allows the driving motor 173 to stop. Thus, the punching unit 162 is stopped (S62), thereby completing the sequence of processes and entering the stand-by mode until the next sheet of paper is detected by the photosensor 32.

In the above-mentioned operations of the shifting-type punching device 161, it is possible to form desired number of punch holes at desired positions with respect to a sheet of paper P that is being transported at the transporting speed V, as long as they are located within an area K indicated by slanting lines in FIG. 33. The area K covers a range from $X_{MIN}$ to $X_P$ in the transporting direction of the sheet of paper P and a range from the side edge of the sheet of paper P to the inside of $Y_{MIN}$ in the direction orthogonal to the transporting direction of the sheet of paper P. As with the aforementioned $X_{MIN}$, the value $Y_{MIN}$ is determined so that it provides a distance which ensures suitable punched holes and a proper filing process of sheets of paper without causing any rupture.

With this arrangement wherein the photosensor 32 detects the rear edge of a sheet of paper and the punching unit 162 is shifted in accordance with the detection signal so as to activate the punching member 38, it is possible to form punch holes with a constant distance from the rear edge of the sheet of paper P independent of the length of the sheet of paper P. Further, after the detection of the starting-side-edge of the sheet of paper P that is made by the sheet-side-edge sensor 164, the calculation is made to measure the distance from the edge to a punch hole to be formed with reference to the detected side edge, and at the time when the punching unit 162 has been shifted by the distance, a punching process is carried out. Therefore, independent of the width of the sheet of paper P, punch holes are always formed at a plurality of positions that have a constant distance from the starting-side-edge that is parallel to the transporting direction of the sheet of paper P.

As a result, even if a plurality of sheets of paper are transported with disparities in the direction orthogonal to the transporting direction, it is possible to form punch holes at the same positions as long as the sheets of paper have the same size.

Additionally, in the above-mentioned operations, the punch holes are formed at the positions $Y_1$ and $Y_2$ apart from the starting-side-edge of the sheet of paper P. Here, in general, positions at which punch holes are formed are located the same intervals, a mm, apart from the center of the sheet of paper P; therefore, the positions, $Y_1$ and $Y_2$, are determined as follows:

The respective sizes of regular sheets of paper are predeterminately registered in a storage section, not shown, in the controller 191 of the control system, and since the paper-size sensor 192 of the feeding section, provided in the apparatus main body 1, inputs a signal to the controller 191, it is possible for the controller 191 to preliminarily recognize the width of the sheet of paper P in question.

Therefore, for example, supposing that the width H mm of regular sheets of paper is registered in the storage section, $Y_1$ and $Y_2$ are found from the following operations by recognizing the size of a transported sheet of paper P by the use of the paper-size sensor 192.

$$Y_1=H/2-a \tag{8}$$

$$Y_2=H/2+a \tag{9}$$

Moreover, in the above-mentioned operations, only when the number of punching operations has reached the predetermined number of times Z, the punching unit 162 is shifted to the end point of the return side, at which punch scraps accumulated in the punch-scraps receiving section 181 are carried into the punch-scraps storing case 182. Therefore, it is not necessary to shift the punching unit 162 toward the punch-scraps storing case 182 for each punching operation; this make it possible to reduce burdens on the driving means, simplify the controlling system, and improve the operation speed. Thus, it becomes possible to apply the paper-punching device to copying machines with high-speed operations.

Additionally, in the above-mentioned arrangement, if the number of punching operations has not reached the predetermined number of times Z, the punching unit 162 is stopped and retreated after forming the last punch hole. However, another arrangement may be adopted, wherein each time the return-position sensor 166 turns on, the punching unit 162 is stopped at the corresponding position, and is retreated. This arrangement ensures that the punching unit 162 returns to the home position more accurately.

Next, explanations will be given on specific constructions of the device that provide more effective functions when the shifting-type punching device 161 is operated to form punch holes as described above.

First, an explanation will be given on a setting method of the setting angle θ of the punching unit 162. In the above-mentioned punching unit 162, it has been confirmed that the operation time of the punching member 38 is virtually 1 ms. This figure is achieved by using a so-called piezoelectric actuator wherein the dimensional distortion, which is caused by piezoelectric effects of the piezoelectric element 53, is utilized as the driving source for the operation of the punching member 38. The piezoelectric actuator enables an extremely high-speed operation, compared with cam operations and solenoid-driving operations, and its response capability is in the order of μs, while it is in the order of ms in the case of using solenoids. Although a slight delay occurs in the present embodiment due to a delay in operation in the mechanical section because of the distortion-enlarging mechanism 54 adopted therein, actual measurements show that the period of time required for the operation of the punching member 38 is virtually 1 ms.

In this connection, it has been confirmed through experiments that the relative speed between the sheet of paper P and the punching unit 162 has a limit of 1000 mm/sec. This limit is imposed because of the following reasons: the tips 43*a* of the blade 43 are shifted in accordance with the action of the punching member 38 while making a punch hole, and when this distance is large, punch holes tend to be deformed, thereby causing problems such as imperfect punch holes. The speed at which such problems are raised is referred to as the limited speed $V_L$.

The shift distance AL that is made during the punching operation is found from the following equation wherein the operation time of the punching member 38 is represented by t.

$$\Delta L=V_Y\times t \tag{10}$$

Supposing $V_Y$=1000 mm/sec and t=1 ms, ΔL=1 mm holds.

Figure 37:
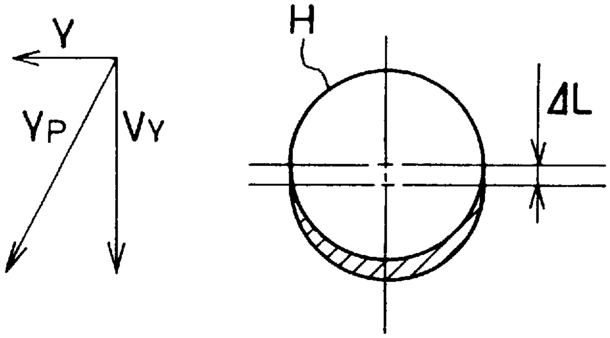
FIG. 37 is an explanatory drawing that shows a state where a punch hole is widened due to a punching operation carried out by the shifting-type punching device of FIG. 25.

In this case, if the sheet of paper P is fixed, the resulting punch hole will have an elliptic shape shown in FIG. 37. In FIG. 37, the portion indicated by slanting lines is an extended portion caused by the shift of the punching member 38. Here, in an actual operation, since the extended portion is reduced by warp and other factors of the sheet of paper P, this much deformation is not made, although it depends on fixing methods of the sheet of paper P.

In the case of forming punch holes along the edge on the rear-edge side of the sheet of paper P, since $V_Y$ increases as the transporting speed V of the sheet of paper P increases and as the setting angle θ decreases, as shown in the aforementioned equation 7, it exceeds the limited speed $V_L$. Therefore, in order not to make $V_Y$ exceed the limited speed $V_L$, the minimum setting angle $\theta_{MIN}$ is found from the following equation in relation to the transporting speed V of the sheet of paper P.

$$\theta_{MIN}=\tan^{-1}\cdot V/V_L \quad (11)$$

In accordance with the above equation, it is preferable to set the setting angle θ to not less than $\theta_{MIN}$. Here, in order to minimize the space in the transporting direction, it is most preferable to set θ equal to $\theta_{MIN}$. Therefore, in the shifting-type punching device 161 of the present embodiment, the setting angle θ is set to $\theta_{MIN}$.

Next, explanations will be given on a transporting method and a fixing method of sheets of paper P upon carrying out the punching operation. As described before, in the shifting-type punching device 161 of the present embodiment, sheets of paper P are transported by the transport rollers 168 and 169. A sheet of paper P transported from the upstream side is first transported by the transport roller 168, and after the rear edge of the sheet of paper P has passed through the transport roller 168, it is transported by only the transport roller 169. Here, the punching operation, which is carried out by the punching unit 162 disposed between the transport rollers 168 and 169, is initiated when the rear edge of the sheet of paper P passes through the photosensor 32. Thus, the sheet of paper P is always transported by only the transport roller 169 on the downstream side during the punching operation. Therefore, the rear-edge side of the sheet of paper P is kept at a free state without being fixed. This allows the sheet of paper P to warp easily, and this warp alleviates the influence of the shift distance ΔL during the punching operation effectively, thereby making it possible to minimize the influence of the shift distance ΔL. In other words, this arrangement, wherein only the transport roller on the downstream side is activated during the punching operation while the sheet of paper is not fixed on the upstream side from the punch-hole forming position, makes it possible to alleviate the distortion of the shape of punch holes that is caused by the shifting-type punching operation.

Figure 26:
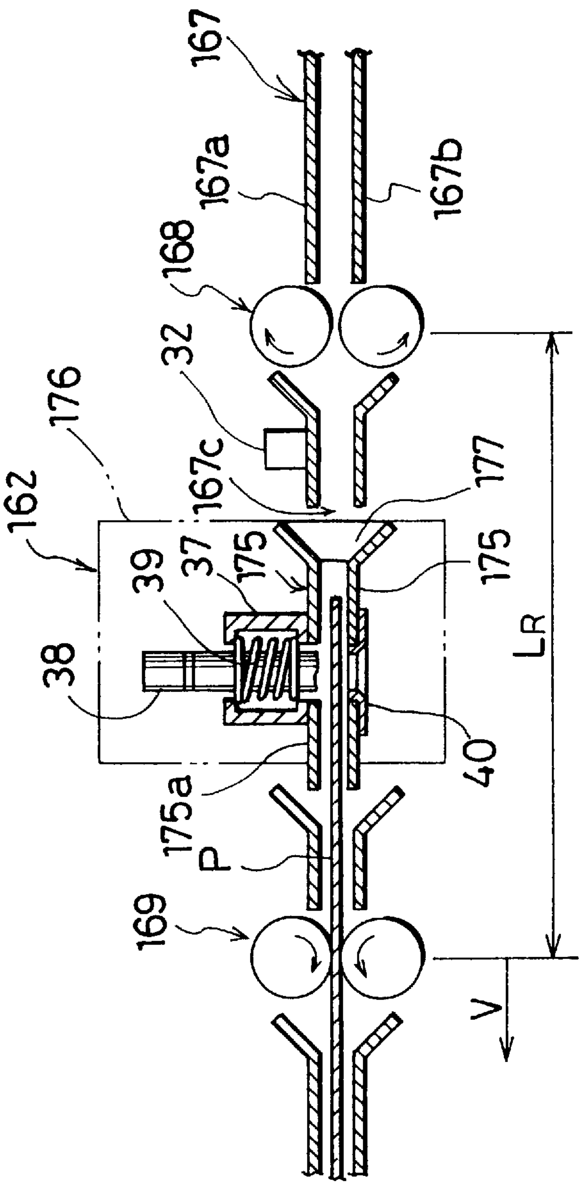
FIG. 26 is a vertical cross-sectional view showing an arrangement of a punching unit provided in the shifting-type punching device of FIG. 25.

In this case, the distance $L_R$ between the transport rollers 168 and 169 shown in FIG. 26 increases as the setting angle θ increases to widen the shifting range of the punching unit 162. This might cause the distance $L_R$ to exceed the length of the sheet of paper P in question. Therefore, it is necessary to keep the small a angle θ as small as possible, also from this point of view.

Figure 38:
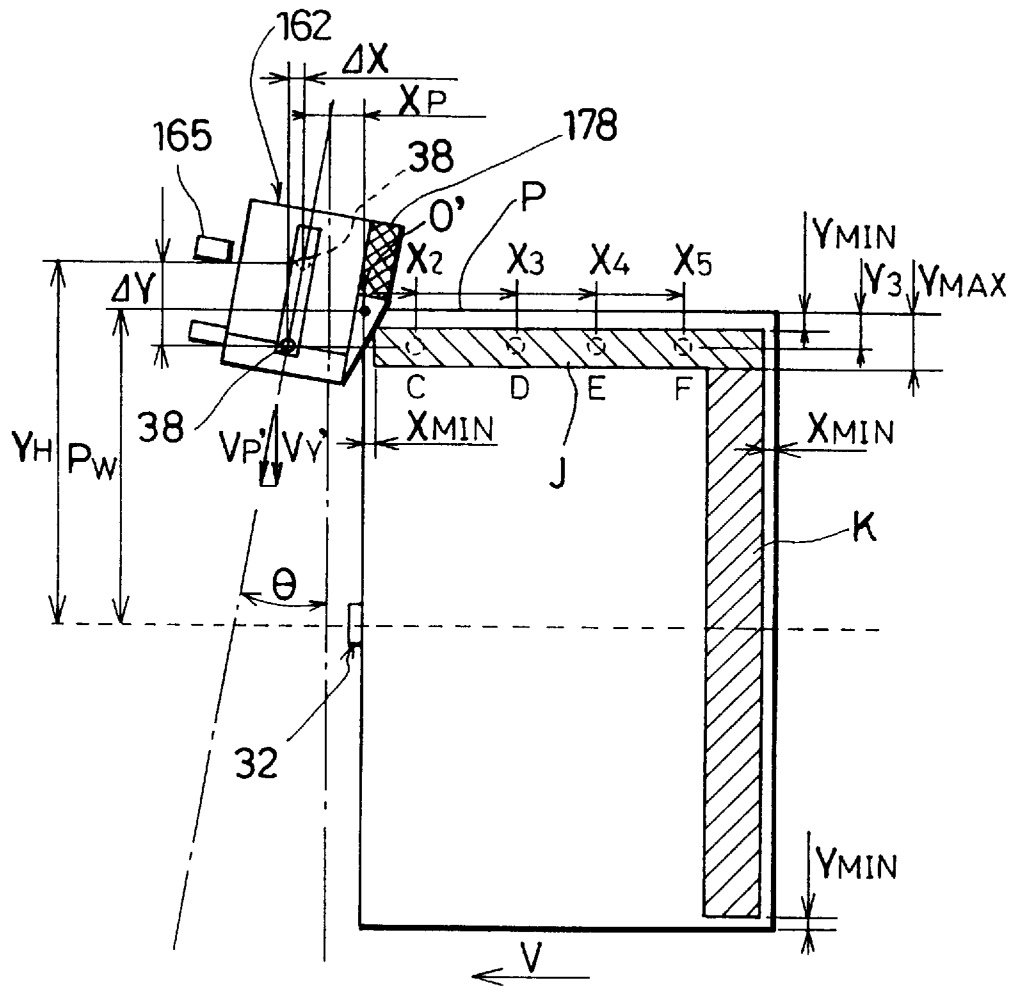
FIG. 38 is an explanatory drawing that shows a positional relationship between the punching unit and a sheet of paper in the case when punch holes are formed by the shifting-type punching device of FIG. 25 in the transporting direction of the paper.
Figure 39:
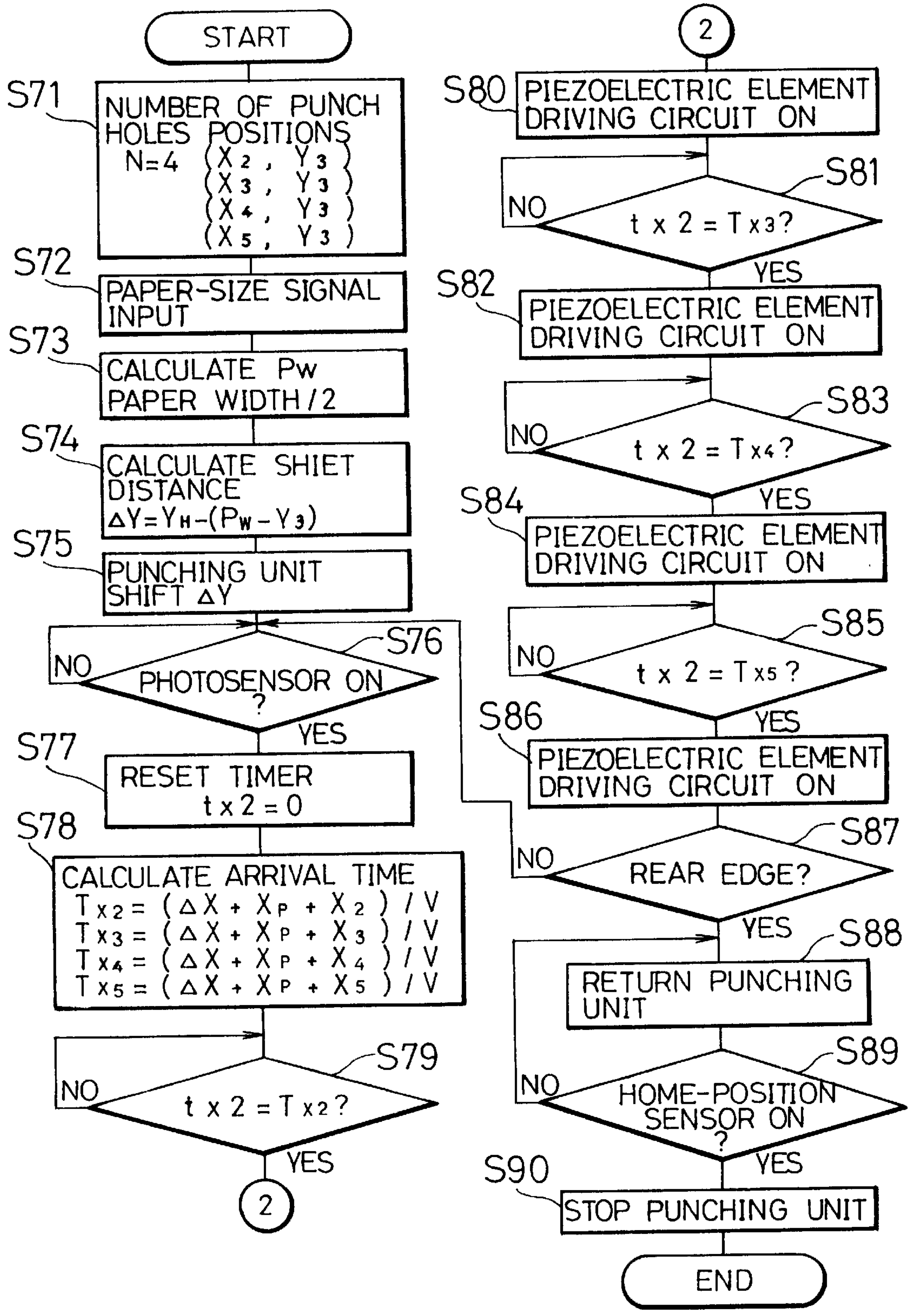
FIG. 39 is a flow chart showing a sequence of punching processes that are carried out when punch holes are formed by the shifting-type punching device of FIG. 25 in the transporting direction of a sheet of paper.
Figure 40A:
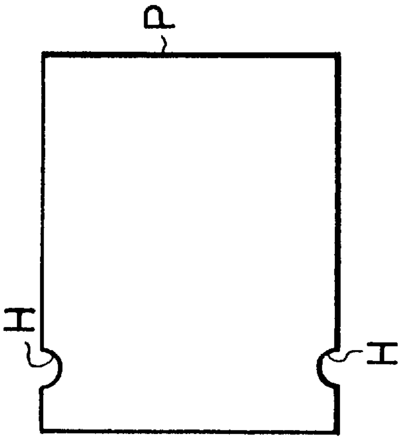
FIG. 40(*a*) is an explanatory drawing that shows defective punch holes that are caused when the width of sheet of paper is narrower than the interval of the punch holes.
Figure 40B:
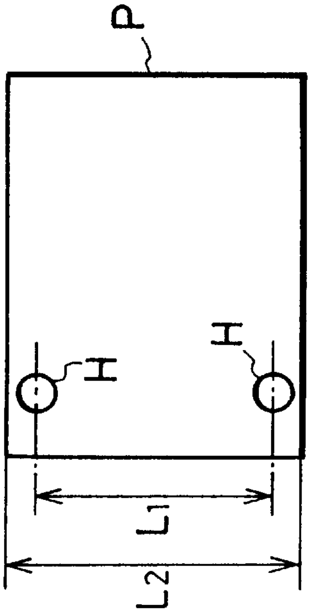
Figure 40C:
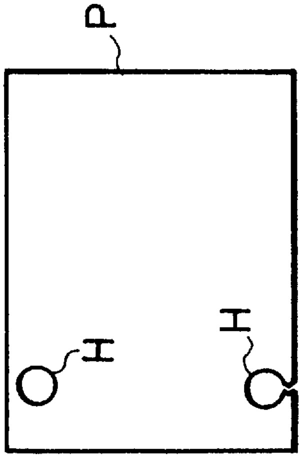
Figure 40D:
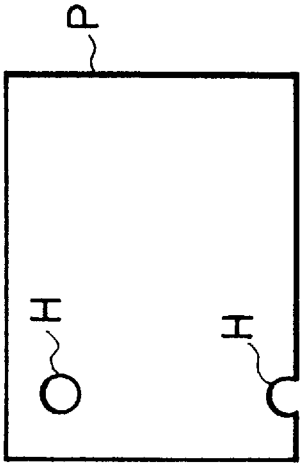

Next, referring to FIGS. 2, 25, 30 and 38, as well as to the flow chart of FIG. 39, an explanation will be given on a case where the punching operation is carried out along the side edge on the starting side of sheets of paper P. Here, as to the operation in the punching unit 162 for collecting punch scraps, since the same operation that is carried out where punch holes are formed on the rear-edge side of the sheets of paper P is used, the description thereof is omitted.

Different from the shifting speed $V_P$ in the case of carrying out the punching operation on the rear-edge side of the sheets of paper P, the shifting speed $V_P$" of the punching unit 162, which is used upon carrying out the punching operation along the side edge on the starting side of the sheets of paper P, is settable independent of the transporting speed V of the sheets of paper P.

First, as in the case of carrying out the punching operation on the rear-edge side of the sheets of paper P, the user enters a desired number of punch holes and desired positions for the respective punch holes (S71). Here, as illustrated in FIG. 38, the positions for the punch holes are inputted as points in the X and Y coordinates: X-axis (+) represents the transporting direction of the sheet of paper P; Y-axis (+) represents the direction orthogonal to the transporting direction of the sheet of paper P; and one of the four corners of the sheet of paper P, indicated by point O' in FIG. 38, is inputted as the origin.

Here, supposing that four punch holes are formed, the number of punch holes N=4, the position of the first punch hole C ($X_2$, $Y_3$), the position of the second punch hole D ($X_3$, $Y_3$), the position of the third punch hole E ($X_4$, $Y_3$), and the position of the fourth punch hole F ($X_5$, $Y_3$) are inputted. In other words, the position of the first punch hole C is represented by the distance $X_2$ from the rear edge of the sheet of paper and the distance $Y_3$ from the edge on the starting side, the position of the second punch hole D is represented by the distance $X_3$ from the rear edge of the sheet of paper and the distance $Y_3$ from the edge on the starting side, the position of the third punch hole E is represented by the distance $X_4$ from the rear edge of the sheet of paper and the distance $Y_3$ from the edge on the starting side, and the position of the fourth punch hole F is represented by the distance $X_5$ from the rear edge of the sheet of paper and the distance $Y_3$ from the edge on the starting side.

After completion of the setting process by the user, the width of the sheet of paper P is recognized by the paper-size signal sent from the paper-size sensor 192 shown in FIG. 30 that is installed in the feeding section in the apparatus main body 1, and $P_W$ representing a ½ of the paper width is calculated (S72 and S73). Then, based on the resulting $P_W$, the distance $Y_3$ from the punch hole to the starting-side edge of the sheet of paper P and the distance $Y_H$ from the center of the sheet of paper P to the home position of the punching member 38, the distance ΔY by which the punching unit 162 is shifted is calculated (S74). Here, the distance ΔY is found by the following equation:

$$\Delta Y=Y_H-(P_W-Y_3) \quad (12)$$

After the distance ΔY has been calculated in this way, the punching unit 162 is shifted by the distance ΔY (S75). In an actual operation, the driving time $T_{Y3}$ of the driving motor 173 is calculated in order to shift the punching unit 162 by the distance ΔY, and the driving motor 173 is driven forward for the driving time $T_{Y3}$ seconds to shift the punching unit 162. The driving time $T_{Y3}$ is found by the following equations:

$$T_{Y3}=\Delta Y/V_Y" \quad (13)$$

$$V_Y"=V_P" \cos\theta \quad (14)$$

Here, $V_Y$" represents a velocity in the direction orthogonal to the transporting direction of the sheet of paper P with respect to the shifting speed $V_P$" of the punching unit 162.

Next, when the sheet of paper P is transported through the transport guide 167 and the photosensor 32 is turned on (S76), the timer tx2 of the timer section 193 is reset (S77), triggered by this rise from OFF to ON of the photosensor 32. Then, respective arrival times $T_{X2}$, $T_{X3}$, $T_{X4}$, and $T_{X5}$ for the first punch hole C through the fourth punch hole F are calculated (S78).

These arrival times $T_{X2}$, $T_{X3}$, $T_{X4}$, and $T_{X5}$ represent periods of time from the detection of the leading edge of the sheet of paper until the respective predetermined positions on the sheet of paper P pass right under the punching member 38. They are found by the following equations based on the distances $X_2$, $X_3$, $X_4$, and $X_5$ from the leading edge of the sheet of paper to the respective punch holes, the setting distance $X_P$ of the photosensor 32 in the transporting direction with respect to the home position of the punching member 38, and the shifting distance ΔX, all of which are shown in FIG. 38.

$$T_{X2}=(\Delta X+X_P+X_2)/V \quad (15)$$

$$T_{X3}=(\Delta X+X_P+X_3)/V \quad (16)$$

$$T_{X4}=(\Delta X+X_P+X_4)/V \quad (17)$$

$$T_{X5}=(\Delta X+X_P+X_5)/V \quad (18)$$

where ΔX is represented by:

$$\Delta X=\Delta Y\cdot\tan\theta \quad (19)$$

The arrival times thus calculated are successively counted by the timer tx2 continuously, and when the arrival time $T_{X2}$ to the first punch hole C has been reached and the completion of the time counting is confirmed (S79), the driving circuit 62 turns on, thereby supplying a current to the piezoelectric element 53 (S80). Thus, at the time when the position for the first punch hole C, shown in FIG. 38, has arrived right under the punching member 38 of the punching unit 162, the punching member 38 is depressed, thereby forming the first punch hole C through the sheet of paper P.

Successively, when the timer tx2 has completed its time counting for the arrival time $T_{X3}$ to the second punch hole D (S81), the driving circuit 62 turns on, thereby supplying a current to the piezoelectric element 53 (S82). Thus, at the time when the position for the second punch hole D, shown in FIG. 38, has arrived right under the punching member 38 of the punching unit 162, the punching member 38 is depressed, thereby forming the second punch hole D through the sheet of paper P.

In the same manner as described above, upon completion of the time counting for the respective arrival times $T_{X4}$ and $T_{X5}$ for the third and fourth punch holes E and F at S83 and S85, the piezoelectric element 53 is activated (S84 and S86). At the times when the positions for the third punch hole D and the fourth punch hole F, shown in FIG. 38, have respectively arrived right under the punching member 38 of the punching unit 162, the punching member 38 is depressed, thereby forming the third punch hole E and the fourth punch hole F through the sheet of paper P.

The respective punch holes are formed in this manner, and when the photosensor 32 turns off (S87) upon the detection of the rear edge of the sheet of paper, the driving motor 173 is driven to rotate backward, and the punching unit 162 is shifted in the retreating direction (S88). Then, the punching unit 162 is returned to the starting position, the home-position sensor 165 is turned on again (S89), and the punching unit 162 is stopped (S90), thereby completing the sequence of processes. Thereafter, the sequence enters the stand-by mode until the next sheet of paper is detected by the photosensor 32.

In the above-mentioned operations of the shifting-type punching device 161, it is possible to form a desired number of punch holes at desired positions as long as they are located within an area J indicated by slanting lines in FIG. 38. The distance $Y_3$ from the starting-side edge of the sheet of paper P within this area J is represented as follows:

$$Y_{MIN}<Y_3<Y_{MAX}$$

As with the aforementioned $X_{MIN}$, the value $Y_{MIN}$ represents a distance which ensures suitable punch holes and a proper filing process of sheets of paper without causing any rupture or other problems. The value $Y_{MAX}$, on the other hand, represents a distance that is required for the connecting section 178 (shown by the cross-hatching in FIG. 38) of the upper and lower plates 175*a* and 175*b* of the paper guide 175 in the punching unit 162 to stay outside the width of the sheet of paper P. Supposing that the distance from the connecting section 178 to the punching member 38 is $Y_0$, $Y_{MAX}$ is located within the following range:

$Y_{MAX}<Y_0$ (see FIG. 33)

Here, if $Y_{MAX}$ exceeds $Y_0$, the sheet of paper P comes into contact with the connecting section 178, causing a paper jam. As to the operation range of the punching unit 162 in the transporting direction of the sheet of paper P, it covers a range inside from the leading edge or the rear edge of the sheet of paper P, leaving the aforementioned margin $X_{MIN}$ from the edge. By driving the shifting-type punching device 161 in such a manner, it becomes possible to form a desired number of punch holes with desired distances from the leading edge of the sheet of paper P linearly along the side edge of the sheet of paper P in parallel with the transporting direction of the sheet of paper P.

The following description will discuss the connecting section 178 of the upper and lower plates 175*a* and 175*b* of the punching unit 162 in the shifting-type punching device 161.

As described earlier, the punching member 38 having the blade 43 is arranged to fit in the punching die 40 for receiving the tips of the blade 43 with a minute clearance in order to form punch holes in the sheet of paper P. Therefore, high accuracy is required for the positional relationship between the punching member 38 and the punching die 40. For this reason, it is necessary to connect the upper and lower plates 175*a* and 175*b* as close as possible. Referring to FIG. 33, an explanation will be given on the positional relationship. The connecting section 178 is installed on the upstream side of the punching member 38 with the distance $X_0$ therefrom, and with the distance $Y_0$ outside thereof, and the range is represented as follows:

$$X_0>X_P,\ Y_0>Y_{MAX}$$

Within this range, it is possible to conduct punching operations both on the areas K and J shown in FIG. 38.

Another arrangement may be proposed wherein punch holes are formed on the leading-edge side of the sheet of paper P. In this case, however, since the connecting section 178 is located on the downstream side of the sheet of paper P in the transporting direction, a paper jam might occur inside the punching unit 162 with the sheet of paper P stuck on the connecting section 178, if the punching unit 162 stopped in the half way. However, in the present embodiment wherein punch holes are formed on the rear-edge side of the sheet of paper P, even if the punching unit 162 stopped in the half way, the sheet of paper P would be discharged positively and no paper jam would occur.

Upon carrying out a punching operation in the punch mode, if the width of a sheet of paper P in question is smaller than the interval between the specified punch holes H, a defective sheet will be produced due to erroneous punching processes, as shown in FIG. 40(*a*). Further, even in the case when the width $L_2$ of a sheet of paper P is larger than the punch-holes interval $L_1$, if the difference $(L_2-L_1)$ is not more than 20 mm, the punch holes H will be located close to the edges of the sheet of paper as shown in FIG. 40(*b*). This might cause rupture as shown in FIG. 40(*c*) when the sheet of paper is used for filing or other purposes, or might cause a defective sheet due to erroneous punching processes as shown in FIG. 40(*d*) if the sheet of paper P is dislocated during its transporting process. Moreover, such a defective sheet due to erroneous punching processes might be also caused in the case of using a sheet of paper P that does not have a regular size and that is not identified in its width. This not only gives rise to wasteful use of sheets of paper, but also causes a long operation time, thereby reducing the efficiency of the operation.

Figure 41A:
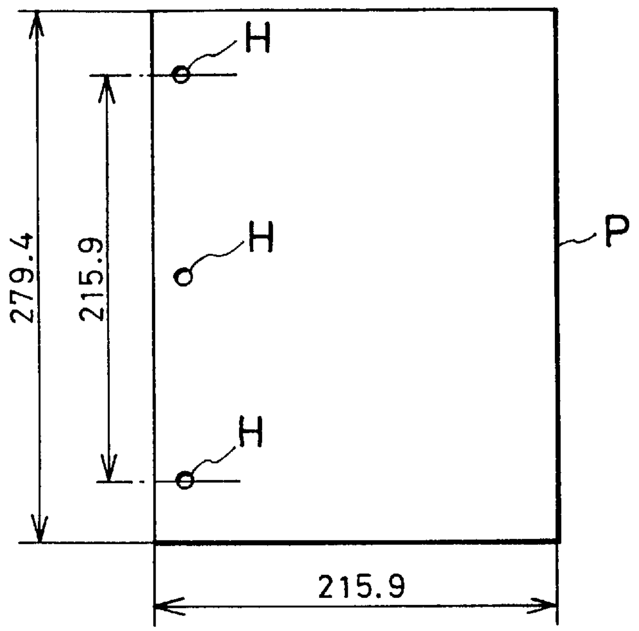
FIG. 41(*a*) is an explanatory drawing that shows punch holes that are formed along the long-side edge of a sheet of paper.
Figure 41B:
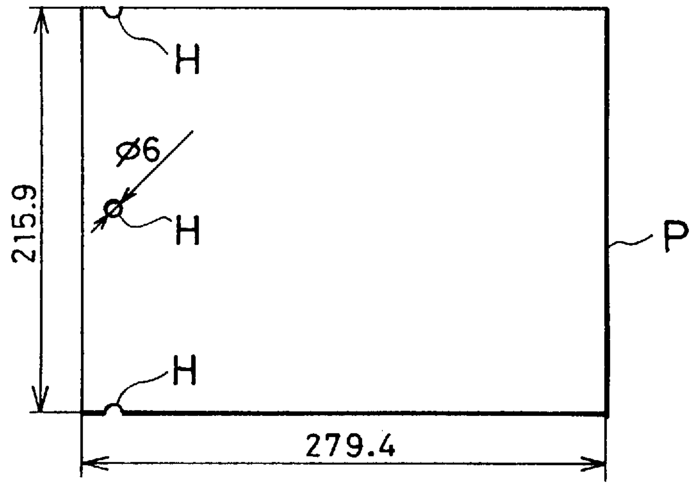

Furthermore, in the case when the automatic paper-selection mode is set so that after setting an original on the document platen 2, sheets of paper having the same size as the original are automatically selected, defective sheets of paper due to erroneous punching processes might be caused when the placement of the original is wrong. For example, in the case of sheets of paper P having the letter size of 279.5 mm (in length)×215.9 mm (in width), three punch holes H are commonly formed along the edge on the longer side of the sheets of paper P, as shown in FIG. 41(*a*). Each punch hole has a hole diameter of 6 mm and a punch-hole pitch of 107.95 mm. Therefore, in the device where the punch holes H are formed along the edge in the direction orthogonal to the transporting direction of the sheets of paper P, when the original is placed longitudinally and the sheets of paper P are fed laterally, the three punch holes H are properly formed along the edge on the longer side of the sheets of paper P, as described above. However, if the original is placed laterally and the sheets of paper P are fed longitudinally, the three punch holes H are formed along the edge on the shorter side of the sheets of paper P as shown in FIG. 41(*b*), thereby causing defective sheets of paper.

For this reason, in the control system as shown in FIG. 30, the size of a sheet of paper P being transported is detected in accordance with an output signal from the paper-size sensor 192 installed in the feeding section; in response to the detection, a judgement is made as to whether or not it is possible to form punch holes under the preset conditions (concerning the punch diameter and the punch-hole pitch); and only when the judgement shows that it is possible, the punching operation is carried out, thereby eliminating defective sheets of paper.

Figure 42:
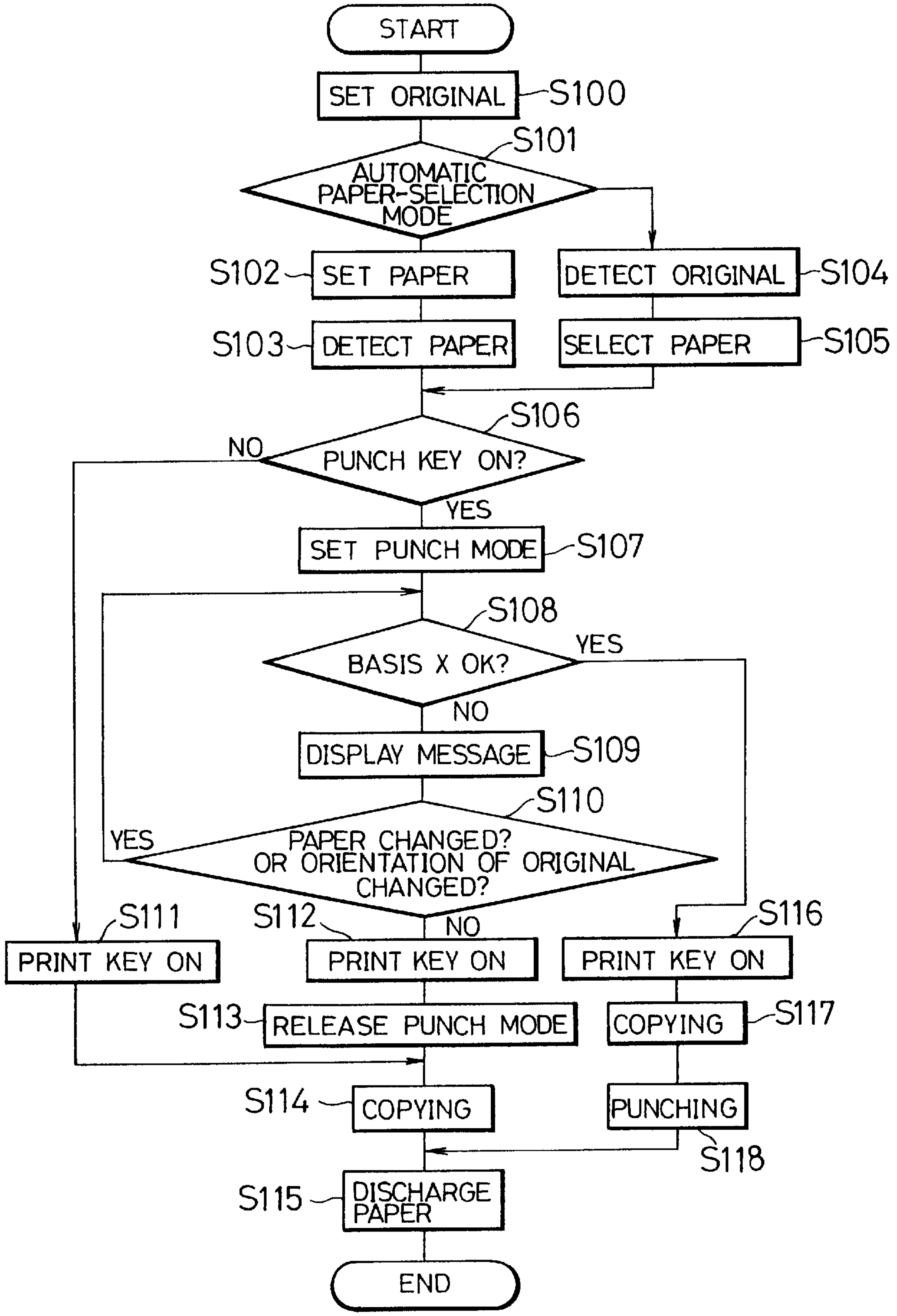
FIG. 42 is a flow chart showing a sequence of processes for an erroneous-copying preventive control in the copying machine provided with the shifting-type punching device of FIG. 25.
Figure 43A:
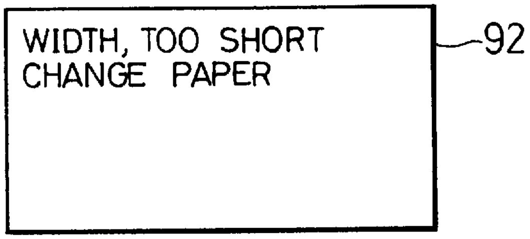
FIG. 43(*a*) is an explanatory drawing that shows a warning message to be displayed on the display panel in the case when the width of a sheet of paper is too short in the erroneous-copying preventive control of FIG. 42.
Figure 43B:
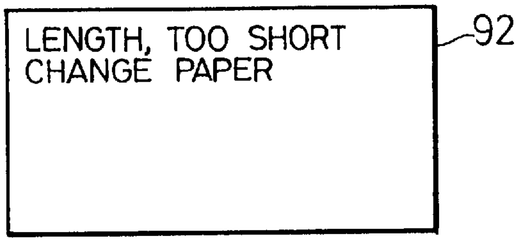
Figure 43C:
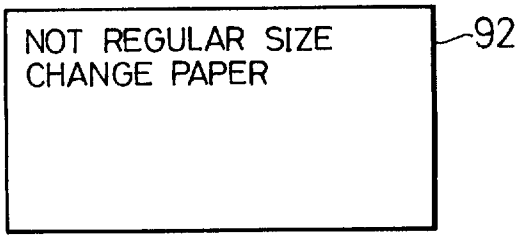
Figure 43D:
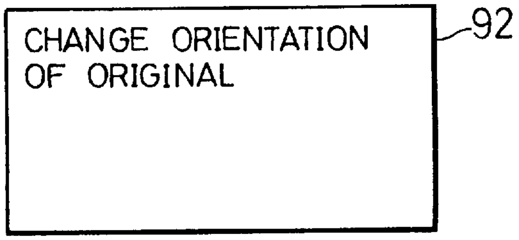

Referring to FIGS. 1, 2, 30 and 43, as well as to the flow chart of FIG. 42, the following description will discuss the operation for eliminating defective sheets of paper in the copying machine of the present embodiment. In this case, the following bases X for judgement are used in the flow chart: The judgement as to "whether or not the width of the sheet of paper is appropriate without being too short" is used when the paper-punching device 27 forms punch holes in the direction orthogonal to the transporting direction of the sheets of paper P, and the judgement as to "whether or not the length of the sheet of paper is appropriate without being too short" is used when punch holes are formed in the transporting direction of the sheets of paper P. Further, in the case of forming punch holes either in the transporting direction or in the direction orthogonal to the transporting direction, the judgement as to "whether or not the sheet of paper has a regular size" is used. Moreover, in the case of the automatic paper-selection mode, the judgement as to "whether or not the placement of the original is appropriate" is used, and if the judgement is negative, the judgement as to "whether or not it becomes appropriate by changing the orientation of the original" is used.

When the user places an original onto the document platen 2 (S100), a judgement is first made as to whether or not the automatic paper-selection mode is on (S101). If the automatic paper-selection mode is on, the detection of the original is carried out by an original sensor, not shown, that is provided in the vicinity of the document platen 2 (S104), and sheets of paper P that have the same size as the original are automatically selected (S105). Here, the size of the sheets of paper P is detected during the automatic selection of the sheets of paper P. In contrast, if the automatic paper-selection mode is not on, the setting of sheets of paper is carried out by the user with respect to the feeding section (S102), the size of the sheets of paper P is detected by the paper-size sensor 192, shown in FIG. 30, that is installed in the machine main body 1 (S103).

Next, the user turns on the punch key 91 in the operation section 90 shown in FIG. 2 (S106), thereby activating the punch mode (S107). When the punch mode is on, a judgement is made as to whether the basis X for judgement has been satisfied (S108). If the basis X for judgement is satisfied, the user turns on the print key 97 (S116), thereby allowing the copying operation to start (S117). After the punching operation has been carried out (S118), the sheet of paper P is discharged (S115), thereby completing the copying operation.

In contrast, if the basis X for judgement is not satisfied at S108, a warning message in response to the basis X for judgement is displayed on the display panel 92 in the operation section 90 (S109).

In other words, in the case when the automatic paper-selection mode is not on, if the basis X for judgement that has not been satisfied is related to the judgement as to "whether or not the width of the sheets of paper is appropriate without being too short", a warning message as shown in FIG. 43(*a*) is displayed so as to urge the user to change the sheets of paper P. In the case of the basis X for judgement that is related to the judgement as to "whether or not the length of the sheets of paper is appropriate without being too short", a warning message as shown in FIG. 43(*b*) is displayed so as to urge the user to change the sheets of paper P. Moreover, in the case of the basis X for judgement that is related to the judgement as to "whether or not the sheets of paper have a regular size", a warning message as shown in FIG. 43(*c*) is displayed so as to urge the user to change the sheets of paper P. In contrast, in the case when the automatic paper-selection mode is on, if the basis X for judgement is related to the judgement as to "whether or not the placement of the original is appropriate" and the succeeding judgement as to "whether or not it becomes appropriate by changing the orientation of the original" which is made if the former judgement is negative, a warning message as shown in FIG. 43(*d*) is displayed so as to urge the user to change the placement of the original.

In accordance with the displayed warning message, the user changes the sheets of paper P or changes the orientation of the original prior to carrying out the copying operation. Thus, it becomes possible to prevent defective sheets of paper beforehand, which might be caused due to erroneous punching processes as described earlier.

Thereafter, a judgement is made as to whether or not the user has changed the sheets of paper P or has changed the orientation of the original (S110). If the change has been made, a judgement is again made as to whether or not the basis X for judgement is satisfied (S108). Here, if the judgement shows that the basis X for judgement is satisfied, the warning message is erased from the display panel 92. Then, the user turns on the print key 97 (S116), thereby allowing the copying operation to start (S117). After the punching operation has been carried out (S118), the sheet of paper P is discharged (S115), thereby completing the copying operation.

In contrast, if the change has not been made at S110, the punch mode is automatically cancelled (S113) simultaneously as the user turns on the print key 97 (S112). Thereafter, only the copying operation is carried out, and the sheet of paper P is discharged (S114, S115), thereby completing the operation.

With this arrangement, even if the user turns on the print key 97 without noticing the warning message, it is surely preventable to have defective sheets of paper.

In the case when the punch key 91 is not turned on by the user at S106, the sequence proceeds to the normal operation, and when the user turns on the print key 97 (S111), only the copying operation is carried out, and the sheet of paper P is discharged S114, S115), thereby completing the operation.

By providing such a defective-sheets prevention control, it is possible to eliminate defective sheets of paper due to erroneous punching processes. Therefore, it becomes possible to prevent wasteful use of sheets of paper, shorten the long operation time, and improve the efficiency of the operation.

In addition, as for the defective-sheets prevention control that provides the above-mentioned effects, other arrangements may be proposed except the arrangement which was explained in the above-mentioned flow chart. For example, in one of those arrangements, the sequence of processes are carried out as follows: if the basis X of judgement is not satisfied, the punch mode is cancelled at once and the corresponding warning message is displayed; and when the user turns on the print key 97, only the copying operation is carried out without executing the punching operation, and the sheet of paper P is discharged. In another of those arrangements, the sequence of processes are carried out as follows: if the basis X for judgement is not satisfied, the corresponding warning message is displayed until the change has been made appropriately with respect to the sheets of paper P or the orientation of the original, and both the punching operation and the copying operation are stopped. Explanations will be given on the respective arrangements. Here, the former arrangement is discussed with reference to FIGS. 1, 2 and 45 as well as to the flow chart of FIG. 44, and the latter arrangement is discussed with reference to FIGS. 1, 2 and 47 as well as to the flow chart of FIG. 46.

In the former arrangement, the sequence of processes, which are the same as those from S100 to S107 in the flow chart of FIG. 42, are carried out from S100' to S107', and at S120 a judgement is made as to whether or not the basis X for judgement is satisfied (S120). If it is satisfied, the sequence of processes, which are the same as those from S116 to S118 in addition to S115 in the flow chart of FIG. 42, are carried out from S116' to S118' in addition to S115', thereby completing the sequence.

In contrast, if the basis X for judgement is not satisfied, the punch mode is cancelled at once (S121), and a warning message corresponding to the basis X for judgement is displayed on the display panel 92 on the operation section 90 (S122).

In other words, if the basis X for judgement that has not been satisfied is related to the judgement as to "whether or not the width of the sheets of paper is appropriate without being too short", a warning message as shown in FIG. 45(*a*) is displayed so as to inform the user that the punch mode is not settable. In the same manner, in the case of the basis X for judgement that is related to the judgement as to "whether or not the length of the sheets of paper is appropriate without being too short", a warning message as shown in FIG. 45(*b*) is displayed. Moreover, in the case of the basis X for judgement that is related to the judgement as to "whether or not the sheets of paper have a regular size", a warning message as shown in FIG. 45(*c*) is displayed. In the case of the basis X for judgement that is related to the judgement as to "whether or not the placement of the original is appropriate" and the succeeding judgement as to "whether or not it becomes appropriate by changing the orientation of the original" which is made if the former judgement is negative, a warning message as shown in FIG. 45(*d*) is displayed. Thus, these messages inform the user that the punch mode is not settable, and urge the user to change the sheets of paper P or to change the placement of the original.

In this case, since the punch mode is not on, the sequence proceeds to the normal operation when the user turns on the print key 97 (S111'), and only the copying operation is carried out, thereby discharging the sheets of paper (S114', S115'). This arrangement makes it possible to prevent defective sheets of paper due to erroneous punching processes.

In this flow chart, the processes at S111', S114' and S115', which are carried out when the punch key 91 is not turned on at S106', are the same as those carried out at S111, S114 and S115 in the flow chart of FIG. 42. Therefore, the description thereof is omitted.

In the latter arrangement, the sequence of processes, which are the same as those from S100 to S107 in the flow chart of FIG. 42, are carried out from S100" to S107", and a judgement is made as to whether or not the basis X for judgement is satisfied (S130). If it is satisfied, the sequence of processes, which are the same as those from S116 to S118 in addition to S115 in the flow chart of FIG. 42, are carried out from S116" to S118" in addition to S115", thereby completing the sequence.

In contrast, if the basis X for judgement is not satisfied, a warning message corresponding to the basis X for judgement is displayed on the display panel 92 on the operation section 90 (S132) when the user turns on the print key 97 (S131).

In other words, if the basis X for judgement that has not been satisfied is related to the judgement as to "whether or not the width of the sheets of paper is appropriate without being too short", a warning message as shown in FIG. 47(*a*) is displayed so as to inform the user that the copying operation is not available. In the same manner, in the case of the basis X for judgement that is related to the judgement as to "whether or not the length of the sheets of paper is appropriate without being too short", a warning message as shown in FIG. 47(*b*) is displayed. Moreover, in the case of the basis X for judgement that is related to the judgement as to "whether or not the sheets of paper have a regular size", a warning message as shown in FIG. 47(*c*) is displayed. In the case of the basis X for judgement that is related to the judgement as to "whether or not the placement of the original is appropriate", a warning message as shown in FIG. 47(*d*) is displayed. Thus, these messages inform the user that the copying operation is not available, and urge the user to change the sheets of paper P or to change the placement of the original.

After the user has changed the sheets of paper P or the placement of the original (S133), a judgement is again made as to whether or not the basis X for judgement is satisfied (S130), and if it is satisfied, the warning message on the display panel 92 is erased. Then, the operation is completed, after carrying out the processes of S116' through S118' in addition to S115'.

In contrast, if the user does not change the sheets of paper P or the placement of the original, the processes, S131 through S133, are repeated so as to display the warning message until the user correct the sheets of paper P or the placement of the original. Even if the print key 97 is turned on at S131 many times, the copying operation is not activated. This arrangement makes it possible to prevent defective sheets of paper due to erroneous punching processes beforehand.

In this flow chart, the processes at S111", S114" and S115", which are carried out when the punch key 91 is not turned on at S106", are the same as those carried out at S111, S114 and S115 in the flow chart of FIG. 42. Therefore, the description thereof is omitted.

As described above, the shifting-type punching device 161, which functions as a paper-punching device 27 installed in the copying machine of the present embodiment, is designed so that the punching unit 162 is shifted at the shifting speed $V_P$ (1) by the punching-device shifting mechanism from the home position downstream in a direction that makes an angle of (90-θ)° with respect to the transporting direction. In response to the detection of the rear edge of a sheet of paper made by the photosensor 32, the punching unit 162 is shifted downstream so as to form the first punch hole at the predetermined position on the sheet of paper P, and then the punching unit 162 is further shifted downstream so as to form the next punch hole while keeping a parallel positional relationship with the former punch hole.

In the prior art arrangements, it is necessary to install the same number of punching means corresponding to the number of punch holes in the case of forming a plurality of punch holes in a direction virtually orthogonal to the transporting direction of sheets of paper P. In contrast, this arrangement requires only one punching machine 177 in forming punch holes at desired positions by desired number in the direction orthogonal to the transporting direction. Moreover, the punching machine 177 is constituted of only the punching unit 162 and punching-device shifting mechanism 163 for shifting the punching unit 162; therefore, it is possible to cut the cost of construction to a great degree compared with the construction where a lot of expensive piezoelectric elements are used. Furthermore, the punch holes are formed without the necessity of stopping a sheet of paper P in motion; this make it possible to improve the operation speed, as well as making it possible to apply the paper-punching device to copying machines with high-speed operations.

Moreover, in the shifting-type punching device 161 of the present embodiment, with a simple arrangement wherein the punching unit 162 is allowed to move in the crossing direction of the transport guide 167 and is movable with respect to sheets of paper P, it becomes possible to form punch holes at desired positions in the direction orthogonal to the transporting direction of sheets of paper P, without the necessity of driving the punching unit 162 under control of the control system. Conventionally, in the case of the paper-punching devices having the arrangement of forming punch holes only in the transporting direction, it has not been possible to apply these devices to copying machines and other apparatuses which are oriented based on their center line. However, the arrangement of the present embodiment is applied to these copying machines and other apparatuses of this type wherein sheets of paper P are positioned based on the center of the transport path and transported, without the necessity of a complicated structure and without causing high costs.

Furthermore, the shifting-type punching device 161 of the present embodiment, which enables the formation of punch holes in both directions, that is, in the transporting direction of sheets of paper P as well as in the direction orthogonal to the transporting direction, is suitable for both the lateral and longitudinal feeding systems of sheets of paper P.

Further, based on the paper size detected by the paper size sensor 192, a judgement is made as to whether or not the formation of punch holes is possible under the preset conditions (concerning the punch diameter and the punch-hole pitch), and only when the judgement shows that it is possible, the punching operation is carried out. Therefore, it is possible to eliminate unusable defective sheets of paper due to erroneous punching operations, such as sheets of paper having punch holes formed close to the edge or having punch holes formed overlapping the edge, caused by the small size of the sheets of paper. As a result, it becomes possible to eliminate wasteful use of sheets of paper P and improve efficiency of the operation by preventing inefficiency in the operation due to multiple attempts imposed on the user.

Moreover, the shifting-type punching device 161 of the present embodiment is provided with: a punch-scraps receiving section 181 for receiving punch scraps that are ejected during the punching operation, which is disposed along the shift path of the punching unit 162; a punch-scraps storing case 182 that is disposed at a predetermined position on the downstream side in the advancing direction of the punching unit 162 in the punch-scraps receiving section 181; and a punch-scraps collecting member 183 for carrying punch scraps accumulated in the punch-scraps receiving section 181 toward the punch-scraps storing case 182 in accordance with the movement of the punching unit 162, which is disposed at a lower part of the punching unit 162. With this arrangement, it is possible to install the punch-scraps storing case 182 at a location with a comparatively large space on the front side or rear side of the copying machine main body 1; this allows the punch-scraps storing case 182 to have a larger size. As a result, the number of operations required for taking out punch scraps from the punch-scraps storing case 182 is reduced, thereby improving the efficiency of work. Moreover, since the transport of punch scraps toward the punch-scraps storing case 182 is carried out by utilizing the movement of the punching unit 162, it is not necessary to provide a separate means for this purpose; this reduces the cost of production. Furthermore, compared with the arrangement wherein a punch-scraps storing case is disposed right under the shifting-type punching device 161, this arrangement provides more space in the height wise direction of the copying machine in terms of designing, thereby making the apparatus compacter.

[MODIFIED EXAMPLE 1]

The following description will discuss a modified example of the punch-scraps collecting device 170 that is applicable to the shifting-type punching device 161.

The punch-scraps collecting device 170' of this modified example is provided with a punch-scraps receiving section 201 which has a punch-scraps discharging outlet 202 that is located halfway within the shifting range of the punching unit 162. Here, punch-scraps wiping members 183 are attached to the respective front side and rear side of the punching unit 162 at the lower part thereof in the advancing direction. With this arrangement, it is possible to effectively carry punch scraps toward the punch-scraps discharging outlet 202 and discharge them therefrom in response to the movement of the punching unit 162. Such an arrangement is suitable for the case where there is not sufficient space in the shifting direction of the punching unit 162.

Figure 49:
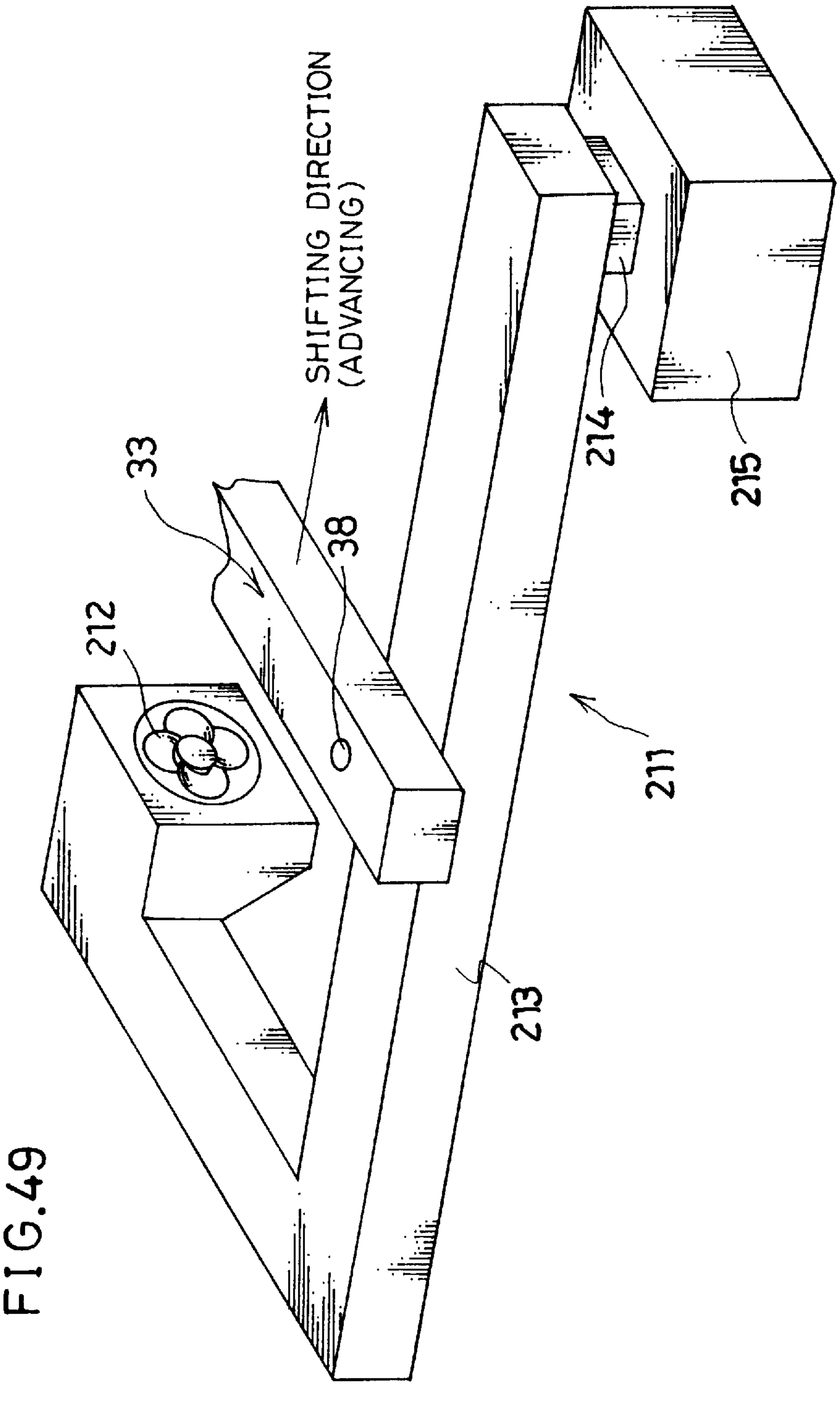
FIG. 49 is a perspective view showing an arrangement of another punch-scraps collecting device in accordance with the first modified example of the fourth embodiment of the present invention.

Moreover, another arrangement, shown in FIG. 49, is proposed as a punch-scraps collecting device 211 that is applicable to the above-mentioned shifting-type punching device 161. In this arrangement, a ventilating fan 212, which is provided in the apparatus main body 1, generates an air flow, and the air flow is directed to a punch-scraps path 213. By utilizing the air flow, punch scraps, discharged from the punching unit 162, are transported from a punch-scraps discharging outlet 214 to a punch-scraps collecting device 215, in which they are stored.

Figure 50:
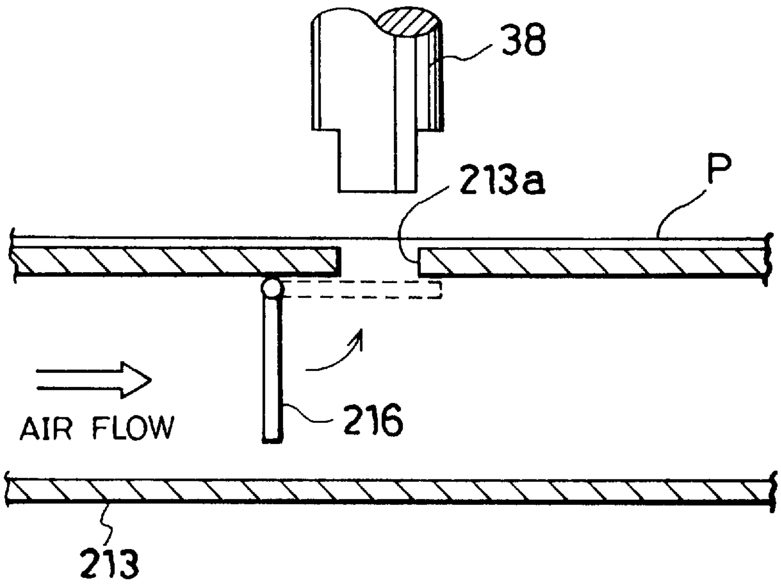
FIG. 50 is a perspective view showing main parts of the punch-scraps collecting device of FIG. 49.

As illustrated in FIG. 50, a shutter 216, which is closed by the air flow, is attached to the upper surface of the punch-scraps path 213 so as to prevent the air from leaking outside through an opening 213*a* that is provided for forming a punch hole. With this arrangement, the air flow inside the punch-scraps path 213 is also stabilized. Further, since the shutter 216 is operated by utilizing the air flow, no complicated structure is required.

Figure 51:
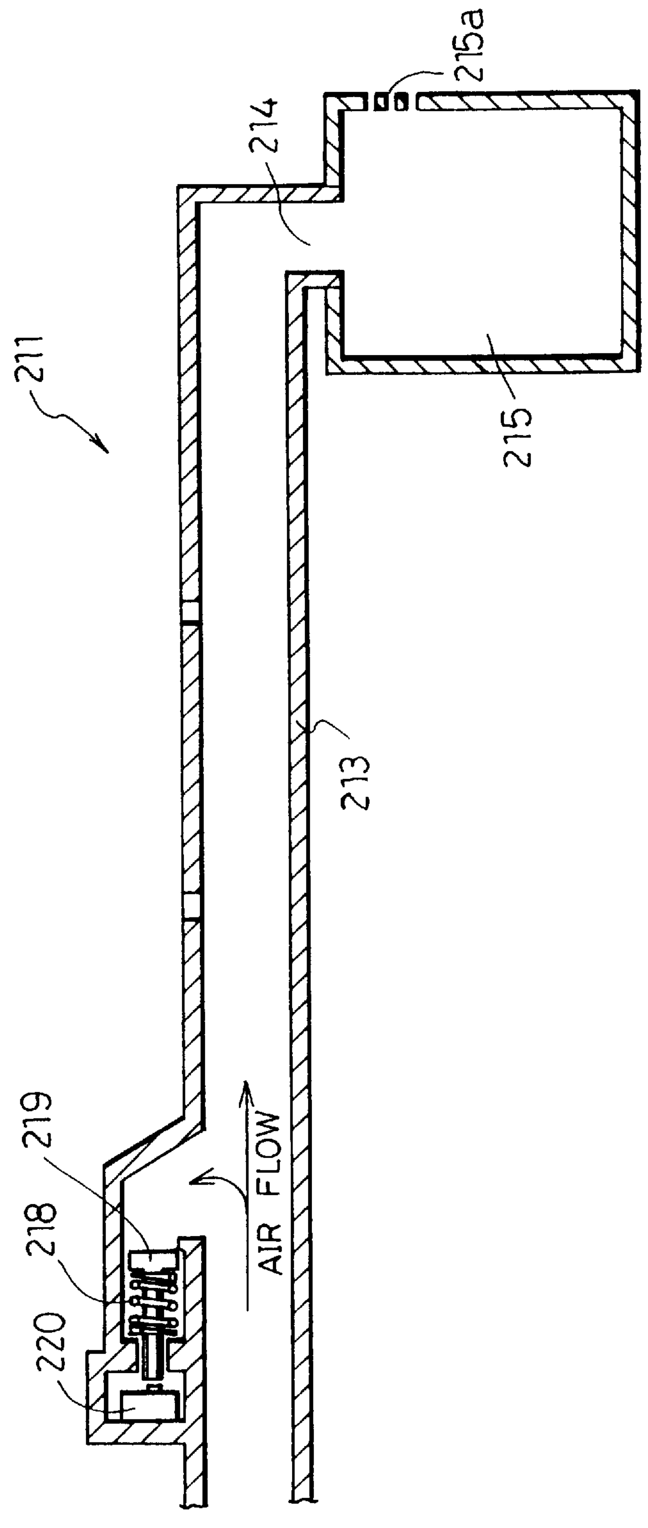
FIG. 51 is a vertical cross-sectional view illustrating a punch-scraps filled-state detection mechanism that is installed in the punch-scraps collecting device of FIG. 49.

Furthermore, as illustrated in FIG. 51, an air hole 215*a* is provided in the vicinity of the punch-scraps discharging outlet 214 of the punch-scraps collecting device 215, and the air is released from the air hole 215*a*. A pressing member 219, which is supported by a spring 218, is installed on the upper portion of the punch-scraps path 213, and at the end in the pressing direction of the pressing member 219, is installed an alarm switch 220 for informing the user that the punch-scraps collecting device 215 is filled with punch scraps. This alarm switch 220 is activated by the pressing member 219 when punch scraps have accumulated up to the upper portion of the punch-scraps collecting device 215 to cause the air hole 215*a* to be closed and the pressing member 219 is depressed due to an increase in pressure inside the punch-scraps path 213.

Figure 52:
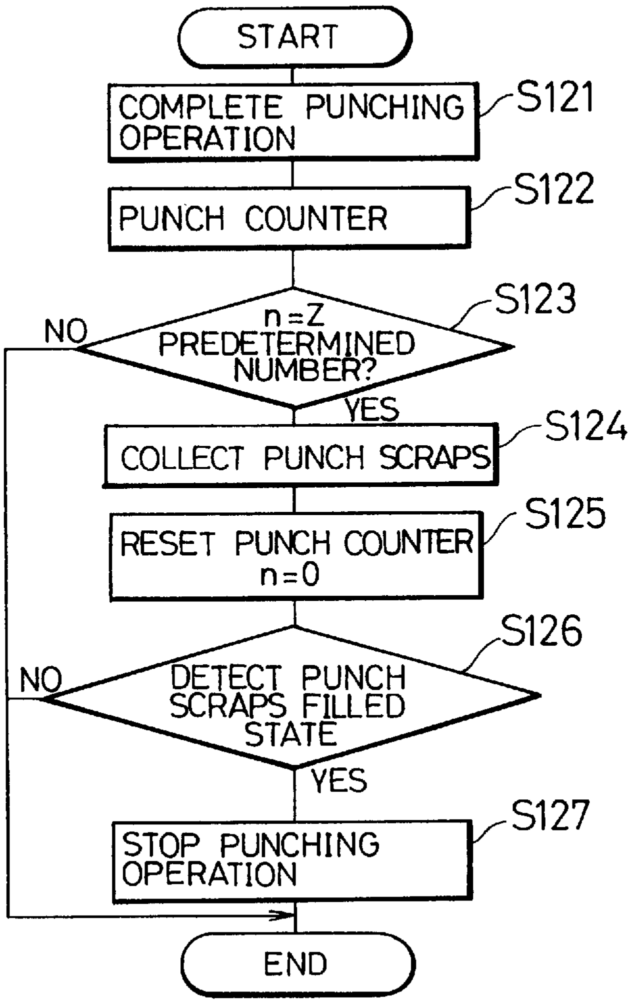
FIG. 52 is a flow chart showing sequences of the punch-scraps collecting processes and filled-state detection processes that are carried out by the shifting-type punching device having the punch-scraps collecting device of FIG. 49.

Referring to the flow chart of FIG. 52, the following description will briefly discuss the operation of the shifting-type punching device 161 that is provided with the above-mentioned punch-scraps collecting device 211 having such a filled-state detecting function. After completion of the punching operation (S121), the punch counter in the counter section 194 makes a count-up (S122). Here, if the counted value is equal to the predetermined number of times Z (S123), an air flow is directed into the punch-scraps path 213 to carry out the punch-scraps collecting operation (S124), and the count value is reset (S125).

Then, a confirmation is made as to whether or not the alarm switch 220 is turned on (S126), and if the alarm switch 220 is on to show the filled state, the punching operation is stopped (S127).

In contrast, if the counted value does not reach the predetermined number of times Z at S123, or if the filled state is not detected at S126, the operation is continued as it is.

As to the punch-scraps collecting device 211, it is possible to utilize the ventilating fan 212 that has been already installed in the copying machine main body 1; this makes it possible to cut the number of parts. Further, since this arrangement provides a constant air flow in one direction, the flow of punch scraps is stabilized, thereby preventing the punch scraps from blocking the path. Moreover, since the filled state is detected by utilizing the pressure inside the punch-scraps path 213, the mechanism is further simplified. In addition, different from the detection that is made on the basis of weight, such a detection on the basis of pressure has high reliability in the case of detecting light materials such as punch scraps. Further, by utilizing the change in pressure, not only the filled state, but also the clogged state of punch scraps inside the punch-scraps path 213, may be detected through the on-state of the alarm switch 220, thereby making it possible to cope with such troubles.

[MODIFIED EXAMPLE 2]

The following description will discuss a modified example of the shifting-type punching device 161.

Figure 53:
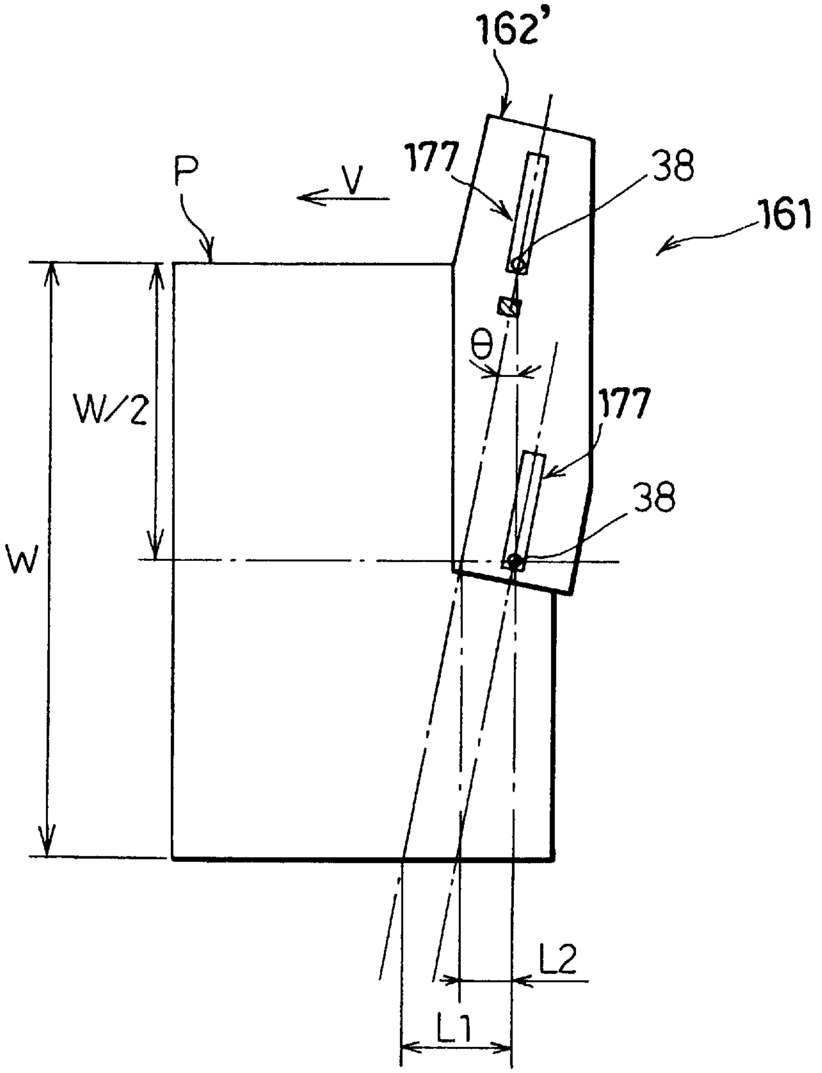
FIG. 53 is a plan view showing an arrangement of a punching unit that is used in the shifting-type punching device in accordance with the second modified example of the fourth embodiment of the present invention.
Figure 54:
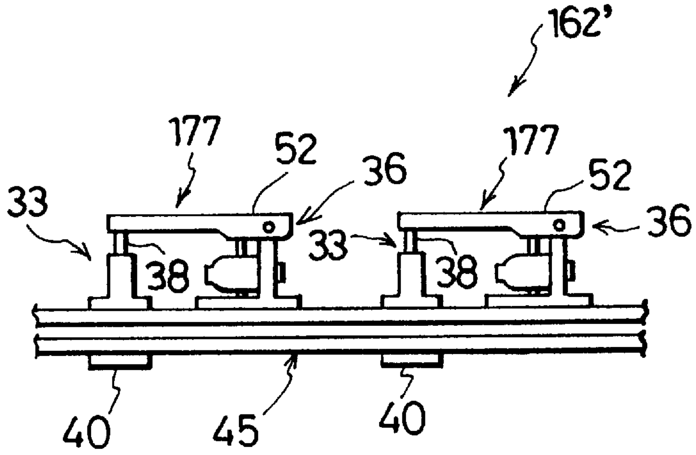
FIG. 54 is a vertical cross-sectional view of the punching unit of FIG. 53 when seen from the upstream side of the transport guide.

As illustrated in FIGS. 53 and 54, the shifting-type punching device 161 of the present modified example is provided with a punching unit 162' in place of the punching unit 162. The punching unit 162' has two punching machine 177 that are disposed side by side in the direction virtually orthogonal to the transporting direction of the sheets of paper P.

The interval between the punching members 38 in these two punching machine 177 is set to one-half the maximum paper width W that can be used in the present copying machine. With this arrangement wherein the two punching machine 177 are provided, the shift distance L2 of the punching unit 162' in the transporting direction of sheets of paper P is equal to one-half the shift distance L1 of the punching unit 162 that is installed in the case of only one punching machine 177.

This arrangement makes it possible to eliminate the aforementioned problem that the greater the transport speed V of sheets of paper P becomes, the greater setting angle θ is required so that more space is required in the apparatus in the transporting direction. Further, without causing any troubles, this arrangement allows the punching device to be installed within the interval $L_R$ between the transport rollers 168 and 169 that is restricted by the length of the maximum sheets of paper that can be used in the copying machine (see FIG. 26). Further, if even two punching machine 177 are not enough to cope with a particular case, the number of the punching machine 177 may be increased in the same manner.

In this case, supposing that the number of the punching machine 177 is n, the shift distance $L_N$ of the punching unit 162' in the transport direction of sheets of paper P is represented by the following equation:

$$L_N = L1/n \tag{20}$$

With this arrangement, it becomes possible to separate the relationship between the transport speed V of sheets of paper P and the operation time t of the punching machine 177. Thus, even in the case of high transport speeds of sheets of paper P, the formation of punch holes is possible without the necessity of stopping the sheets of paper P.

[EMBODIMENT 5]

Figure 55:
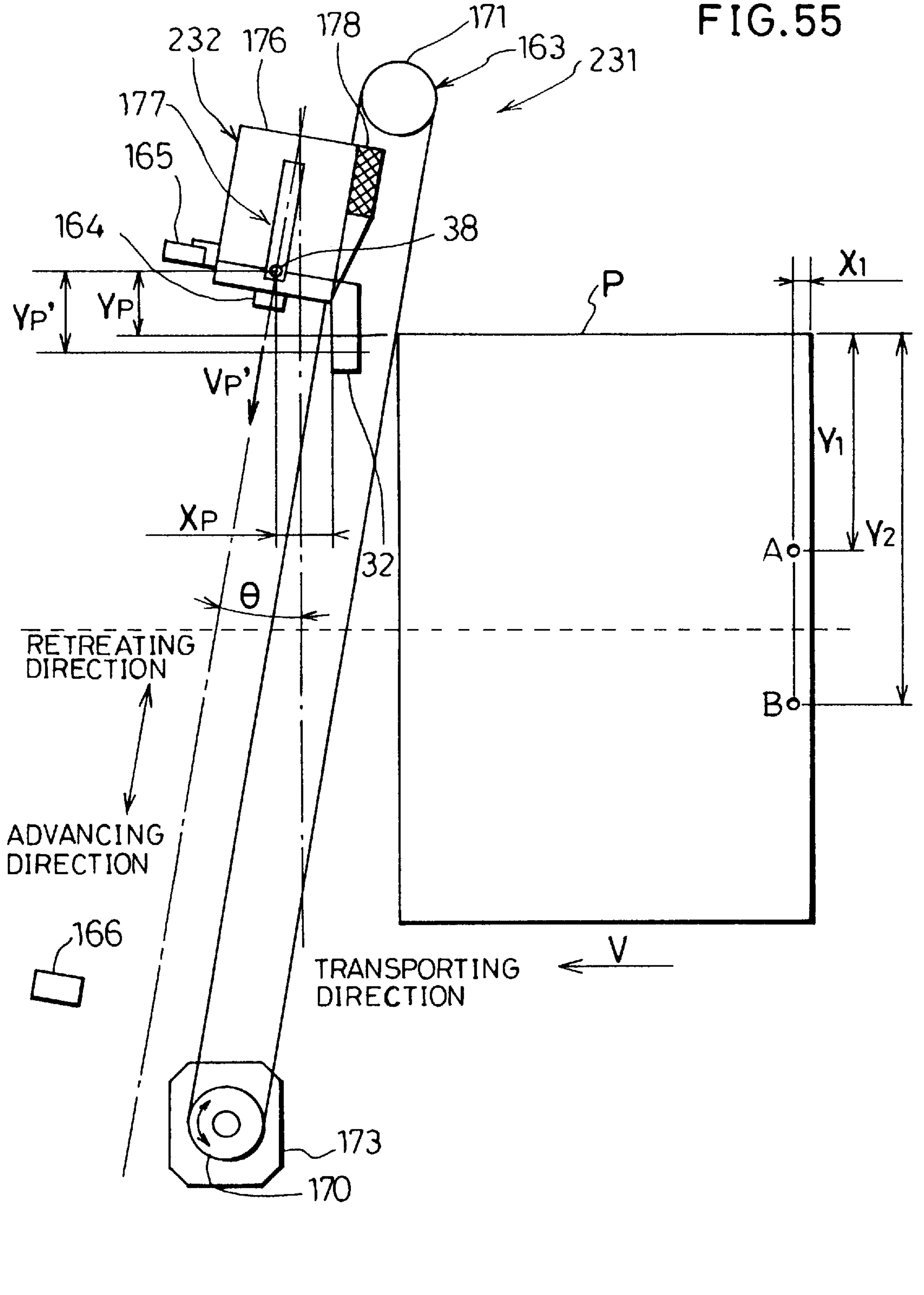
FIG. 55 is a plan view showing an arrangement of a shifting-type punching device in a copying machine in accordance with the fifth embodiment of the present invention.
Figure 56:
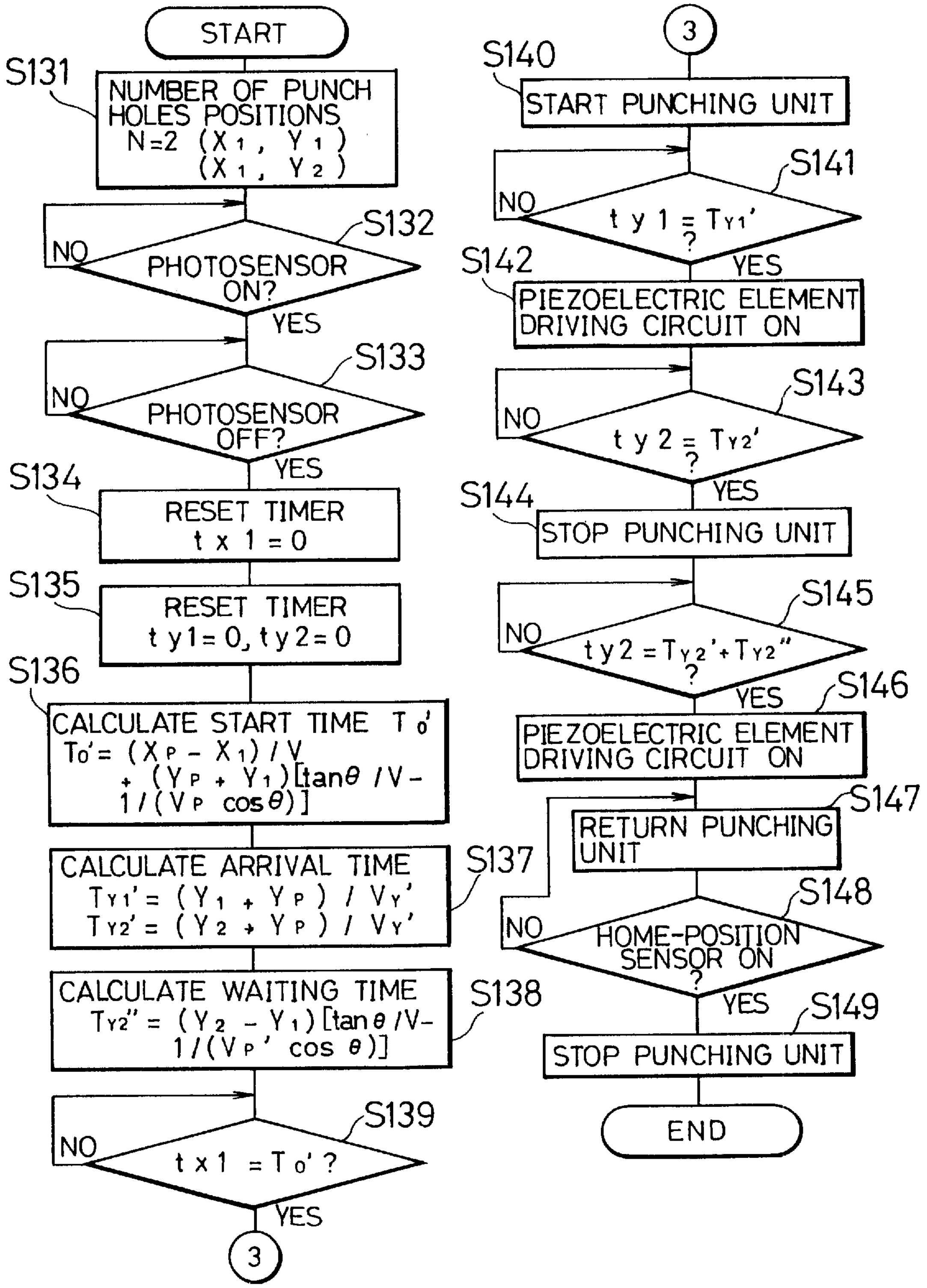
FIG. 56 is a flow chart showing a sequence of punching processes that are carried out when punch holes are formed by the punching unit of FIG. 55 along the direction orthogonal to the transporting direction of a sheet of paper.
Figure 57:
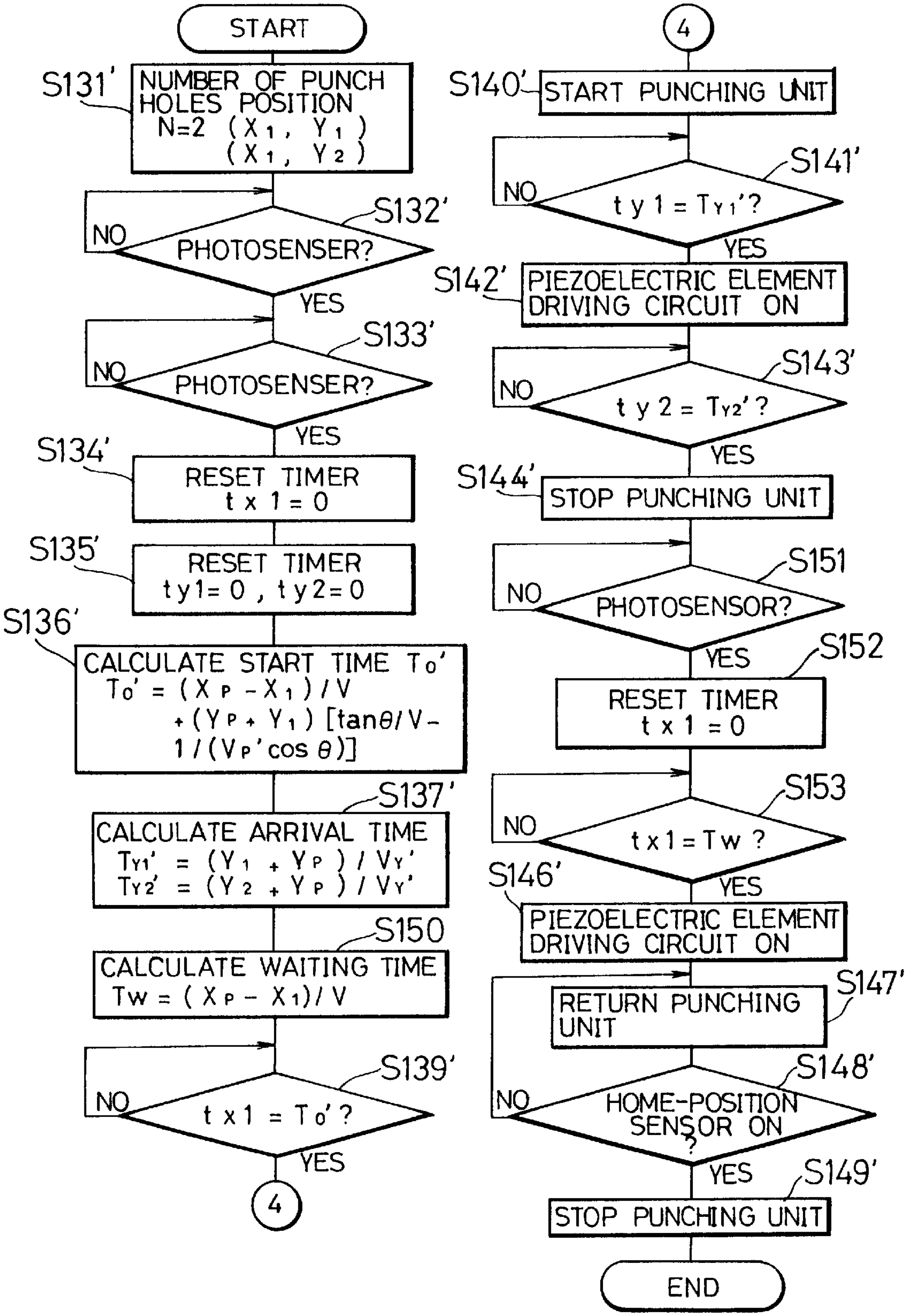
FIG. 57 is a flow chart showing another sequence of punching processes that are carried out when punch holes are formed by the punching unit of FIG. 55 along the direction orthogonal to the transporting direction of a sheet of paper.
Figure 58:
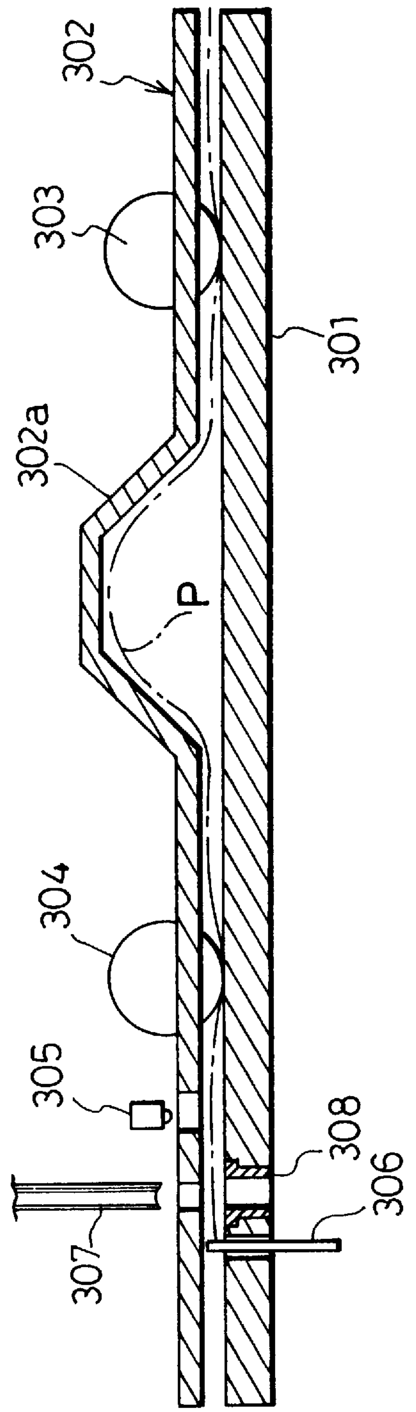
FIG. 58 PRIOR ART
FIG. 58 is a vertical cross-sectional view showing one example of an arrangement of a conventional paper-punching device.

Referring to FIGS. 1, 2, 30, and 38, as well as FIGS. 55 through 57, the following description will discuss another embodiment of the present invention. Here, for convenience of explanation, those members that have the same functions and that are described in the first through fourth embodiments are indicated by the same reference numerals and the description thereof is omitted.

In a copying machine in accordance with the present embodiment, a shifting-type punching device 231, shown in FIG. 55, is provided inside the main body 1 shown in FIG. 1 as a paper-punching device 27. The punching unit 232 in this shifting-type punching device 231 has an arrangement wherein the photosensor 32 is disposed side by side with the sheet-side-edge sensor 164 at a position on the advancing side of the punching unit 232, that is, on the up-stream side from the sheet-side-edge sensor 164. The other parts of this arrangement is the same as those of the aforementioned shifting-type punching device 161 (see FIG. 25).

Referring to FIGS. 2, 30 and 55, as well as to the flow chart of FIG. 56, the following description will discuss the operation of the punching unit 232. Here, in the case of forming punch holes in the transporting direction of sheets of paper P, the operation is the same as that carried out in the aforementioned embodiment 4. Therefore, an explanation is given only on the case where punch holes are formed on the rear side of sheets of paper P in the direction orthogonal to the transporting direction thereof. In addition, since the operation for collecting punch scraps is the same as that of the aforementioned embodiment 4, the description thereof is omitted.

In the aforementioned shifting-type punching device 161, the shifting speed $V_P$ is set so that its component of speed in the transporting direction is equal to the transporting speed V of sheets of paper P. However, the shifting-type punching device 231 of the present embodiment is shifted in relation to a sheet of paper P being transported at a transporting speed V at a shifting speed $V_P'$ that is faster than the shifting speed $V_P$. The shifting speed $V_P'$ is found as follows:

$$V'>V\cdot\sin\theta \tag{21}$$

Figure 32:
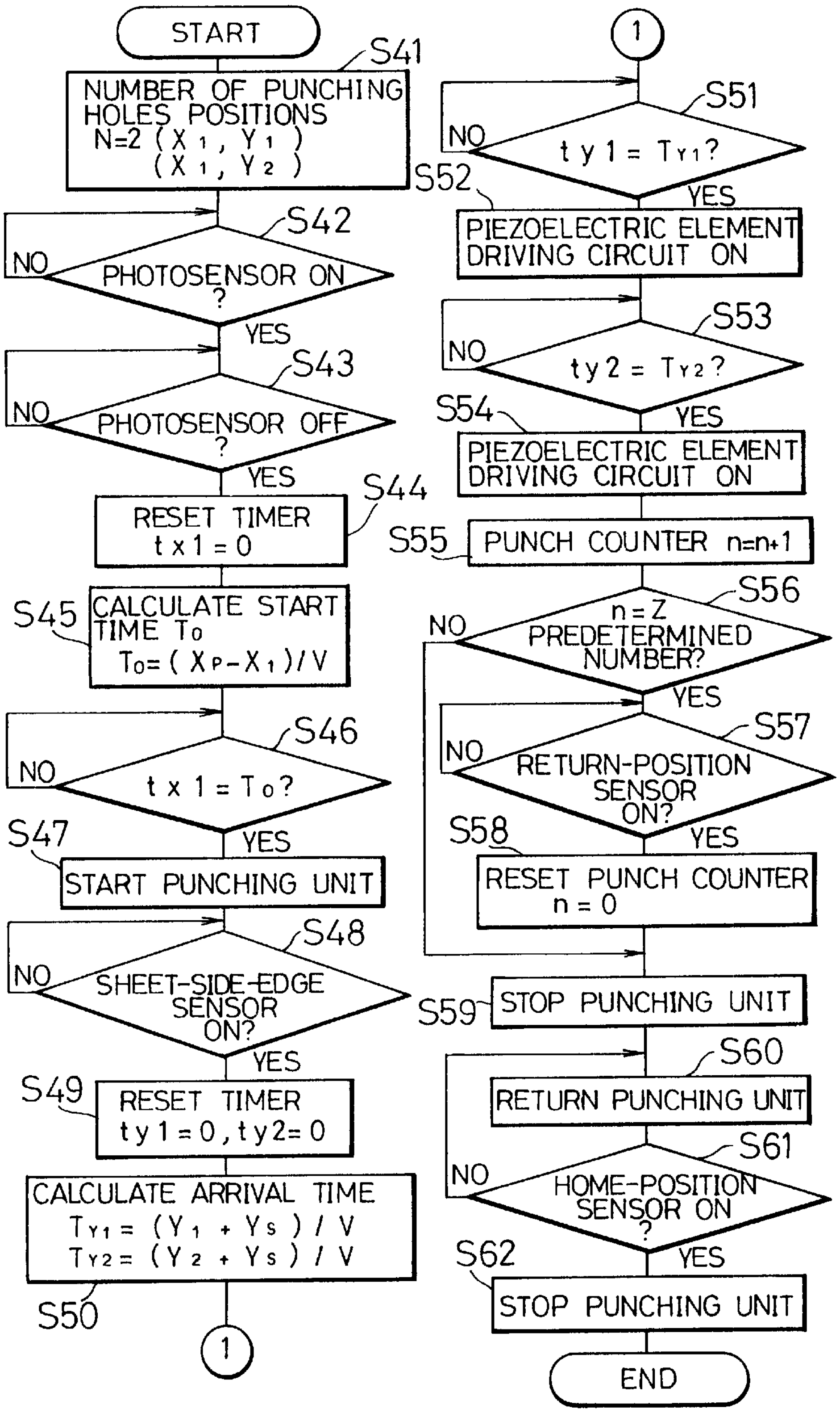
FIG. 32 is a flow chart showing a sequence of punching processes that are carried out when punch holes are formed by the shifting-type punching device of FIG. 25 along the direction orthogonal to the transporting direction of a sheet of paper.

After completion of processes S131 through S133 that are the same processes as S41 through S43 in the aforementioned flow chart of FIG. 32, when the operation of the punching unit 232, triggered by the detection of the rear edge of the sheet of paper, is initiated, the timer tx1 in the timer section 193 is reset (S134), and successively the timers ty1 and ty2 are respectively reset (S135).

Next, the start time $T_0'$, of the punching unit 232 is calculated (S136).

The start time $T_0'$, which corresponds to waiting time from the detection of the rear edge of the sheet of paper till the start of the punching unit 232, is calculated from the following equation, wherein the following factors, shown in FIG. 55, are used: the distance $X_1$ from the rear edge of the first and second punch holes A and B, the installation distance $X_P$ of the photosensor 32 in the transporting direction with respect to the home position of the punching member 38, and the distance $Y_P$ from the home position of the punching member 38 to the starting-side edge of the sheet of paper P.

$$T_0'=(X_P-X_1)/V+(Y_P+Y_1)[\tan\theta/V-1/(V_P'\cos\theta)] \tag{22}$$

Successively, the arrival times $T_{Y1}'$ and $T_{Y2}'$ to the first and second punch holes A and B are respectively calculated (S137).

These arrival times $T_{Y1}'$ and $T_{Y2}'$ are calculated from the following equations, wherein the following factors are used: the distance $Y_P$ from the home position of the punching member 38 to the starting-side edge of the sheet of paper P, the distances $Y_1$ and $Y_2$ from the starting-side edge of the first and second punch holes A and B, and one component $V_Y'$ of the speed of the punching unit 232 in the direction orthogonal to the transporting direction.

$$T_{Y1}'=(Y_1+Y_P)/V_Y' \tag{23}$$

$$T_{Y2}'=(Y_2+Y_P)/V_Y' \tag{24}$$

$$V_Y'=V_P'\cdot\cos\theta \tag{25}$$

Successively, the waiting time $T_{Y2}''$ of the punching unit 232, which is taken after having formed the first punch hole A, is calculated (S138). The waiting time $T_{Y2}''$ is provided in order to make up for a time gap that is caused as follows: The component of the shifting speed $V_P'$ of the punching unit 232 in the transporting direction is faster than the transporting speed V of the sheet of paper P; therefore, when the punching unit 232 is shifted by using $T_{Y2}'$, the sheet of paper P has not reached the point B at which the second punch hole is to be formed on the sheet of paper P; this causes the above-mentioned time gap. This waiting time may be used upon starting the punching unit 232 after having formed the first punch hole A, or may be used for delaying the driving of the piezoelectric element 53 upon forming the second punch hole B. In the present embodiment, it is used for delaying the driving of the piezoelectric element 53.

The start time $T_0'$ is counted by the timer tx1, and upon completion of the time counting of the start time $T_0'$ (S139), the punching unit 232 starts shifting in the advancing direction (S140). Further, the arrival times $T_{Y1}'$ and $T_{Y2}'$ are time-counted by the timers ty1 and ty2 respectively. After completion of the time-counting for the arrival time $T_{Y1}'$ to the first punch hole A made by the timer ty1 (S141), the driving circuit 62 is turned on, voltage is applied to the piezoelectric element 53, and the first punch hole A is formed (S142).

Successively, after completion of the time-counting for the arrival time $T_{Y2}'$ to the second punch hole B made by the timer ty2 (S143), the punching unit 232 is temporarily stopped (S144). After completion of the time-counting for the arrival time $T_{Y2}'$ in addition to the waiting time $TY_2''$ made by the timer ty2 (S145), the driving circuit 62 is turned on, voltage is applied to the piezoelectric element 53, and the second punch hole B is formed in the sheet of paper P (S146).

Thereafter, the punching unit 232 is shifted in the retreating direction (S147), and when the punching unit 232 returns to the starting position to make the position sensor 165 turn on (S148), the punching unit 232 is stopped (S149), thereby completing the sequence of processes. Then, the sequence enters the stand-by mode until the next sheet of paper is detected by the photosensor 32.

In accordance with the operation of the shifting-type punching device 231 as described above, by changing the number of punch holes and the setting of punching positions at S141, it becomes possible to form punch holes at desired positions by desired number within an area K indicated by slanting lines in FIG. 38, that is, within a range of $X_{MIN}$ to $X_P$, with respect to a sheet of paper P being transported at the transporting speed V, in the same manner as the aforementioned embodiment 4. Further, the punch holes are formed without the necessity of stopping a sheet of paper P; this make it possible to apply the paper-punching device to copying machines with high-speed operations.

Moreover, with this arrangement wherein the photosensor 32 is incorporated into one unit so as to be moved together with the punching member 38, it becomes possible to minimize deviation in the installation distance $X_P$ between the punching member 38 and the photosensor 32, thereby providing a more accurate timing control and allowing the punch holes to be formed at more accurate positions.

Meanwhile, when a sheet of paper P is transported in a diagonal direction through the transport guide 167, the amount of positional deviation is comparatively small with respect to the first punch hole A; however, the amount of positional deviation tends to be large with respect to the second punch hole B that is located far away.

In order to solve this problem, the punch unit is stopped temporarily at the time when it reaches the point B at which the second punch hole is to be formed in the sheet of paper P, and at the time when the photosensor 32 has detected the rear edge of the sheet of paper P, the second punch hole is formed. This arrangement makes it possible to form the second punch hole more positively at a position with the predetermined distance apart from the rear edge of the sheet of paper, even if the sheet of paper P is transported through the transport guide 167 in a diagonal direction.

The waiting time $T_W$, which is required for forming a punch hole after the detection of the rear edge of the sheet of paper at the point B, is found from the following equation by using the transporting speed V of the sheet of paper P, the installation distance $X_P$ of the photosensor 32 with respect to the home position of the punching member 38, and the distance $X_1$ from the second punch hole B to the rear edge of the sheet of paper.

$$T_W=(X_P-X_1)/V \quad (26)$$

Referring to the flow chart of FIG. 57, the following description will discuss the operation of the shifting-type punching device 231 in the case of forming the second punch hole B in the manner as described above.

After the processes S131' through S137', which are the same as the processes S131 through S137 in the flow chart of FIG. 56, have been carried out, the waiting time $T_W=(X_P-X_1)/V$ is calculated at S150.

Thereafter, the processes S139' through S144', which are the same as the processes S139 through S144 in the flow chart of FIG. 56, are carried out, and the punching unit 232 is temporarily stopped. When the rear edge of the sheet of paper P is detected by the photosensor 32 (S151), the timer tx1 is reset (S152), and the waiting time $T_W$ that has been calculated at S150 is time-counted (S153).

After completion of the time-counting of the waiting time $T_W$, the processes S146' through S149', which are the same as the processes S146 through S149 in the flow chart of FIG. 56, are carried out, and the second punch hole B is formed.

As described above, as to the formation of the second punch hole, the punch hole is formed on the basis of detection of the rear edge of the sheet of paper made by the photosensor 32. This arrangement makes it possible to form the second punch hole more positively at a desired position, even if the sheet of paper P is transported through the transport guide 167 in a diagonal direction. Additionally, the present embodiment has discussed the operation where two punch holes are formed; however, even in the case of forming three or more punch holes, the operation is carried out in the same manner on the basis of detection of the rear edge of the sheet of paper made by the photosensor 32 with respect to the formation of the second punch hole and thereafter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A paper-punching arrangement for use in an image-forming apparatus comprising:

guiding means for guiding a sheet of paper in a predetermined direction;

a punching device for forming a punch hole in the sheet of paper, the punching device being installed in the guiding means, said punching device including a punching blade and driving means for driving the punching blade wherein the sheet of paper is caught by the punching blade for a predetermined duration; and transport rollers for conveying the sheet of paper at a predetermined transporting speed, the transport rollers being located on the downstream side from the punching blade in the guiding means, wherein the transport rollers slip a predetermined amount with respect to the sheet of paper when the sheet of paper is caught by the punching blade such that an amount of slippage determined by a mathematical product of the predetermined duration during which the sheet of paper is caught by the punching blade and the predetermined paper transporting speed exerted by the transport rollers is maintained equal to a predetermined value, and wherein said punching device is activated at a predetermined time determined in accordance with a thickness of the sheet of paper.

2. The paper-punching device for use in an image-forming apparatus as defined in claim 1, further comprising:

rear-edge detection means for detecting a rear edge of the sheet of paper on the upstream side from the punching blade; and control means for activating the driving means after a lapse of predetermined time from the detection of the rear edge of the sheet of paper made by the rear-edge detection means.

3. The paper-punching device for use in an image-forming apparatus as defined in claim 2, wherein the rear-edge detection means, which projects light onto a paper-transport path in the guiding means, detects the passage of the sheet of paper when receiving reflected light from the sheet of paper being transported, and detects the rear edge of the sheet of paper when the reflected light is no longer received.

4. The paper-punching device for use in an image-forming apparatus as defined in claim 1, wherein the transport rollers are a pair of rollers, one of which is made of rubber and the other of which is made of a foamed material.

5. The paper-punching device for use in an image-forming apparatus as defined in claim 4, wherein the foamed material is polyurethane foam.

6. The paper-punching device for use in an image-forming apparatus comprising as defined in claim 1, wherein a plurality of punching blades are situated within the guiding means separated by a predetermined distance and the driving means has a single piezoelectric element as a driving source that drives the punching blades at the same time.

7. The paper-punching device for us in an image-forming apparatus as defined in claim 1, further comprising:

stopping means for stopping the transport rollers when a sheet of paper is located at a punching position in the guiding means;

punch-hole detection means for detecting that a punch hole is properly formed at a punching position in the sheet of paper when the sheet of paper is stopped by the stopping means; and re-punching control means for re-activating the driving means so that at least one punching operation is carried out whenever no punch hole is detected by the punch-hole detection means after a punching operation.

8. The paper-punching device for use in an image-forming apparatus as defined in claim 7, wherein the punch-hole detection means is an optical sensor including a light-emitting section for emitting light that is allowed to pass through the punching position in the guiding means and a light-receiving section for receiving the light from the light-emitting section, the light-emitting section being disposed on one side of a sheet of paper located at a punching position in the guiding means and the light-receiving section being disposed in a position opposite to the light-emitting section on the other side of the sheet of paper located at a punching position in the guiding means.

9. The paper-punching device for use in an image-forming apparatus as defined in claim 1, wherein said predetermined value is not greater than 2 mm.

10. The paper-punching device for use in an image-forming apparatus as defined in claim 1, wherein said predetermined value is not greater than 1 mm.

11. A paper-punching device for use in an image-forming apparatus as defined in claim 1, wherein:

a plurality of punching blades are installed with predetermined intervals along a straight line that tilts at a predetermined angle with respect to the direction orthogonal to the transporting direction, and a plurality of driving means are installed so as to drive the punching blades individually, further comprising:

a driving circuit for activating the driving means successively, starting with the one closest to the rear edge of the sheet of paper, with predetermined time-intervals.

12. The paper-punching device for us in an image-forming apparatus as defined in claim 11, wherein:

the driving circuit activates the driving means such that the time-interval by which the driving means drive the adjacent punching blades in succession is equal to a value that is obtained by dividing the product of a positional distance between the adjacent punching blades in the direction orthogonal to the transporting direction of the sheet of paper and the tangent to the predetermined angle by the transporting speed of paper.

13. A paper-punching device for us in an image-forming apparatus as defined in claim 1, wherein the driving means has a first driving source for driving the punching blade with a driving force that is suitable for normal paper having a thickness not more than a predetermined thickness and a second driving source for driving the punching blade with a driving force that is suitable for thick paper exceeding the predetermined thickness, further comprising:

discrimination means for discriminating whether the sheet of paper is normal paper or thick paper, selective control means for activating the first driving source when the discrimination means shows that the sheet of paper is normal paper, while activating the second driving source when the discrimination means shows that the sheet of paper is thick paper; and transport control means for stopping the transporting operation of the transport rollers during the activation of the second driving source.

14. The paper-punching device for use in an image-forming apparatus as defined in claim 13, further comprising:

thick-paper-selecting means for selecting thick paper as a sheet of paper to be used in the image-forming operation of the image-forming apparatus, the thick-paper-selecting means being installed in place of the discrimination means, wherein the selective control means activates the second driving source when thick paper is selected by the thick-paper-selecting means, and also activates the first driving source when thick paper is not selected by the thick-paper-selecting means.

15. The paper-punching device for use in an image-forming apparatus as defined in claim 14, further comprising:

warp-generation means for allowing the sheet of paper to warp at a predetermined amount; and pressure-detection means for detecting a force exerted by the warp of the sheet of paper that is generated by the warp-generation means as a pressure, wherein the discrimination means makes a discrimination as to whether the sheet of paper is thick paper or normal paper in accordance with a detection output from the pressure-detection means.

16. A paper-punching device for use in an image-forming apparatus as defined in claim 1, further comprising:

idle driving control means for activating the driving means so that the punching blade is driven in a specific period of time when there is no paper at a punching position in the guiding means.

17. The paper-punching device for use in an image-forming apparatus as defined in claim 16, further comprising:

paper-detection means for detecting the presence or absence of paper at the punching position in the guiding means, wherein the idle-driving control means refrains from activating the driving means only when the presence of paper is detected at the punching position by the paper-detection means, and informs the fact that there is paper at the punching position.

18. The paper-punching device for use in an image-forming apparatus as defined in claim 17, wherein the paper-detection means is an optical sensor including a light-emitting section for emitting light that is allowed to pass through the punching position in the guiding means and a light-receiving section for receiving the light from the light-emitting section, the light-emitting section being disposed on the surface side of the sheet of paper or on the back side thereof, the light-receiving section being disposed at a position opposite to the light-emitting section with respect to the sheet of paper.

* * * * *